US012793476B2

(12) United States Patent
Jordan et al.

(10) Patent No.: US 12,793,476 B2
(45) Date of Patent: Nov. 10, 2026

(54) CONNECTED DIAGNOSTIC SYSTEM AND METHOD

(71) Applicant: Wi-Tronix, LLC, Bolingbrook, IL (US)

(72) Inventors: Lawrence B. Jordan, Bolingbrook, IL (US); Lisa A. Matta, Bolingbrook, IL (US); Chaitanya Rani Veeranna Gowda, Bolingbrook, IL (US); Syed Oun Abbas, Bolingbrook, IL (US); Matthew D. Hamsmith, Bolingbrook, IL (US)

(73) Assignee: WI-TRONIX, LLC, Bolingbrook, IL (US)

( * ) Notice: Subject to any disclaimer, the term of this patent is extended or adjusted under 35 U.S.C. 154(b) by 93 days.

(21) Appl. No.: 18/914,912

(22) Filed: Oct. 14, 2024

(65) Prior Publication Data

US 2025/0046131 A1 Feb. 6, 2025

Related U.S. Application Data

(63) Continuation of application No. 17/518,868, filed on Nov. 4, 2021, now Pat. No. 12,118,833.

(60) Provisional application No. 63/110,628, filed on Nov. 6, 2020.

(51) Int. Cl.
*G07C 5/08* (2006.01)
*G06F 8/65* (2018.01)

(52) U.S. Cl.
CPC ............ *G07C 5/0808* (2013.01); *G06F 8/65* (2013.01); *G07C 5/0816* (2013.01); *G07C 5/085* (2013.01)

(58) Field of Classification Search
CPC .... G07C 5/0808; G07C 5/0816; G07C 5/085; G06F 8/65
See application file for complete search history.

(56) References Cited

U.S. PATENT DOCUMENTS

2021/0241546 A1* 8/2021 Chafekar ............ G07C 5/0808

* cited by examiner

*Primary Examiner* — Michael D Lang
(74) *Attorney, Agent, or Firm* — Rockman, Videbeck & O'Connor LLC; Howard B. Rockman; Mercedes V. O'Connor

(57) ABSTRACT

A connected diagnostic system (CDS) for mobile assets that includes an onboard processing unit and a remote web-based platform that provides a remote view of an onboard display and/or Human Machine Interface (HMI) of the mobile asset. The onboard display and/or HMI can be the mobile asset's own onboard display or an onboard display can be included with the CDS. The onboard processing unit receives data from data sources onboard the mobile asset, such as onboard systems and onboard subsystems, and/or data sources remote from the mobile asset and displays the data on the onboard display, using wired communication channels, and on the remote web-based platform, using wireless communication channels. The onboard processing unit can also receive data from a data acquisition and recording system (DARS) for mobile assets that includes a data recorder.

15 Claims, 65 Drawing Sheets

1210

CONNECTED DIAGNOSTIC SYSTEM AND METHOD

CROSS-REFERENCE TO RELATED APPLICATION(S)

This application claims priority to and is a continuation of U.S. Non-provisional application Ser. No. 17/518,868, filed Nov. 4, 2021, and claims priority to U.S. Provisional Application No. 63/110,628, filed Nov. 6, 2020, the extent allowed by law and the contents of which are incorporated herein by reference in their entireties. This application also claims priority to U.S. Provisional Application No. 62/825,943, filed Mar. 29, 2019; U.S. Provisional Application No. 62/829,730, filed Apr. 5, 2019; U.S. Non-Provisional application Ser. No. 16/833,590, filed Mar. 28, 2020; U.S. Provisional Application No. 62/337,227, filed May 16, 2016; U.S. Non-provisional patent application Ser. No. 15/595,650, filed May 15, 2017, now U.S. Pat. No. 9,934,623, issued Apr. 3, 2018; U.S. Non-provisional patent application Ser. No. 15/907,486, filed Feb. 28, 2018, now U.S. Pat. No. 10,445,951, issued Oct. 15, 2019; U.S. Provisional Application No. 62/337,225, filed May 16, 2016; U.S. Non-provisional patent application Ser. No. 15/595,689, filed May 15, 2017, now U.S. Pat. No. 10,410,441, issued Sep. 10, 2019; U.S. Non-Provisional patent application Ser. No. 16/385,745, filed Apr. 16, 2019, now U.S. Pat. No. 11,055,935, issued Jul. 6, 2021; U.S. Provisional Application No. 62/337,228, filed May 16, 2016; U.S. Non-provisional patent application Ser. No. 15/595,712, filed May 15, 2017, now U.S. Pat. No. 10,392,038, issued Aug. 27, 2019; U.S. Provisional Application No. 62/680,907, filed Jun. 5, 2018; and U.S. Non-provisional patent application Ser. No. 16/431,466, filed Jun. 4, 2019. The entire disclosures of each of the above are incorporated herein by reference in their entireties. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls.

TECHNICAL FIELD

This disclosure relates to equipment used in high value assets and particularly, to a connected diagnostic system and method used in high value mobile assets.

BACKGROUND

High value mobile assets such as locomotives, aircraft, mass transit systems, mining equipment, transportable medical equipment, cargo, marine vessels, and military vessels typically employ onboard data acquisition and recording "black box" systems and/or "event recorder" systems. These data acquisition and recording systems, such as event data recorders or flight data recorders, log a variety of system parameters used for incident investigation, crew performance evaluation, fuel efficiency analysis, maintenance planning, and predictive diagnostics. A typical data acquisition and recording system comprises digital and analog inputs, as well as pressure switches and pressure transducers, which record data from various onboard sensor devices. Recorded data may include such parameters as speed, distance traveled, location, fuel level, engine revolution per minute (RPM), fluid levels, operator controls, pressures, current and forecasted weather conditions and ambient conditions. In addition to the basic event and operational data, video and audio event/data recording capabilities are also deployed on many of these same mobile assets. Typically, data is extracted from data recorders, after an incident has occurred involving an asset and investigation is required, once the data recorder has been recovered. Certain situations may arise where the data recorder cannot be recovered or the data is otherwise unavailable. In these situations, the data, such as event and operational data, video data, and audio data, acquired by the data acquisition and recording system is needed promptly regardless of whether physical access to the data acquisition and recording system or the data is available.

SUMMARY

This disclosure relates generally to real-time data acquisition and recording systems and connected diagnostic systems used in high value mobile assets. The teachings herein can provide real-time, or near real-time, access to data, such as event and operational data, video data, and audio data, recorded by a real-time data acquisition and recording system on a high value mobile asset. One implementation of a method for processing, storing, and transmitting data from at least one mobile asset includes receiving, using an onboard processing unit, data based on at least one data signal from at least one of: at least one data source onboard the at least one mobile asset; and at least one data source remote from the at least one mobile asset; decoding the data into decoded data; adding the decoded data to a compressed data structure; sending, using at least one of a wired communication channel and a wireless communication channel, the compressed data structure to at least one of: an onboard display onboard the at least one asset; and at least one of at least one onboard system onboard the at least one mobile asset and at least one onboard subsystem onboard the at least one mobile asset; sending, using a wireless communication channel, the compressed data structure to a remote platform remote from the at least one mobile asset.

One implementation of a method for processing, storing, and transmitting historical data from at least one mobile asset includes receiving a request for the historical data from at least one of a user onboard the at least one mobile asset and a user off-board the at least one mobile asset; obtaining, using an onboard processing unit onboard the at least one mobile asset, the historical data; sending, using at least one of a wired communication channel and a wireless communication channel, the historical data to at least one of: an onboard display onboard the at least one asset; and at least one of at least one onboard system onboard the at least one mobile asset and at least one onboard subsystem onboard the at least one mobile asset; and displaying, using the onboard display, the historical data.

One implementation of a method for processing, onboard at least one mobile asset, a request from a remotely located user includes receiving, using an onboard processing unit onboard the at least one mobile asset, the request via a wireless communication channel; identifying, using the onboard processing unit, a nature of the request; installing, using the onboard processing unit, software on an onboard display onboard the at least one mobile asset on a condition that the nature of the request is a remote software update of the onboard display; installing, using the onboard processing unit, software on at least one of at least one onboard system onboard the at least one mobile asset and at least one onboard subsystem onboard the at least one mobile asset on a condition that the nature of the request is a remote software update of at least one of the at least one onboard system onboard the at least one mobile asset and the at least one onboard subsystem onboard the at least one mobile asset; and sending, using the onboard processing unit, the request to at least one of the onboard display, the at least one onboard system onboard the at least one mobile asset, and the at least one onboard subsystem onboard the at least one mobile asset on a condition that the nature of the request is a command.

One implementation of a method for integrating data from at least one source remote from at least one mobile asset includes storing the data to a remote storage device remote from the at least one mobile asset; sending, using a wireless communication channel, the data to a remote platform remote from the at least one mobile asset; sending, using the wireless communication channel, the data to the onboard processing unit; and sending, using at least one of a wired communication channel and a wireless communication channel, the data from the onboard processing unit to at least one of: an onboard display onboard the at least one mobile asset; and at least one of at least one onboard system onboard the at least one mobile asset and at least one onboard subsystem onboard the at least one mobile asset.

One implementation of a system for processing, storing, and transmitting data from at least one mobile asset includes an onboard processing unit onboard the at least one mobile asset, the onboard processing unit adapted to at least one of receive the data, using at least one of a wired communication channel and a wireless communication channel, based on at least one data signal from at least one of: at least one data source onboard the at least one mobile asset; and at least one data source remote from the at least one mobile asset; a cloud-based real-time server remote from the at least one mobile asset, the cloud-based real-time server adapted to receive the data from the onboard processing unit using the wireless communication channel; a display onboard the mobile asset, the display adapted to display the data received from the onboard processing unit, the display comprising one of a third party onboard display and an onboard display of the system; and a remote platform remote from the at least mobile asset, the remote platform adapted to display the decoded data received from the cloud-based real-time server.

Variations in these and other aspects of the disclosure will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
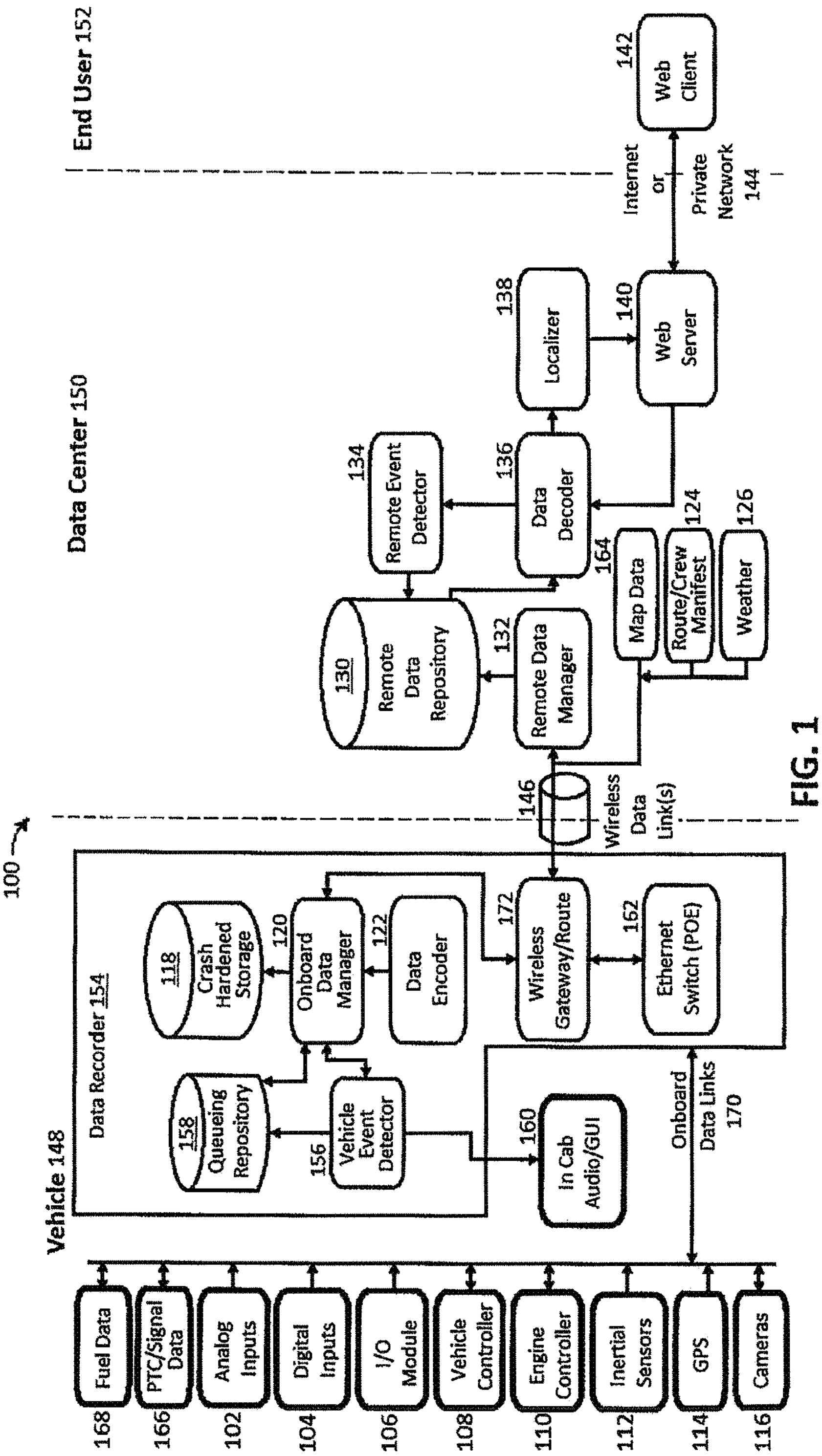
FIG. 1 illustrates a field implementation of a first embodiment of an exemplary real-time data acquisition and recording system in accordance with implementations of this disclosure.

A first embodiment of a real-time data acquisition and recording system described herein provides real-time, or near real-time, access to a wide range of data, such as event and operational data, video data, and audio data, related to a high value asset to remotely located users such as asset owners, operators, and investigators. The data acquisition and recording system records data, via a data recorder, relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data recorder on the asset to request a download of specific data, to locate and transfer files, and to use a custom application to view the data. The system of the present disclosure retains typical recording capability and adds the ability to stream data to a remote data repository and remote end user prior to, during, and after an incident. In the vast majority of situations, the information recorded in the data recorder is redundant and not required as data has already been acquired and stored in the remote data repository.

Prior to the system of the present disclosure, data was extracted from the "black box" or "event recorder" after an incident had occurred and an investigation was required. Data files containing time segments recorded by the "black box" had to be downloaded and retrieved from the "black box" and then viewed by a user with proprietary software. The user would have to obtain physical or remote access to the asset, select the desired data to be downloaded from the "black box," download the file containing the desired information to a computing device, and locate the appropriate file with the desired data using a custom application that operates on the computing device. The system of the present disclosure has eliminated the need for the user to perform these steps, only requiring the user to use a common web browser to navigate to the desired data. The remotely located user may access a common web browser to navigate to desired data relating to a selected asset, or plurality of assets, to view and analyze the operational efficiency and safety of assets in real-time or near real-time.

The remotely located user, such as an asset owner, operator, and/or investigator, may access a common web browser to navigate to live and/or historic desired data relating to a selected asset to view and analyze the operational efficiency and safety of assets in real-time or near real-time. The ability to view operations in real-time, or near real-time, enables rapid evaluation and adjustment of behavior. During an incident, for example, real-time information and/or data can facilitate triaging the situation and provide valuable information to first responders. During normal operation, for example, near real-time information and/or data can be used to audit crew performance and to aid network wide situational awareness.

Data may include, but is not limited to, analog and frequency parameters such as speed, pressure, temperature, current, voltage, and acceleration which originate from the asset and/or nearby assets; Boolean data such as switch positions, actuator position, warning light illumination, and actuator commands; global positioning system (GPS) data and/or geographic information system (GIS) data such as position, speed, and altitude; internally generated information such as the regulatory speed limit for an asset given its current position; video and image information from cameras located at various locations in, on, or in the vicinity of the asset; audio information from microphones located at various locations in, on, or in vicinity of the asset; information about the operational plan for the asset that is sent to the asset from a data center such as route, schedule, and cargo manifest information; information about the environmental conditions, including current and forecasted weather conditions, of the area in which the asset is currently operating in or is planned to operate in; asset control status and operational data generated by systems such as positive train control (PTC) in locomotives; and data derived from a combination from any of the above including, but not limited to, additional data, video, and audio analysis and analytics.

Figure 2:
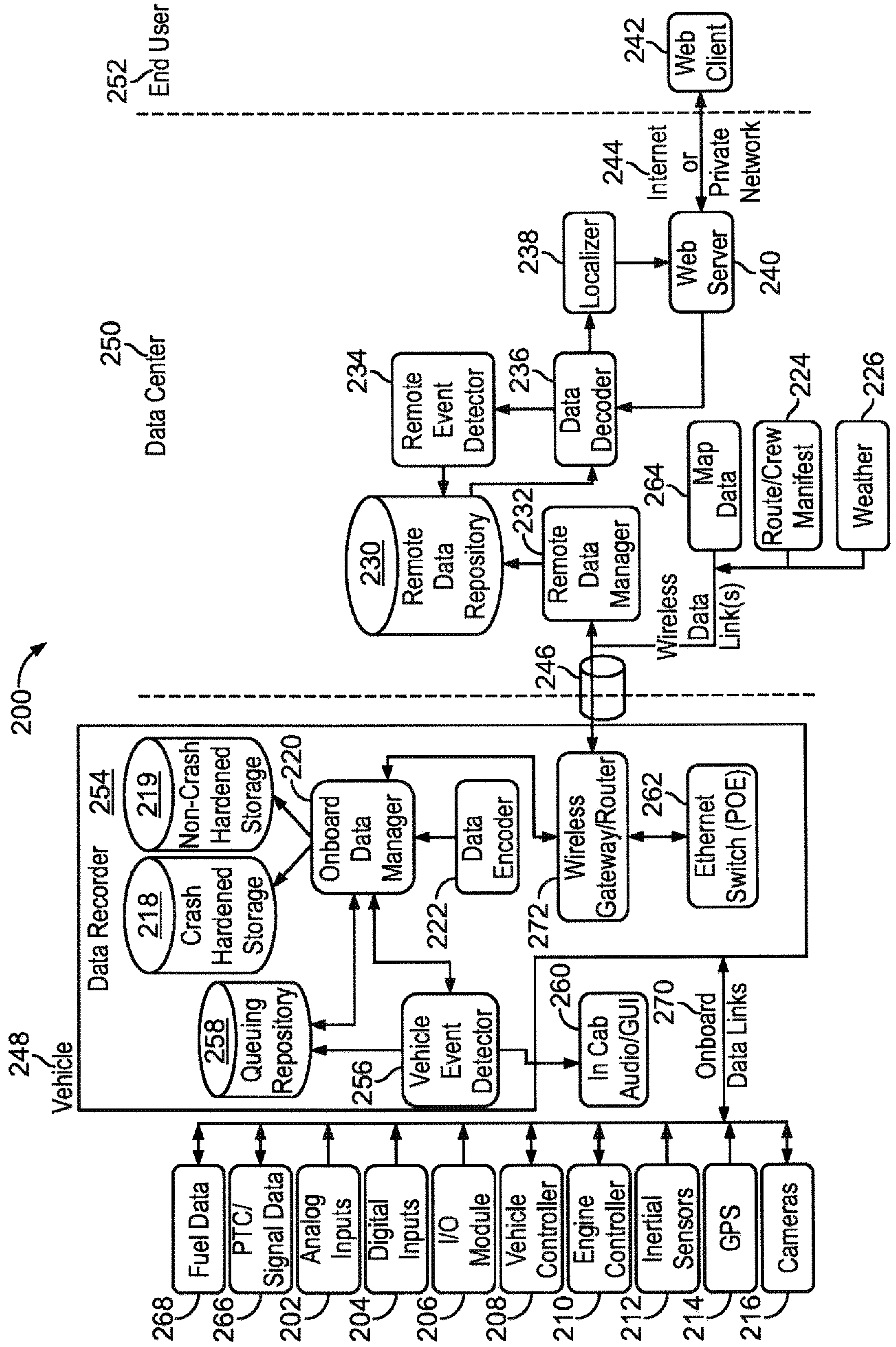
FIG. 2 illustrates a field implementation of a second embodiment of the exemplary real-time data acquisition and recording system in accordance with implementations of this disclosure.

FIGS. 1 and 2 illustrate a field implementation of a first embodiment and a second embodiment, respectively, of an exemplary real-time data acquisition and recording system (DARS) 100, 200 in which aspects of the disclosure can be implemented. DARS 100, 200 is a system that delivers real-time information to remotely located end users from a data recording device. DARS 100, 200 includes a data recorder 154, 254 that is installed on a vehicle or mobile asset 148, 248 and communicates with any number of various information sources through any combination of onboard wired and/or wireless data links 170, 270, such as a wireless gateway/router, or off-board information sources via a data center 150, 250 of DARS 100, 200 via data links such as wireless data links 146. Data recorder 154, 254 comprises an onboard data manager 120, 220, a data encoder 122, 222, a vehicle event detector 156, 256, a queueing repository 158, 258, and a wireless gateway/router 172, 272. Additionally, in this implementation, data recorder 154, 254 can include a crash hardened memory module 118, 218 and/or an Ethernet switch 162, 262 with or without power over Ethernet (POE). An exemplary hardened memory module 118, 218 can be, for example, a crashworthy event recorder memory module that complies with the Code of Federal Regulations and/or the Federal Railroad Administration regulations, a crash survivable memory unit that complies with the Code of Federal Regulations and/or the Federal Aviation Administration regulations, a crash hardened memory module in compliance with any applicable Code of Federal Regulations, or any other suitable hardened memory device as is known in the art. In the second embodiment, shown in FIG. 2, the data recorder 254 can further include an optional non-crash hardened removable storage device 219.

The wired and/or wireless data links 170, 270 can include any one of or combination of discrete signal inputs, standard or proprietary Ethernet, serial connections, and wireless connections. Ethernet connected devices may utilize the data recorder's 154, 254 Ethernet switch 162, 262 and can utilize POE. Ethernet switch 162, 262 may be internal or external and may support POE. Additionally, data from remote data sources, such as a map component 164, 264, a route/crew manifest component 124, 224, and a weather component 126, 226 in the implementation of FIGS. 1 and 2, is available to the onboard data manager 120, 220 and the vehicle event detector 156, 256 from the data center 150, 250 through the wireless data link 146, 246 and the wireless gateway/router 172, 272.

Data recorder 154, 254 gathers data or information from a wide variety of sources, which can vary widely based on the asset's configuration, through onboard data links 170, 270. The data encoder 122, 222 encodes at least a minimum set of data that is typically defined by a regulatory agency. In this implementation, the data encoder 122, 222 receives data from a wide variety of asset 148, 248 sources and data center 150, 250 sources. Information sources can include any number of components in the asset 148, 248, such as any of analog inputs 102, 202, digital inputs 104, 204, I/O module 106, 206, vehicle controller 108, 208, engine controller 110, 210, inertial sensors 112, 212, global positioning system (GPS) 114, 214, cameras 116, 216, positive train control (PTC)/signal data 166, 266, fuel data 168, 268, cellular transmission detectors (not shown), internally driven data and any additional data signals, and any of number of components in the data center 150, 250, such as any of the route/crew manifest component 124, 224, the weather component 126, 226, the map component 164, 264, and any additional data signals. The data encoder 122, 222 compresses or encodes the data and time synchronizes the data in order to facilitate efficient real-time transmission and replication to a remote data repository 130, 230. The data encoder 122, 222 transmits the encoded data to the onboard data manager 120, 220 which then saves the encoded data in the crash hardened memory module 118, 218 and the queuing repository 158, 258 for replication to the remote data repository 130, 230 via a remote data manager 132, 232 located in the data center 150, 250. Optionally, the onboard data manager 120, 220 can also save a tertiary copy of the encoded data in the non-crash hardened removable storage device 219 of the second embodiment shown in FIG. 2. The onboard data manager 120, 220 and the remote data manager 132, 232 work in unison to manage the data replication process. A single remote data manager 132, 232 in the data center 150, 250 can manage the replication of data from a plurality of assets 148, 248.

The data from the various input components and data from an in-cab audio/graphical user interface (GUI) 160, 260 are sent to a vehicle event detector 156, 256. The vehicle event detector 156, 256 processes the data to determine whether an event, incident, or other predefined situation involving the asset 148, 248 has occurred. When the vehicle event detector 156, 256 detects signals that indicate a predefined event occurred, the vehicle event detector 156, 256 sends the processed data that a predefined event occurred, along with supporting data surrounding the predefined event, to the onboard data manager 120, 220. The vehicle event detector 156, 256 detects events based on data from a wide variety of sources, such as the analog inputs 102, 202, the digital inputs 104, 204, the I/O module 106, 206, the vehicle controller 108, 208, the engine controller 110, 210, the inertial sensors 112, 212, the GPS 114, 214, the cameras 116, 216, the route/crew manifest component 124, 224, the weather component 126, 226, the map component 164, 264, the PTC/signal data 166, 266, and the fuel data 168, 268, which can vary based on the asset's configuration. When the vehicle event detector 156, 256 detects an event, the detected asset event information is stored in a queuing repository 158, 258 and can optionally be presented to the crew of the asset 148, 248 via the in-cab audio/graphical user interface (GUI) 160, 260.

The onboard data manager 120, 220 also sends data to the queuing repository 158. In near real-time mode, the onboard data manager 120, 220 stores the encoded data received from the data encoder 122, 222 and any event information in the crash hardened memory module 118, 218 and in the queueing repository 158, 258. In the second embodiment of FIG. 2, the onboard data manager 220 can optionally store the encoded data in the non-crash hardened removable storage device 219. After five minutes of encoded data has accumulated in the queuing repository 158, 258, the onboard data manager 120, 220 stores the five minutes of encoded data to the remote data repository 130, 230 via the remote data manager 132, 232 in the data center 150, 250 over the wireless data link 146, 246 accessed through the wireless gateway/router 172, 272. In real-time mode, the onboard data manager 120, 220 stores the encoded data received from the data encoder 122, 222 and any event information to the crash hardened memory module 118, 218, and optionally in the non-crash hardened removable storage device 219 of FIG. 2, and to the remote data repository 130, 230 via the remote data manager 132, 232 in the data center 150, 250 over the wireless data link 146, 246 accessed through the wireless gateway/router 172, 272. The onboard data manager 120, 220 and the remote data manager 132, 232 can communicate over a variety of wireless communications links, such as Wi-Fi, cellular, satellite, and private wireless systems utilizing the wireless gateway/router 172, 272. Wireless data link 146, 246 can be, for example, a wireless local area network (WLAN), wireless metropolitan area network (WMAN), wireless wide area network (WWAN), a private wireless system, a cellular telephone network or any other means of transferring data from the data recorder 154, 254 of DARS 100, 200 to, in this example, the remote data manager 130, 230 of DARS 100, 200. When a wireless data connection is not available, the data is stored in memory and queued in queueing repository 158, 258 until wireless connectivity is restored and the data replication process can resume.

In parallel with data recording, data recorder 154, 254 continuously and autonomously replicates data to the remote data repository 130, 230. The replication process has two modes, a real-time mode and a near real-time mode. In real-time mode, the data is replicated to the remote data repository 130, 230 every second. In near real-time mode, the data is replicated to the remote data repository 130, 230 every five minutes. The rates used for near real-time mode and real-time mode are configurable and the rate used for real-time mode can be adjusted to support high resolution data by replicating data to the remote data repository 130, 230 every 0.10 seconds. When the DARS 100, 200 is in near real-time mode, the onboard data manager 120, 220 queues data in the queuing repository 158, 258 before replicating the data to the remote data manager 132, 232. The onboard data manager 120, 220 also replicates the vehicle event detector information queued in the queueing repository 158, 258 to the remote data manager 132, 232. Near real-time mode is used during normal operation, under most conditions, in order to improve the efficiency of the data replication process.

Real-time mode can be initiated based on events occurring and detected by the vehicle event detector 156, 256 onboard the asset 148, 248 or by a request initiated from the data center 150, 250. A typical data center 150, 250 initiated request for real-time mode is initiated when a remotely located user 152, 252 has requested real-time information from a web client 142, 242. A typical reason for real-time mode to originate onboard the asset 148, 248 is the detection of an event or incident by the vehicle event detector 156, 256 such as an operator initiating an emergency stop request, emergency braking activity, rapid acceleration or deceleration in any axis, or loss of input power to the data recorder 154, 254. When transitioning from near real-time mode to real-time mode, all data not yet replicated to the remote data repository 130, 230 is replicated and stored in the remote data repository 130, 230 and then live replication is initiated. The transition between near real-time mode and real-time mode typically occurs in less than five seconds. After a predetermined amount of time has passed since the event or incident, a predetermined amount of time of inactivity, or when the user 152, 252 no longer desires real-time information from the asset 148, 248, the data recorder 154, 254 reverts to near real-time mode. The predetermined amount of time required to initiate the transition is configurable and is typically set to ten minutes.

When the data recorder 154, 254 is in real-time mode, the onboard data manager 120, 220 attempts to continuously empty its queue to the remote data manager 132, 232, storing the data to the crash hardened memory module 118, 218, and optionally to the non-crash hardened removable storage device 219 of FIG. 2, and sending the data to the remote data manager 132, 232 simultaneously. The onboard data manager 120, 220 also sends the detected vehicle information queued in the queuing repository 158, 258 to the remote data manager 132, 232.

Upon receiving data to be replicated from the data recorder 154, 254, along with data from the map component 164, 264, the route/crew manifest component 124, 224, and the weather component 126, 226, the remote data manager 132, 232 stores the compressed data to the remote data repository 130, 230 in the data center 150, 250 of DARS 100, 200. The remote data repository 130, 230 can be, for example, cloud-based data storage or any other suitable remote data storage. When data is received, a process is initiated that causes a data decoder 136, 236 to decode the recently replicated data for/from the remote data repository 130, 230 and send the decoded data to a remote event detector 134, 234. The remote data manager 132, 232 stores vehicle event information in the remote data repository 130, 230. When the remote event detector 134, 234 receives the decoded data, it processes the decoded data to determine if an event of interest is found in the decoded data. The decoded information is then used by the remote event detector 134, 234 to detect events, incidents, or other predefined situations, in the data occurring with the asset 148, 248. Upon detecting an event of interest from the decoded data, the remote event detector 134, 234 stores the event information and supporting data in the remote data repository 130, 230. When the remote data manager 132, 232 receives remote event detector 134, 234 information, the remote data manager 132, 232 stores the information in the remote data repository 130, 230.

The remotely located user 152, 252 can access information, including vehicle event detector information, relating to the specific asset 148, 248, or a plurality of assets, using the standard web client 142, 242, such as a web browser, or a virtual reality device (not shown) which, in this implementation, can display thumbnail images from selected cameras. The web client 142, 242 communicates the user's 152, 252 requests for information to a web server 140, 240 through a network 144, 244 using common web standards, protocols, and techniques. Network 144, 244 can be, for example, the Internet. Network 144, 244 can also be a local area network (LAN), metropolitan area network (MAN), wide area network (WAN), virtual private network (VPN), a cellular telephone network, or any other means of transferring data from the web server 140, 240 to, in this example, the web client 142, 242. The web server 140, 240 requests the desired data from the data decoder 136, 236. The data decoder 136, 236 obtains the requested data relating to the specific asset 148, 248, or a plurality of assets, from the remote data repository 130, 230 upon request from the web server 140, 240. The data decoder 136, 236 decodes the requested data and sends the decoded data to a localizer 138, 238. Localization is the process of converting data to formats desired by the end user, such as converting the data to the user's preferred language and units of measure. The localizer 138, 238 identifies the profile settings set by user 152, 252 by accessing the web client 142, 242 and uses the profile settings to prepare the information being sent to the web client 142, 242 for presentation to the user 152, 252 in the user's preferred language and units of measure, as the raw encoded data and detected event information is saved to the remote data repository 130, 230 using coordinated universal time (UTC) and international system of units (SI units). The localizer 138, 238 converts the decoded data into a format desired by the user 152, 252, such as the user's 152, 252 preferred language and units of measure. The localizer 138, 238 sends the localized data in the user's 152, 252 preferred format to the web server 140, 240 as requested. The web server 140, 240 then sends the localized data of the asset, or plurality of assets, to the web client 142, 242 for viewing and analysis, providing playback and real-time display of standard video and 360 degrees video. The web client 142, 242 can display and the user 152, 252 can view the data, video, and audio for a single asset or simultaneously view the data, video, and audio for a plurality of assets. The web client 142, 242 can also provide synchronous playback and real-time display of data along with the plurality of video and audio data from both standard and 360 degrees video sources on, in, or in the vicinity of the asset, nearby assets, and/or remotely located sites.

Figure 3:
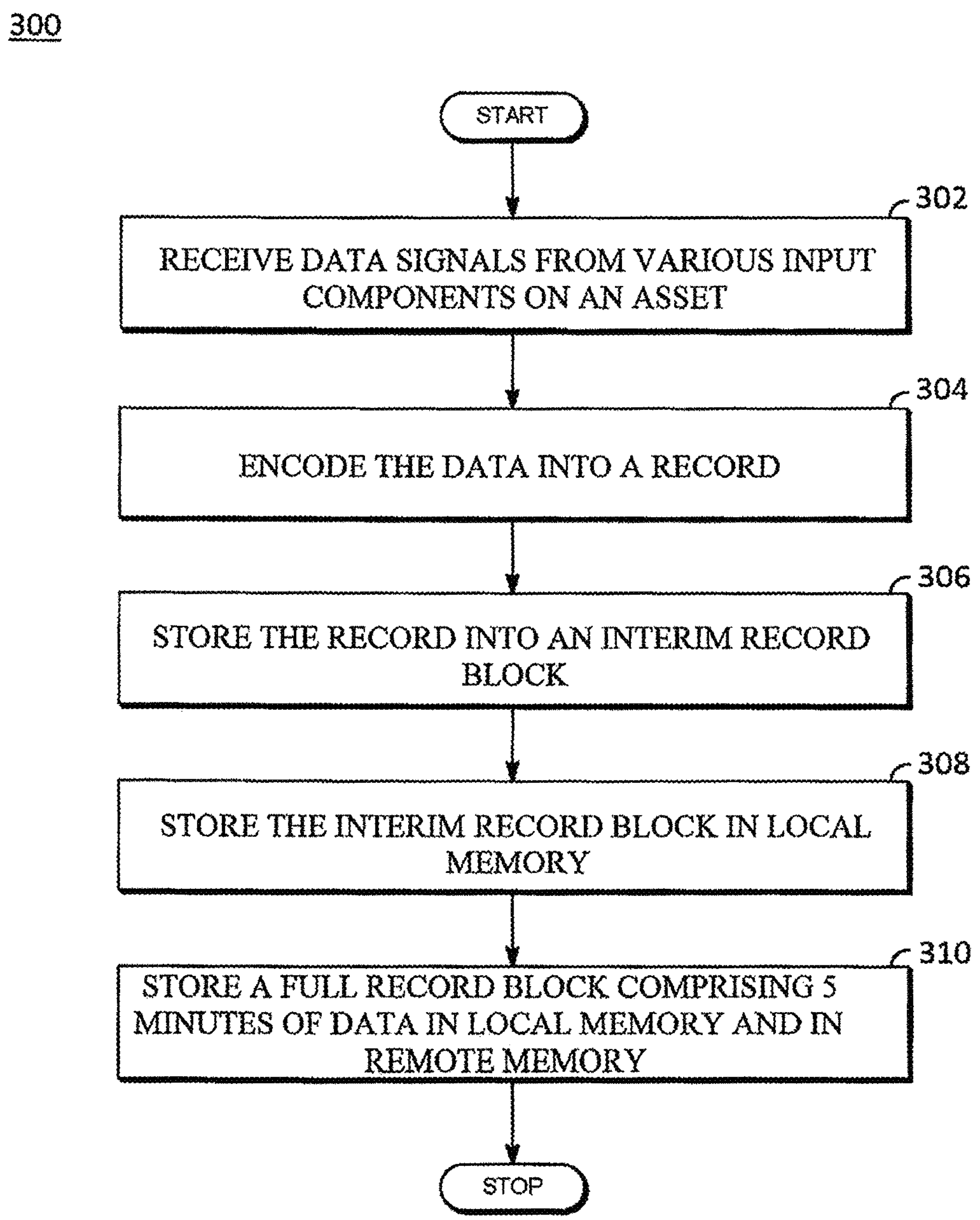
FIG. 3 is a flow diagram of a process for recording data and/or information from a mobile asset in accordance with implementations of this disclosure.

FIG. 3 is a flow diagram showing a process 300 for recording data and/or information from the asset 148, 248 in accordance with an implementation of this disclosure. Data recorder 154, 254 receives data signals from various input components that include physical or calculated data elements from the asset 148, 248 and data center 150, 250, such as speed, latitude coordinates, longitude coordinates, horn detection, throttle position, weather data, map data, and/or route and/or crew data 302. Data encoder 122, 222 creates a record that includes a structured series of bits used to configure and record the data signal information 304. The encoded record is then sent to the onboard data manager 120, 220 that sequentially combines a series of records in chronological order into record blocks that include up to five minutes of data 306. An interim record block includes less than five minutes of data while a full record block includes a full five minutes of data. Each record block includes all the data required to fully decode the included signals, including a data integrity check. At a minimum, a record block must start with a start record and end with an end record.

Figure 5:
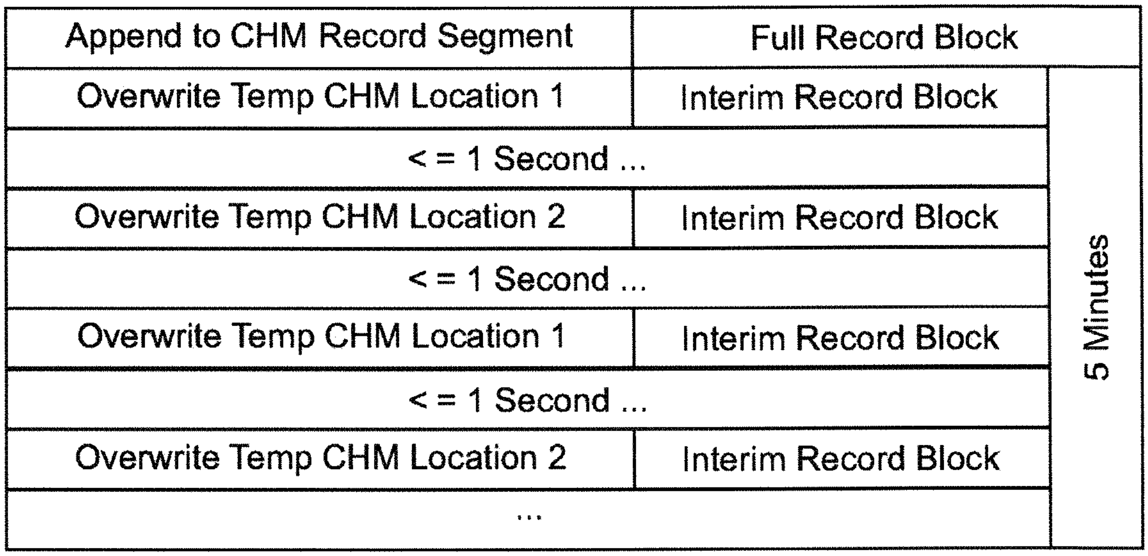
FIG. 5 is a diagram that illustrates exemplary interim record blocks and full record blocks saved to a crash hardened memory module in accordance with implementations of this disclosure.

In order to ensure that all of the encoded signal data is saved to the crash hardened memory module 118, and optionally to the non-crash hardened removable storage device 219 of FIG. 2, should the data recorder 154, 254 lose power or be subjected to extreme temperatures or mechanical stresses due to a collision or other catastrophic event, the onboard data manager 120, 220 stores interim record blocks in the crash hardened memory module 118 at a predetermined rate 308, and optionally in the non-crash hardened removable storage device 219 of FIG. 2, where the predetermined rate is configurable and/or variable, as shown in FIG. 5 in an exemplary representation. Interim record blocks are saved at least once per second but can also be saved as frequently as once every tenth of a second. The rate at which interim record blocks are saved depends on the sampling rates of each signal. Every interim record block includes the full set of records since the last full record block. Data recorder 154, 254 can alternate between two temporary storage locations in the crash hardened memory module 118, 218, and optionally in the non-crash hardened removable storage device 219 of FIG. 2, when recording each interim record block to prevent the corruption or loss of more than one second of data when the data recorder 154, 254 loses power while storing data to the crash hardened memory module 118, 218 and/or the optional non-crash hardened removable storage device 219 of the data recorder 254 of FIG. 2. Each time a new interim record block is saved to a temporary crash hardened memory location it will overwrite the existing previously stored interim record block in that location.

Figure 7:
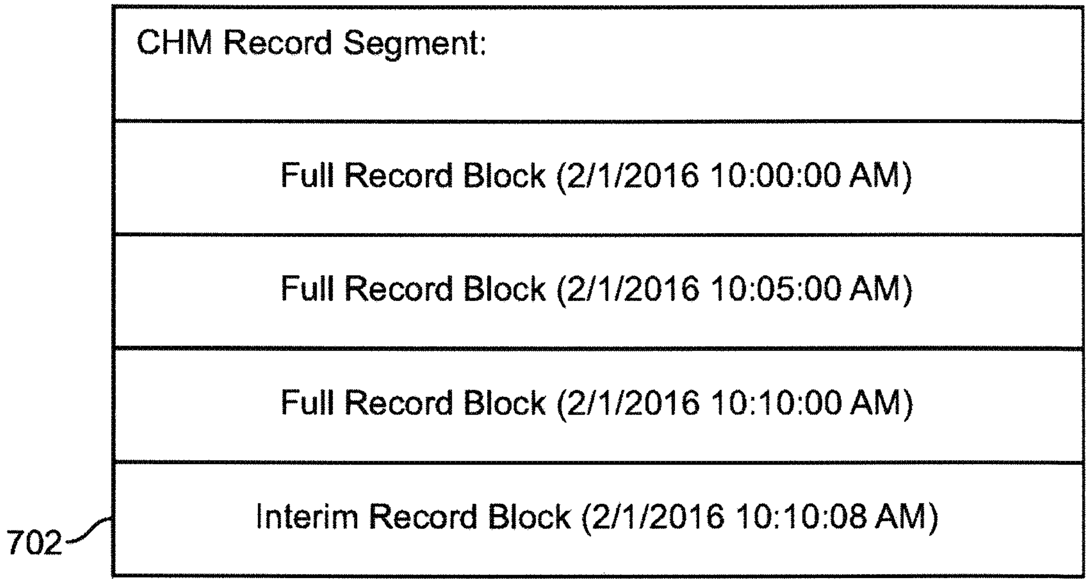
FIG. 7 is a diagram that illustrates an exemplary record segment in the crash hardened memory module after power has been restored in accordance with implementations of this disclosure.

Every five minutes, in this implementation, when the data recorder 154, 254 is in near real-time mode, the onboard data manager 120, 220 stores a full record block including the last five minutes of encoded signal data into a record segment in the crash hardened memory module 118, 218, shown in FIG. 7, and sends a copy of the full record block to the remote data manager 132, 232 to be stored in the remote data repository 130, 230 for a predetermined retention period such as two years 310. The crash hardened memory module 118, 218, and/or the optional non-crash hardened removable storage device 219 of the data recorder 254 of FIG. 2, stores a record segment of the most recent record blocks for a mandated storage duration, which in this implementation is the federally mandated duration that the data recorder 154, 254 must store operational and/or video data in the crash hardened memory module 118, 218 with an additional 24 hour buffer, and is then overwritten.

Figure 4:
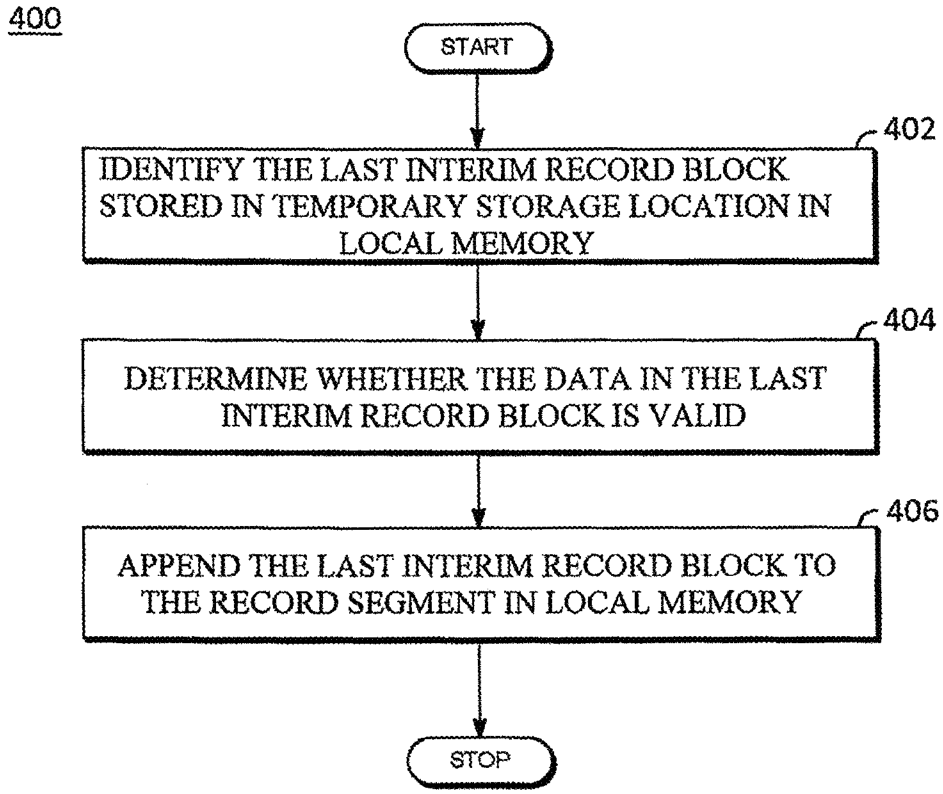
FIG. 4 is a flow diagram of a process for appending data and/or information from the mobile asset after a power outage in accordance with implementations of this disclosure.

FIG. 4 is a flow diagram showing a process 400 for appending data and/or information from the asset 148, 248 after a power outage in accordance with an implementation of this disclosure. Once power is restored, the data recorder 154, 254 identifies the last interim record block that was stored in one of the two temporary crash hardened memory locations 402 and validates the last interim record block using the 32 bit cyclic redundancy check that is included in the end record of every record block 404. The validated interim record block is then appended to the crash hardened memory record segment and that record segment, which can contain up to five minutes of data prior to the power loss, is sent to the remote data manager 132, 232 to be stored for the retention period 406. The encoded signal data is stored to the crash hardened memory module 118, 218, and/or the optional non-crash hardened removable storage device 219 of the data recorder 254 of FIG. 2, in a circular buffer for the mandated storage duration. Since the crash hardened memory record segment is broken up into multiple record blocks, the data recorder 154, 254 removes older record blocks when necessary to free up memory space each time a full record block is saved to crash hardened memory module 118, 218, and/or the optional non-crash hardened removable storage device 219 of the data recorder 254 of FIG. 2.

Figure 6:
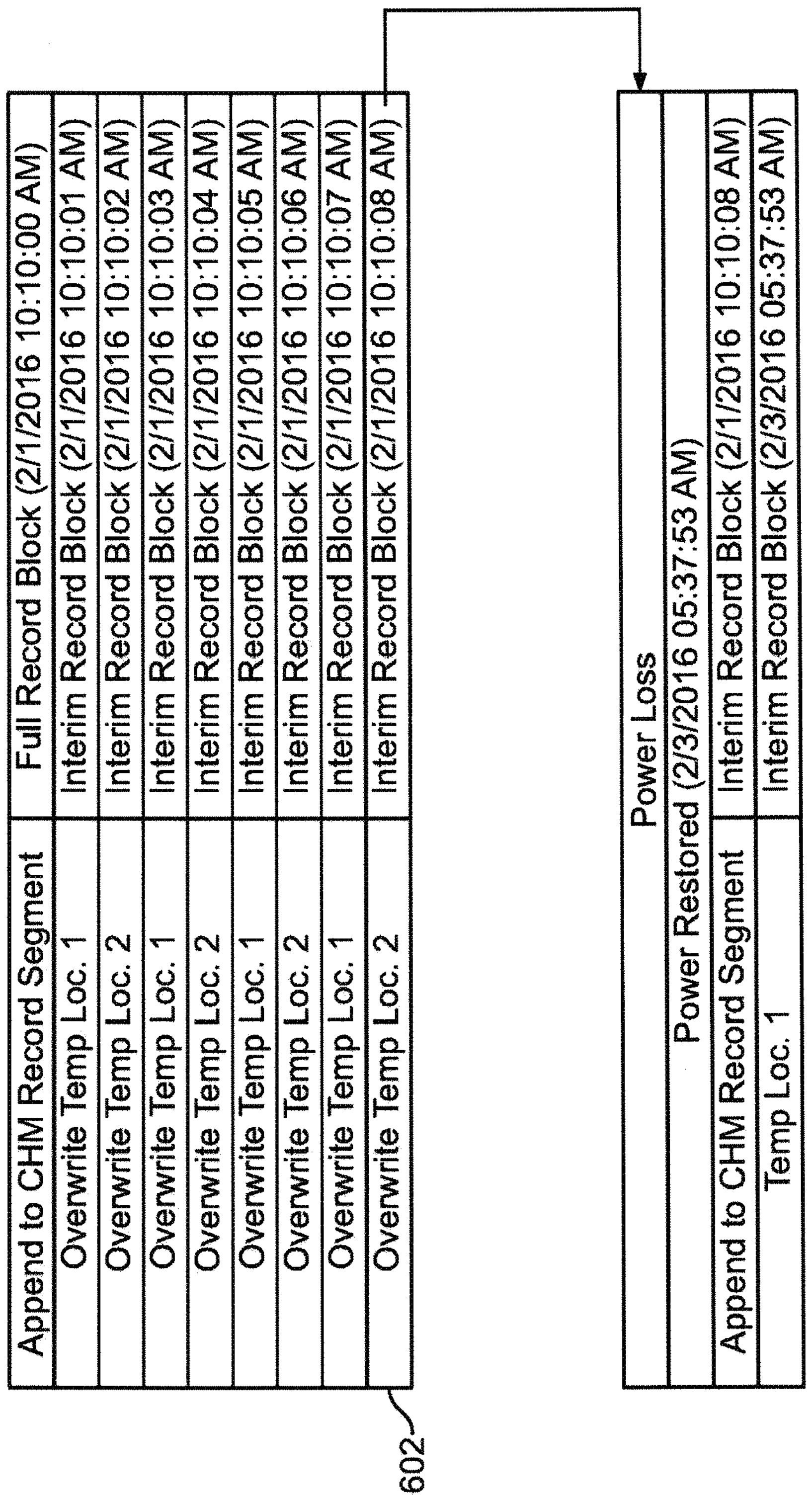
FIG. 6 is a diagram that illustrates exemplary interim record blocks in the crash hardened memory module prior to a power outage and after restoration of power in accordance with implementations of this disclosure.

FIG. 6 is a diagram that illustrates exemplary interim record blocks prior to a loss of power and after restoration of power to the data recorder 154, 254. When the interim record block stored in temporary location 2 at (2/1/2016 10:10:08 AM) 602 is valid, that interim record block is appended to the record segment 702 (FIG. 7) in the crash hardened memory module 118, 218, and/or the optional non-crash hardened removable storage device 219 of the data recorder 254 of FIG. 2, as shown in FIG. 7. When the interim record block stored in temporary location 2 at (2/1/2016 10:10:08 AM) is not valid, the interim record block in temporary location 1 at (2/1/2016 10:10:07 AM) is validated and, if valid, is appended to the record segment in the crash hardened memory module 118, 218, and/or the optional non-crash hardened removable storage device 219 of the data recorder 254 of FIG. 2.

Whenever any record block needs to be saved in crash hardened memory module 118, 218, and/or the optional non-crash hardened removable storage device 219 of the data recorder 254 of FIG. 2, the record segment is flushed to the disk immediately. Since the data recorder 154, 254 alternates between two different temporary storage locations when saving interim record blocks, there is always one temporary storage location that is not being modified or flushed to crash hardened memory or non-crash hardened removable storage device, thereby ensuring that at least one of the two interim record blocks stored in the temporary storage locations is valid and that the data recorder 154, 254 will not lose more than one second at most of data whenever the data recorder 154, 254 loses power. Similarly, when the data recorder 154, 254 is writing data to the crash hardened memory module 118, 218, and/or the optional non-crash hardened removable storage device 219 of the data recorder 254 of FIG. 2, every tenth of a second, the data recorder 154, 254 will not lose more than one tenth of a second at most of data whenever the data recorder 154, 254 loses power.

For simplicity of explanation, process 300 and process 400 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

A third embodiment of a real-time data acquisition and recording system and viewer described herein provides real-time, or near real-time, access to a wide range of data, such as event and operational data, video data, and audio data, of a high value asset to remotely located users such as asset owners, operators, and investigators. The data acquisition and recording system records data, via a data recorder, relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data recorder on the asset to request a download of specific data, to locate and transfer files, and to use a custom application to view the data. The system of the present disclosure retains typical recording capabilities and adds the ability to stream data to a remote data repository and remote end user prior to, during, and after an incident. In the vast majority of situations, the information recorded in the data recorder is redundant and not required as data has already been acquired and stored in the remote data repository.

Prior to the system of the present disclosure, data was extracted from the "black box" or "event recorder" after an incident had occurred and an investigation was required. Data files containing time segments recorded by the "black box" had to be downloaded and retrieved from the "black box" and then viewed by a user with proprietary software. The user would have to obtain physical or remote access to the asset, select the desired data to be downloaded from the "black box," download the file containing the desired information to a computing device, and locate the appropriate file with the desired data using a custom application that operates on the computing device. The system of the present disclosure has eliminated the need for the user to perform these steps, only requiring the user to use a common web browser to navigate to the desired data. The remotely located user may access a common web browser to navigate to desired data relating to a selected asset, or plurality of assets, to view and analyze the operational efficiency and safety of assets in real-time or near real-time.

The remotely located user, such as an asset owner, operator, and/or investigator, may access a common web browser to navigate to live and/or historic desired data relating to a selected asset to view and analyze the operational efficiency and safety of assets in real-time or near real-time. The ability to view operations in real-time, or near real-time, enables rapid evaluation and adjustment of behavior. During an incident, for example, real-time information and/or data can facilitate triaging the situation and provide valuable information to first responders. During normal operation, for example, near real-time information and/or data can be used to audit crew performance and to aid network wide situational awareness.

The real-time data acquisition and recording system of the third embodiment uses at least one of, or any combination of, an image measuring device, a video measuring device, and a range measuring device in, on, or in the vicinity of a mobile asset as part of a data acquisition and recording system. Image measuring devices and/or video measuring devices include, but are not limited to, 360 degrees cameras, fixed cameras, narrow view cameras, wide view cameras, 360 degrees fisheye view cameras, and/or other cameras. Range measuring devices include, but are not limited to, radar and light detection and ranging ("LIDAR"). LIDAR is a surveying method that measures distance to a target by illuminating the target with pulsed laser light and measuring the reflected pulses with a sensor. Prior to the system of the present disclosure, "black box" and/or "event recorders" did not include 360 degrees cameras or other cameras in, on, or in the vicinity of the mobile asset. The system of the present disclosure adds the ability to use and record videos using 360 degrees cameras, fixed cameras, narrow view cameras, wide view cameras, 360 degrees fisheye view cameras, radar, LIDAR, and/or other cameras as part of the data acquisition and recording system, providing 360 degrees views, narrow views, wide views, fisheye views, and/or other views in, on, or in the vicinity of the mobile asset to a remote data repository, remotely located users, and investigators prior to, during, and after an incident involving the mobile asset has occurred. The ability to view operations, 360 degrees video, and/or other videos in real-time, or near real-time, enables rapid evaluation and adjustment of crew behavior. Owners, operators, and investigators can view and analyze the operational efficiency, safety of people, vehicles, and infrastructures and can investigate or inspect an incident. The ability to view 360 degrees video and/or other videos from the mobile asset enables rapid evaluation and adjustment of crew behavior. During an incident, for example, 360 degrees video and/or other videos can facilitate triaging the situation and provide valuable information to first responders and investigators. During normal operation, for example, 360 degrees video and/or other videos can be used to audit crew performance and to aid network wide situational awareness. The 360 degrees cameras, fixed cameras, narrow view cameras, wide view cameras, 360 degrees fisheye view cameras, radar, LIDAR and/or other cameras provide a complete picture for situations to provide surveillance video for law enforcement and/or rail police, inspection of critical infrastructure, monitoring of railroad crossings, view track work progress, crew auditing both inside the cab and in the yard, and real-time remote surveillance.

Prior systems required users to download video files containing time segments in order to view the video files using a proprietary software application or other external video playback applications. The data acquisition and recording system of the present disclosure provides 360 degrees video, other video, image and audio information, and range measuring information that can be displayed to a remote user through the use of a virtual reality device and/or through a standard web client, thereby eliminating the need to download and use external applications to watch the videos. Additionally, remotely located users can view 360 degrees videos and/or other videos in various modes through the use of a virtual reality device or through a standard web client, such as a web browser, thereby eliminating the need to download and use external applications to watch the video. Prior video systems required the user to download video files containing time segments of data that were only viewable using proprietary application software or other external video playback applications which the user had to purchase separately.

Data may include, but is not limited to, video and image information from cameras located at various locations in, on, or in the vicinity of the asset and audio information from microphones located at various locations in, on, or in vicinity of the asset. A 360 degrees camera is a camera that provides a 360 degrees spherical field of view, a 360 degrees hemispherical field of view, and/or a 360 degrees fish eye field of view. Using 360 degrees cameras, fixed cameras, narrow view cameras, wide view cameras, 360 degrees fisheye view cameras, and/or other cameras in, on, or in the vicinity of an asset provides the ability to use and record video using the 360 degrees cameras, fixed cameras, narrow view cameras, wide view cameras, 360 degrees fisheye view cameras, and/or other cameras as part of DARS, thereby making the 360 degrees view and/or other views in, on, or in the vicinity of the asset available to a remote data repository, remotely located users, and investigators prior to, during, and after an incident.

Figure 8:
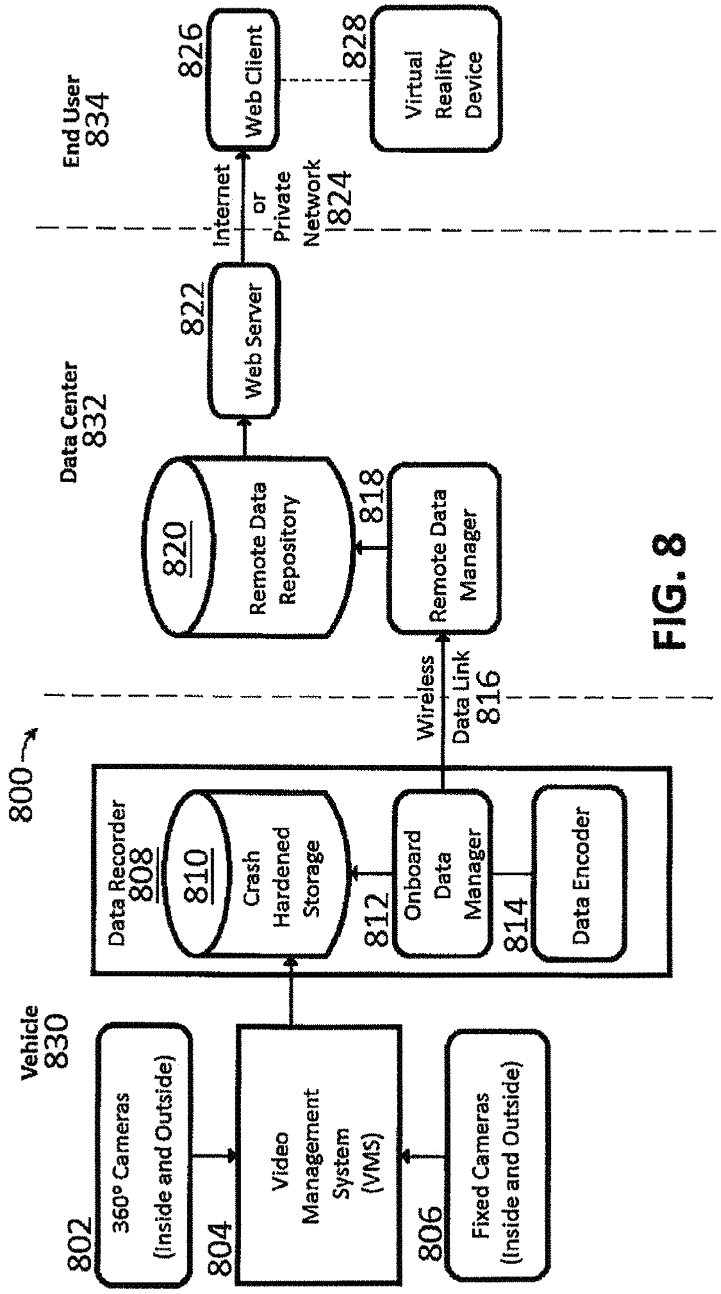
FIG. 8 illustrates a field implementation of a first embodiment of a real-time data acquisition and recording system viewer in accordance with implementations of this disclosure.

FIG. 8 illustrates a field implementation of the third embodiment of an exemplary real-time data acquisition and recording system (DARS) 800 in which aspects of the disclosure can be implemented. DARS 800 is a system that delivers real-time information, video information, and audio information from a data recorder 808 on a mobile asset 830 to remotely located end users via a data center 832. The data recorder 808 is installed on the vehicle or mobile asset 830 and communicates with any number of various information sources through any combination of wired and/or wireless data links such as a wireless gateway/router (not shown). The data recorder 808 comprises a crash hardened memory module 810, an onboard data manager 812, and a data encoder 814. In a fourth embodiment, the data recorder 808 can also include a non-crash hardened removable storage device (not shown). An exemplary hardened memory module 810 can be, for example, a crashworthy event recorder memory module that complies with the Code of Federal Regulations and/or the Federal Railroad Administration regulations, a crash survivable memory unit that complies with the Code of Federal Regulations and/or the Federal Aviation Administration regulations, a crash hardened memory module in compliance with any applicable Code of Federal Regulations, or any other suitable hardened memory device as is known in the art. The wired and/or wireless data links can include any one of or combination of discrete signal inputs, standard or proprietary Ethernet, serial connections, and wireless connections.

Data recorder 808 gathers video data, audio data, and other data and/or information from a wide variety of sources, which can vary based on the asset's configuration, through onboard data links. In this implementation, data recorder 808 receives data from a video management system 804 that continuously records video data and audio data from 360 degrees cameras, fixed cameras, narrow view cameras, wide view cameras, 360 degrees fisheye view cameras, radar, LIDAR, and/or other cameras 802 and fixed cameras 806 that are placed in, on, or in the vicinity of the asset 830 and the video management system 804 stores the video and audio data to the crash hardened memory module 810, and can also store the video and audio data in the non-crash hardened removable storage device of the fourth embodiment. Different versions of the video data are created using different bitrates or spatial resolutions and these versions are separated into segments of variable length, such as thumbnails, five minute low resolution segments, and five minute high resolution segments.

The data encoder 814 encodes at least a minimum set of data that is typically defined by a regulatory agency. The data encoder 814 receives video and audio data from the video management system 804 and compresses or encodes the data and time synchronizes the data in order to facilitate efficient real-time transmission and replication to a remote data repository 820. The data encoder 814 transmits the encoded data to the onboard data manager 812 which then sends the encoded video and audio data to the remote data repository 820 via a remote data manager 818 located in the data center 830 in response to an on-demand request by a remotely located user 834 or in response to certain operating conditions being observed onboard the asset 830. The onboard data manager 812 and the remote data manager 818 work in unison to manage the data replication process. The remote data manager 818 in the data center 832 can manage the replication of data from a plurality of assets. The video and audio data stored in the remote data repository 820 is available to a web server 822 for the remote located user 834 to access.

The onboard data manager 812 also sends data to a queueing repository (not shown). The onboard data manager 812 monitors the video and audio data stored in the crash hardened memory module 810, and/or the optional non-crash hardened removable storage device of the fourth embodiment, by the video management system 804 and determines whether it is in near real-time mode or real-time mode. In near real-time mode, the onboard data manager 812 stores the encoded data, including video data, audio data, and any other data or information, received from the data encoder 814 and any event information in the crash hardened memory module 810, and/or the optional non-crash hardened removable storage device of the fourth embodiment, and in the queueing repository. After five minutes of encoded data has accumulated in the queueing repository, the onboard data manager 812 stores the five minutes of encoded data to the remote data repository 820 via the remote data manager 818 in the data center 832 through a wireless data link 816. In real-time mode, the onboard data manager 812 stores the encoded data, including video data, audio data, and any other data or information, received from the data encoder 814 and any event information to the remote data repository 820 via the remote data manager 818 in the data center 832 through the wireless data link 816 every configurable predetermined time period, such as, for example, every second or every 0.10 seconds. The onboard data manager 812 and the remote data manager 818 can communicate over a variety of wireless communications links. Wireless data link 816 can be, for example, a wireless local area network (WLAN), wireless metropolitan area network (WMAN), wireless wide area network (WWAN), a private wireless system, a cellular telephone network or any other means of transferring data from the data recorder 808 to, in this example, the remote data manager 818. The process of sending and retrieving video data and audio data remotely from the asset 830 requires a wireless data connection between the asset 830 and the data center 832. When a wireless data connection is not available, the data is stored and queued in the crash hardened memory module 810, and/or the optional non-crash hardened removable storage device of the fourth embodiment, until wireless connectivity is restored. The video, audio, and any other additional data retrieval process resumes as soon as wireless connectivity is restored.

In parallel with data recording, the data recorder 808 continuously and autonomously replicates data to the remote data repository 820. The replication process has two modes, a real-time mode and a near real-time mode. In real-time mode, the data is replicated to the remote data repository 820 every second. In near real-time mode, the data is replicated to the remote data repository 820 every five minutes. The rates used for near real-time mode and real-time mode are is configurable and the rate used for real-time mode can be adjusted to support high resolution data by replicating data to the remote data repository 820 every 0.10 seconds. Near real-time mode is used during normal operation, under most conditions, in order to improve the efficiency of the data replication process.

Real-time mode can be initiated based on events occurring onboard the asset 830 or by a request initiated from the data center 832. A typical data center 832 initiated request for real-time mode is initiated when the remotely located user 834 has requested real-time information from a web client 826. A typical reason for real-time mode to originate onboard the asset 830 is the detection of an event or incident such as an operator initiating an emergency stop request, emergency braking activity, rapid acceleration or deceleration in any axis, or loss of input power to the data recorder 808. When transitioning from near real-time mode to real-time mode, all data not yet replicated to the remote data repository 820 is replicated and stored in the remote data repository 820 and then live replication is initiated. The transition between near real-time mode and real-time mode typically occurs in less than five seconds. After a predetermined amount of time has passed since the event or incident, a predetermined amount of time of inactivity, or when the user 834 no longer desires real-time information from the asset 830, the data recorder 808 reverts to near real-time mode. The predetermined amount of time required to initiate the transition is configurable and is typically set to ten minutes.

When the data recorder 808 is in real-time mode, the onboard data manager 812 attempts to continuously empty its queue to the remote data manager 818, storing the data to the crash hardened memory module 810, and/or the optional non-crash hardened removable storage device of the fourth embodiment, and sending the data to the remote data manager 818 simultaneously.

Upon receiving video data, audio data, and any other data or information to be replicated from the data recorder 808, the remote data manager 818 stores the data to the remote data repository 820 in the data center 830. The remote data repository 820 can be, for example, cloud-based data storage or any other suitable remote data storage. When data is received, a process is initiated that causes a data decoder (not shown) to decode the recently replicated data from the remote data repository 820 and send the decoded data to a remote event detector (not shown). The remote data manager 818 also stores vehicle event information in the remote data repository 820. When the remote event detector receives the decoded data, it processes the decoded data to determine if an event of interest is found in the decoded data. The decoded information is then used by the remote event detector to detect events, incidents, or other predefined situations, in the data occurring with the asset 830. Upon detecting an event of interest from the decoded data previously stored in the remote data repository 820, the remote event detector stores the event information and supporting data in the remote data repository 820.

Video data, audio data, and any other data or information is available to the user 834 in response to an on-demand request by the user 834 and/or is sent by the onboard data manager 812 to the remote data repository 820 in response to certain operating conditions being observed onboard the asset 830. Video data, audio data, and any other data or information stored in the remote data repository 820 is available from the web server 822 for the user 834 to access. The remotely located user 834 can access the video data, audio data, and any other data or information relating to the specific asset 830, or a plurality of assets, stored in the remote data repository 820 using the standard web client 826, such as a web browser, or a virtual reality device 828 which, in this implementation, can display thumbnail images of selected cameras. The web client 826 communicates the user's 834 request for video, audio, and/or other information to the web server 822 through a network 824 using common web standards, protocols, and techniques. Network 824 can be, for example, the Internet. Network 824 can also be a local area network (LAN), metropolitan area network (MAN), wide area network (WAN), virtual private network (VPN), a cellular telephone network or any other means of transferring data from the web server 822 to, in this example, the web client 826. The web server 822 requests the desired data from the remote data repository 820. The web server 822 then sends the requested data to the web client 826 that provides playback and real-time display of standard video, 360 degrees video, and/or other video. The web client 826 plays the video data, audio data, and any other data or information for the user 834 who can interact with the 360 degrees video data and/or other video data and/or still image data for viewing and analysis. The user 834 can also download the video data, audio data, and any other data or information using the web client 826 and can then use the virtual reality device 828 to interact with the 360 degrees video data for viewing and analysis.

Figure 11:
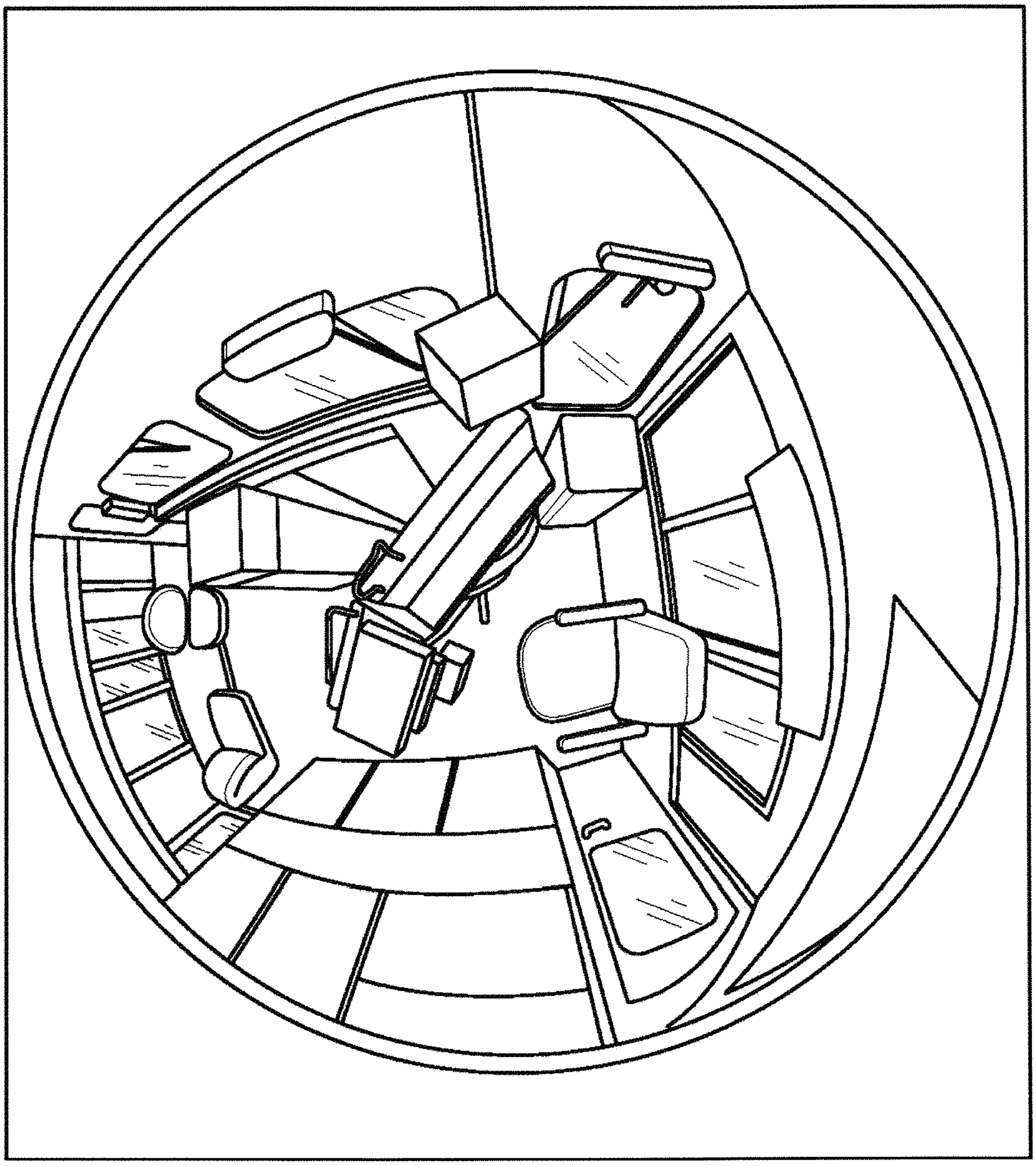
FIG. 11 is a flow diagram that illustrates an exemplary fisheye view of a 360 degrees camera of the real-time data acquisition and recording system viewer in accordance with implementations of this disclosure.
Figure 12:
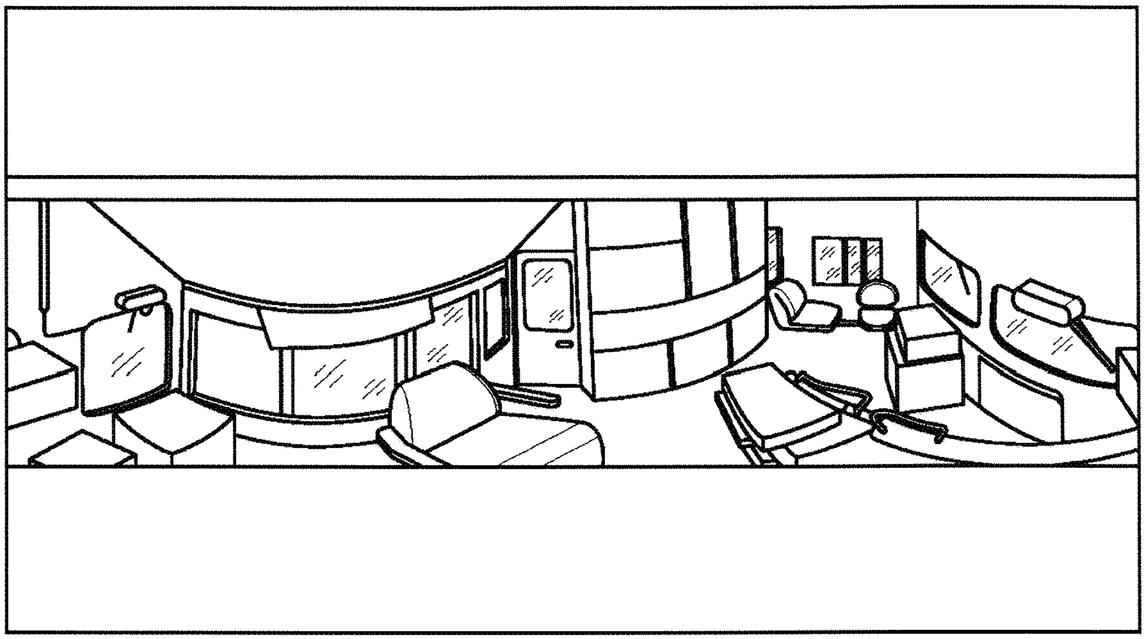
FIG. 12 is a diagram that illustrates an exemplary panorama view of the 360 degrees camera of the real-time data acquisition and recording system viewer in accordance with implementations of this disclosure.
Figure 13:
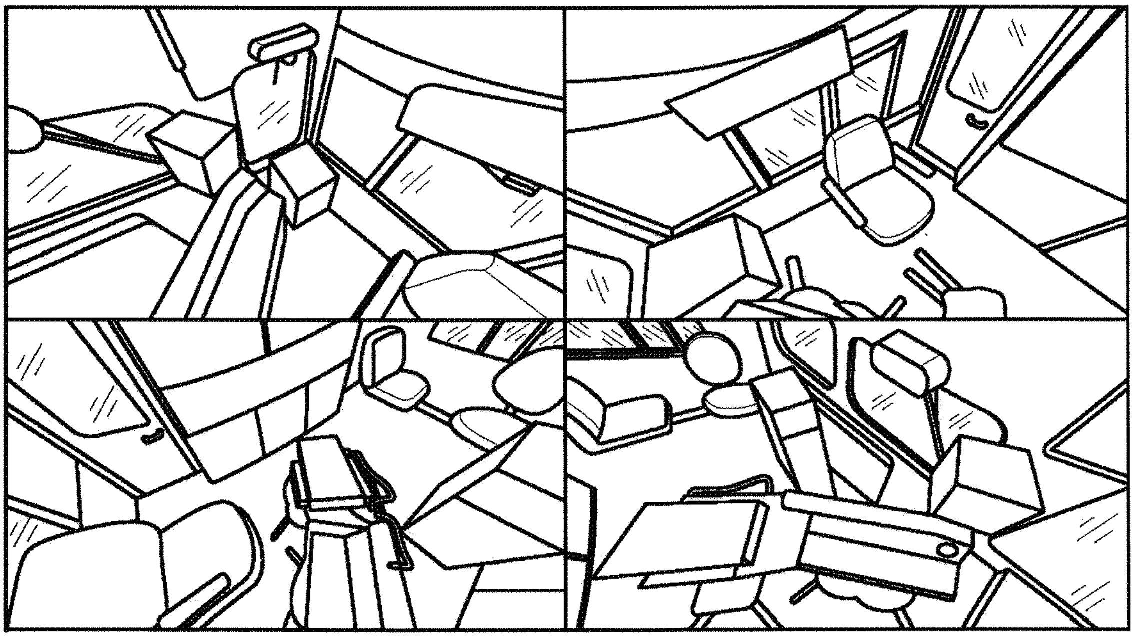
FIG. 13 is a diagram that illustrates an exemplary quad view of the 360 degrees camera of the real-time data acquisition and recording system viewer in accordance with implementations of this disclosure.
Figure 14:
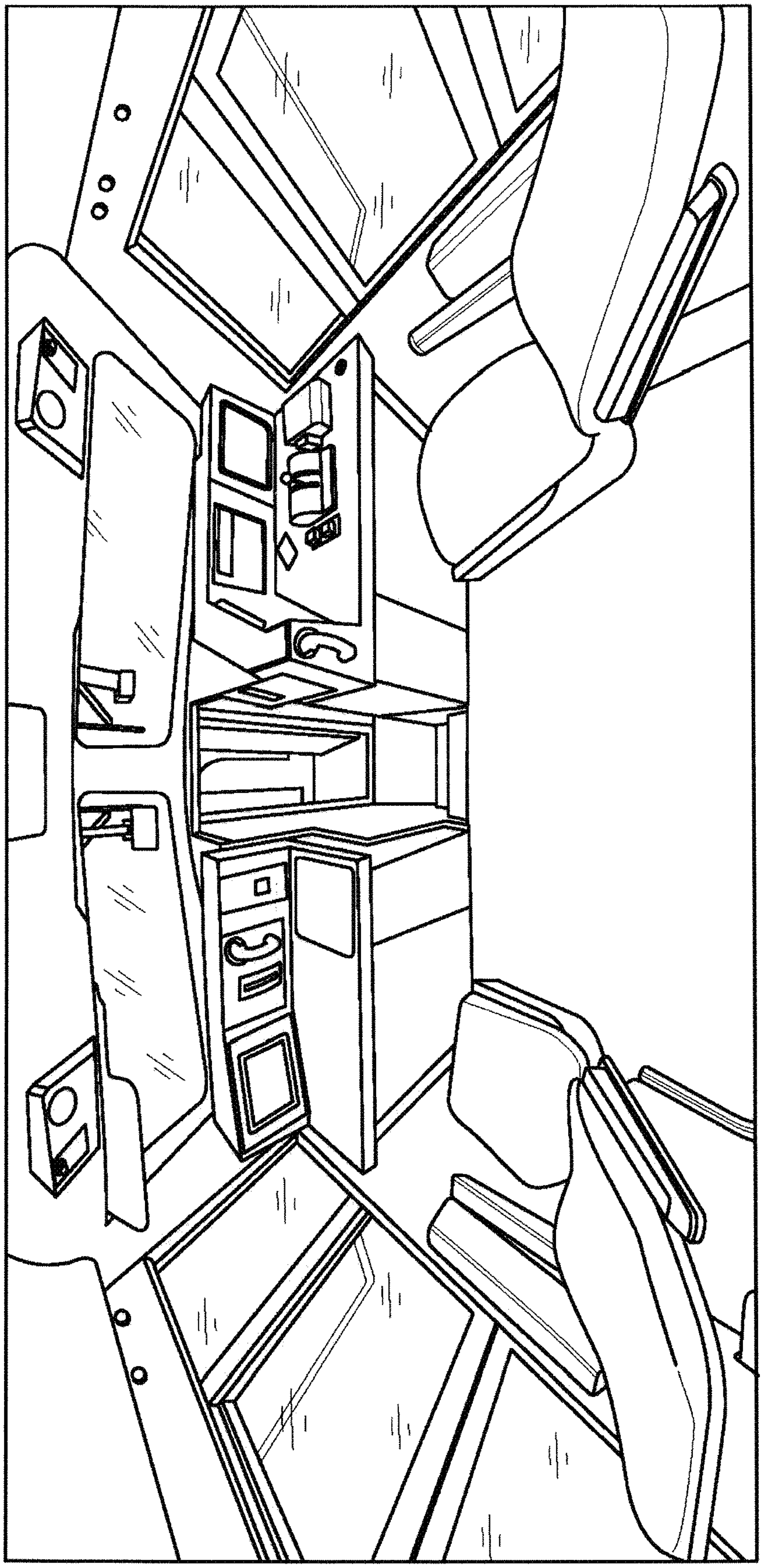
FIG. 14 is a diagram that illustrates an exemplary dewarped view of the 360 degrees camera of the real-time data acquisition and recording system viewer in accordance with implementations of this disclosure.

The web client 826 can be enhanced with a software application that provides the playback of 360 degrees video and/or other video in a variety of different modes. The user 834 can elect the mode in which the software application presents the video playback such as, for example, fisheye view as shown in FIG. 11, panorama view as shown in FIG. 12, double panorama view (not shown), quad view as shown in FIG. 13, and dewarped view as shown in FIG. 14.

Figure 9:
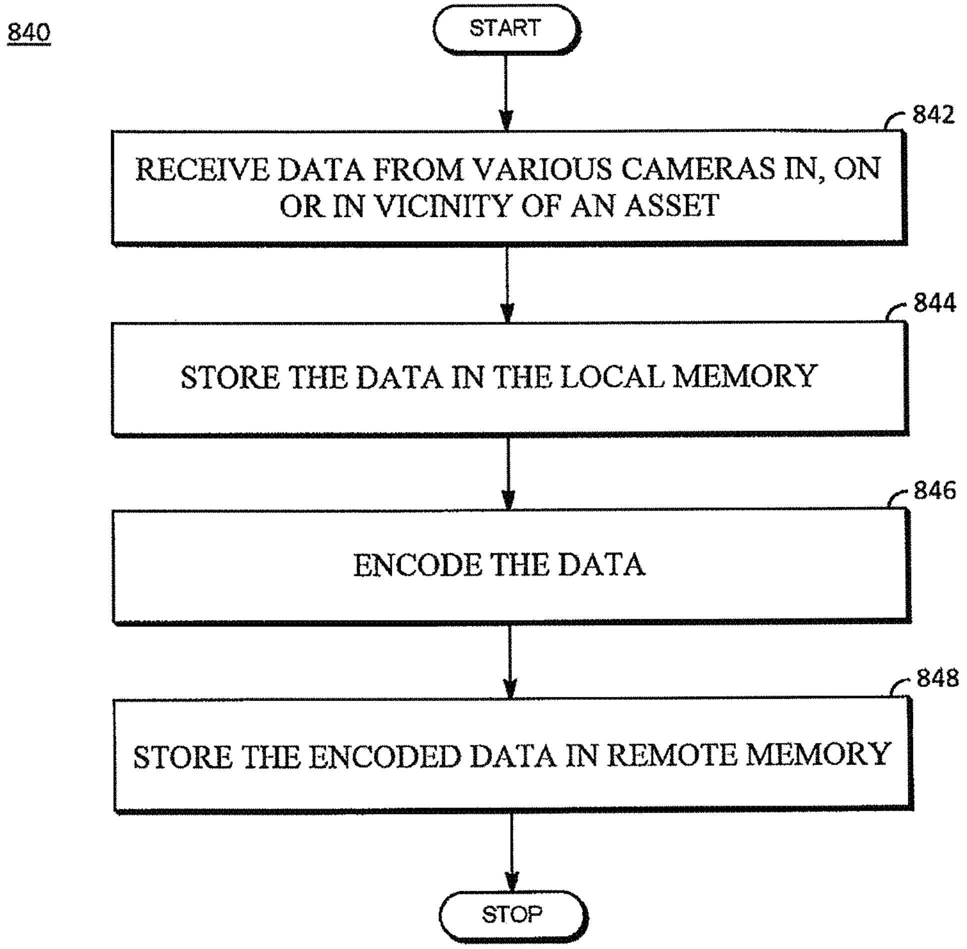
FIG. 9 is a flow diagram of a process for recording video data, audio data, and/or information from a mobile asset in accordance with implementations of this disclosure.

FIG. 9 is a flow diagram showing a process 840 for recording video data, audio data, and/or information from the asset 830 in accordance with an implementation of this disclosure. Video management system 804 receives data signals from various input components 842, such as the 360 degrees cameras, fixed cameras, narrow view cameras, wide view cameras, 360 degrees fisheye view cameras, radar, LIDAR and/or other cameras 802 and the fixed cameras 806 on, in, or in the vicinity of the asset 830. The video management system 804 then stores the video data, audio data, and/or information in the crash hardened memory module 810, and/or the optional non-crash hardened removable storage device of the fourth embodiment, 844 using any combination of industry standard formats, such as, for example, still images, thumbnails, still image sequences, or compressed video formats. Data encoder 814 creates a record that includes a structured series of bits used to configure and record the data signal information 846. In near real-time mode, the video management system 804 stores video data into the crash hardened memory module 810, and/or the optional non-crash hardened removable storage device of the fourth embodiment, while only sending limited video data, such as thumbnails or very short low resolution video segments, off-board to the remote data repository 820 848.

In another implementation, the encoded record is then sent to the onboard data manager 812 that sequentially combines a series of records in chronological order into record blocks that include up to five minutes of data. An interim record block includes less than five minutes of data while a full record block includes a full five minutes of data. Each record block includes all the data required to fully decode the included signals, including a data integrity check. At a minimum, a record block must start with a start record and end with an end record.

In order to ensure that all of the encoded signal data is saved to the crash hardened memory module 810, and/or the optional non-crash hardened removable storage device of the fourth embodiment, should the data recorder 808 lose power, the onboard data manager 812 stores interim record blocks in the crash hardened memory module 810, and/or the optional non-crash hardened removable storage device of the fourth embodiment, at a predetermined rate, where the predetermined rate is configurable and/or variable. Interim record blocks are saved at least once per second but can also be saved as frequently as once every tenth of a second. The rate at which interim record blocks are saved depends on the sampling rates of each signal. Every interim record block includes the full set of records since the last full record block. The data recorder 808 can alternate between two temporary storage locations in the crash hardened memory module 810 when recording each interim record block to prevent the corruption or loss of more than one second of data when the data recorder 808 loses power while storing data to the crash hardened memory module 810 and/or the optional non-crash hardened removable storage device of the fourth embodiment. Each time a new interim record block is saved to a temporary crash hardened memory location it will overwrite the existing previously stored interim record block in that location.

Every five minutes, in this implementation, when the data recorder 808 is in near real-time mode, the onboard data manager 812 stores a full record block including the last five minutes of encoded signal data into a record segment in the crash hardened memory module 810, and/or the optional non-crash hardened removable storage device of the fourth embodiment, and sends a copy of the full record block, comprising five minutes of video data, audio data, and/or information, to the remote data manager 818 to be stored in the remote data repository 820 for a predetermined retention period such as two years. The crash hardened memory module 810, and/or the optional non-crash hardened removable storage device of the fourth embodiment, stores a record segment of the most recent record blocks for a mandated storage duration, which in this implementation is the federally mandated duration that the data recorder 808 must store operational or video data in the crash hardened memory module 810 with an additional 24 hour buffer, and is then overwritten.

Figure 10:
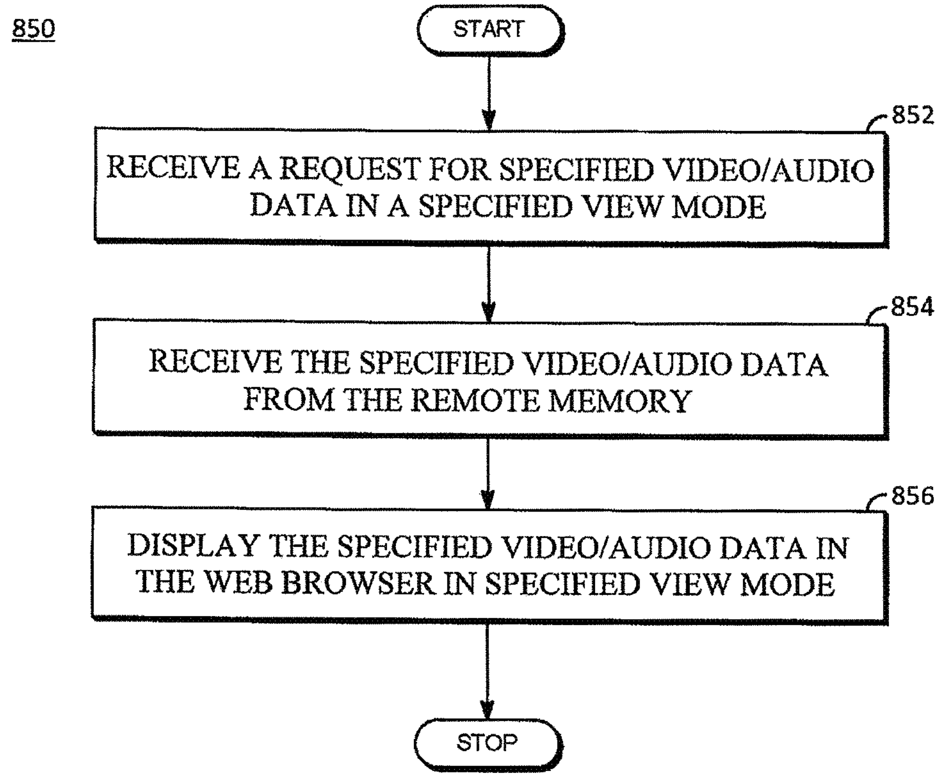
FIG. 10 is a flow diagram of a process for recording video data, audio data, and/or information from the mobile asset in accordance with implementations of this disclosure.

FIG. 10 is a flow diagram showing a process 850 for viewing data and/or information from the asset 830 through a web browser 826 or virtual reality device 828. When an event occurs or when the remotely located authorized user 834 requests a segment of video data stored in the crash hardened memory module 810 via the web client 826, the onboard data manager 812, depending on the event, will begin sending video data off-board in real-time at the best resolution available given the bandwidth of the wireless data link 816. The remotely located user 834 initiates a request for specific video and/or audio data in a specific view mode 852 through the web client 826, which communicates the request to the web server 822 through network 824. The web server 822 requests the specific video and/or audio data from the remote data repository 820 and sends the requested video and/or audio data to the web client 826 854 through the network 824. The web client 826 displays the video and/or audio data in the view mode specified by the user 834 856. The user 834 can then download the specific video and/or audio data to view on the virtual reality device 828. In another implementation, in real-time mode, thumbnails are sent first at one second intervals, then short segments of lower resolution videos, and then short segments of higher resolution videos.

For simplicity of explanation, process 840 and process 850 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

A fifth embodiment of a real-time data acquisition and recording system and video analytics system described herein provides real-time, or near real-time, access to a wide range of data, such as event and operational data, video data, and audio data, of a high value asset to remotely located users. The data acquisition and recording system records data relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset by streaming information to the remote data repository in real-time, or near real-time, and making information available at least up to the time of an incident or a catastrophic event. DARS performs video analysis of video data recorded of the mobile asset to determine, for example, cab occupancy, track detection, and/or detection of objects near tracks. The remotely located user may use a common web browser to navigate to and view desired data relating to a selected asset, or plurality of assets, and is not required to interact with the data acquisition and recording system on the asset to request a download of specific data, to locate or transfer files, and to use a custom application to view the data.

DARS provides remotely located users access to video data and video analysis performed by a video analytics system by streaming the data to the remote data repository and to the remotely located user prior to, during, and after an incident, thereby eliminating the need for a user to manually download, extract, and playback video to review the video data to determine cab occupancy, whether a crew member or unauthorized personnel was present during an incident, track detection, detection of objects near tracks, investigation, or at any other time of interest. Additionally, the video analytics system provides cab occupancy status determination, track detection, detection of objects near tracks, and lead and trail unit determination by processing image and video data in real-time, thereby ensuring that the correct data is always available to the user. For example, the real-time image processing ensures that a locomotive designated as the trail locomotive is not in lead service to enhance railroad safety. Prior systems provided a locomotive position within the train by using the train make-up functionality in dispatch systems. At times, the dispatch system information can be obsolete as the information is not updated in real-time and crew personnel can change the locomotive if deemed necessary.

Prior to the system of the present disclosure, inspection crews and/or asset personnel had to manually inspect track conditions, manually check if the vehicle was in the lead or trail position, manually survey the locations of each individual object of interest, manually create a database of geographic locations of all objects of interest, periodically perform manual field surveys of each object of interest to verify their location and identify any changes in geographic location that differs from the original survey, manually update the database when objects of interest change location due to repair or additional infrastructure development since the time when the original database was created, select and download desired data from a digital video recorder and/or data recorder and inspect the downloaded data and/or video offline and check tracks for any obstructions, and the vehicle operator had to physically check for any obstructions and/or switch changes. The system of the present disclosure has eliminated the need for users to perform these steps, only requiring the user to use a common web browser to navigate to the desired data. Asset owners and operators can automate and improve the efficiency and safety of mobile assets in real-time and can actively monitor the track conditions and get warning information in real-time. The system of the present disclosure also eliminates the need for asset owners and operators to download data from the data recorder in order to monitor track conditions and investigate incidents. As an active safety system, DARS can aid the operator to check for any obstructions, send alerts in real-time and/or save the information offline, and send alert information for remote monitoring and storage. Both current and past track detection information and/or information relating to detection of objects near tracks can be stored in the remote data repository in real-time to aid the user in viewing the information when required. The remotely located user may access a common web browser to navigate to desired data relating to a selected asset, or plurality of assets, to view and analyze the operational efficiency and safety of assets in real-time or near real-time.

The real-time data acquisition and recording system of the fifth embodiment can be used to continuously monitor objects of interest and identify in real-time when they have been moved or damaged, become obstructed by foliage, and/or are in disrepair and in need of maintenance. DARS utilizes video, image, and/or audio information to detect and identify various infrastructure objects, such as rail tracks, in the videos, has the ability to follow the tracks as the mobile asset progresses, and has the ability to create, audit against, and periodically update a database of objects of interest with the geographical location. The real-time data acquisition and recording system of the fifth embodiment uses at least one of, or any combination of, an image measuring device, a video measuring device, and a range measuring device in, on, or in the vicinity of a mobile asset as part of a data acquisition and recording system. Image measuring devices and/or video measuring devices include, but are not limited to, 360 degrees cameras, fixed cameras, narrow view cameras, wide view cameras, 360 degrees fisheye view cameras, and/or other cameras. Range measuring devices include, but are not limited to, radar and light detection and ranging ("LIDAR"). LIDAR is a surveying method that measures distance to a target by illuminating the target with pulsed laser light and measuring the reflected pulses with a sensor.

DARS can automatically inspect track conditions, such as counting the number of tracks present, identifying the current track the mobile asset is traveling on, and detecting any obstructions or defects present, such as ballast washed out, broken tracks, tracks out of gauge, misaligned switches, switch run-overs, flooding in the tracks, snow accumulations, etc., and plan for any preventive maintenance so as to avoid any catastrophic events. DARS can also detect rail track switches and follow track changes. DARS can further detect the change in the location of data including whether an object is missing, obstructed and/or not present at the expected location. Track detection, infrastructure diagnosing information, and/or infrastructure monitoring information can be displayed to a user through the use of any standard web client, such as a web browser, thereby eliminating the need to download files from the data recorder and use proprietary application software or other external applications to view the information as prior systems required. This process can be extended to automatically create, audit, and/or update a database with geographic locations of objects of interest and to ensure compliance with Federal Regulations. With the system of the present disclosure, cameras previously installed to comply with Federal Regulations are utilized to perform various tasks that previously required human interaction, specialized vehicles, and/or alternate equipment. DARS allows these tasks to be performed automatically as the mobile asset travels throughout the territory as part of normal revenue service and daily operation. DARS can be used to save countless person-hours of manual work by utilizing normal operations of vehicles and previously installed cameras to accomplish tasks which previously required manual effort. DARS can also perform tasks which previously have been performed using specialized vehicles, preventing closure of segments of track to inspect and locate track and objects of interest which often resulted in loss of revenue service and expensive equipment to purchase and maintain. DARS further reduces the amount of time humans are required to be located within the near vicinity of rail tracks, resulting in less overall accidents and potential loss of life.

Data may include, but is not limited to, measured analog and frequency parameters such as speed, pressure, temperature, current, voltage and acceleration that originates from the mobile assets and/or nearby mobile assets; measured Boolean data such as switch positions, actuator positions, warning light illumination, and actuator commands; position, speed and altitude information from a global positioning system (GPS) and additional data from a geographic information system (GIS) such as the latitude and longitude of various objects of interest; internally generated information such as the regulatory speed limit for the mobile asset given its current position; train control status and operational data generated by systems such as positive train control (PTC); vehicle and inertial parameters such as speed, acceleration, and location such as those received from the GPS; GIS data such as the latitude and longitude of various objects of interest; video and image information from at least one camera located at various locations in, on, or in the vicinity of the mobile asset; audio information from at least one microphone located at various locations in, on, or in the vicinity of the mobile asset; information about the operational plan for the mobile asset that is sent to the mobile asset from a data center such as route, schedule, and cargo manifest information; information about the environmental conditions, such as current and forecasted weather, of the area in which the mobile asset is currently operating in or is planned to operate in; and data derived from a combination of any of the above sources including additional data, video, and audio analysis and analytics.

"Track" may include, but is not limited to, the rails and ties of the railroads used for locomotive and/or train transportation. "Objects of interest" may include, but are not limited to, various objects of infrastructure installed and maintained within the nearby vicinity of railroad tracks which may be identified with the use of artificial intelligence, such as supervised learning or reinforcement learning, of asset camera images and video. Supervised learning and/or reinforcement learning utilizes previously labeled data sets defined as "training" data to allow remote and autonomous identification of objects within view of the camera in, on, or in the vicinity of the mobile asset. Supervised learning and/or reinforcement learning trains the neural network models to identify patterns occurring within the visual imagery obtained from the cameras. These patterns, such as people, crossing gates, cars, trees, signals, switches, etc., can be found in single images alone. Successive frames within a video can also be analyzed for patterns such as blinking signals, moving cars, people falling asleep, etc. DARS may or may not require human interaction at any stage of implementation including, but not limited to, labeling training data sets required for supervised learning and/or reinforcement learning. Objects of interest include, but are not limited to, tracks, track centerline points, milepost signs, signals, crossing gates, switches, crossings, and text based signs. "Video analytics" refers to any intelligible information gathered by analyzing videos and/or images recorded from the image measuring devices, video measuring devices, and/or range measuring devices, such as at least one camera, such as 360 degrees cameras, fixed cameras, narrow view cameras, wide view cameras, 360 degrees fisheye view cameras, radar, LIDAR, and/or other cameras, in, on, or in the vicinity of the mobile asset, including, but not limited to, objects of interest, geographic locations of objects, track obstructions, distances between objects of interest and the mobile asset, track misalignment, etc. The video analytics system can also be used in any mobile asset, dwelling area, space, or room containing a surveillance camera to enhance video surveillance. In mobile assets, the video analytics system provides autonomous cab occupied event detection to remotely located users economically and efficiently.

Figure 15:
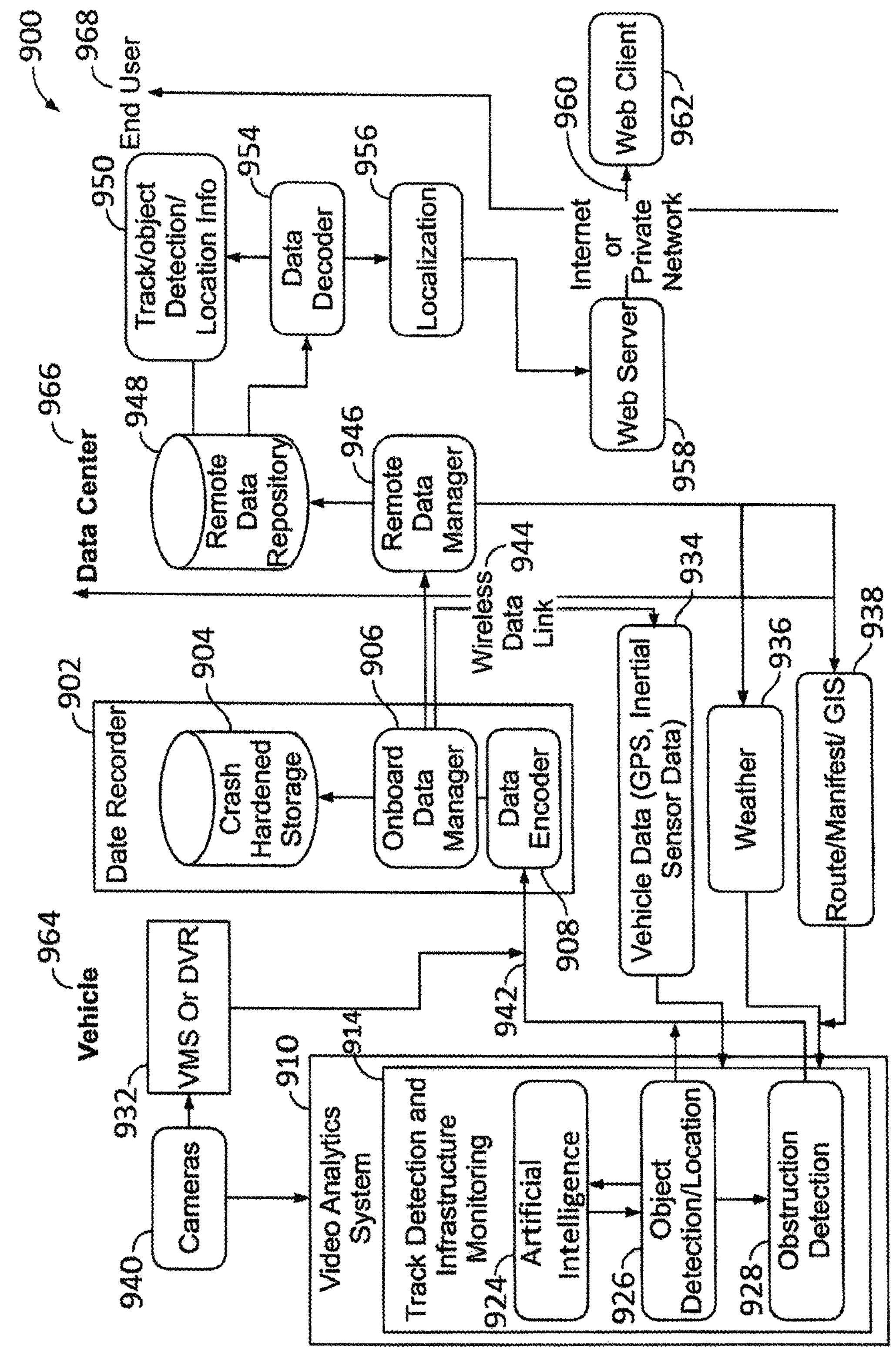
FIG. 15 illustrates a field implementation of a first embodiment of a data acquisition and recording system video content analysis system in accordance with implementations of this disclosure.

FIG. 15 illustrates a field implementation of the fifth embodiment of an exemplary real-time data acquisition and recording system (DARS) 900 in which aspects of the disclosure can be implemented. DARS 900 is a system that delivers real-time information, video information, and audio information from a data recorder 902 on a mobile asset 964 to remotely located end users 968 via a data center 966. The data recorder 902 is installed on the vehicle or mobile asset 964 and communicates with any number of various information sources through any combination of wired and/or wireless data links 942, such as a wireless gateway/router (not shown). Data recorder 902 gathers video data, audio data, and other data or information from a wide variety of sources, which can vary based on the asset's configuration, through onboard data links 942. The data recorder 902 comprises a local memory component, such as a crash hardened memory module 904, an onboard data manager 906, and a data encoder 908 in the asset 964. In a sixth embodiment, the data recorder 902 can also include a non-crash hardened removable storage device (not shown). An exemplary hardened memory module 904 can be, for example, a crashworthy event recorder memory module that complies with the Code of Federal Regulations and/or the Federal Railroad Administration regulations, a crash survivable memory unit that complies with the Code of Federal Regulations and/or the Federal Aviation Association regulations, a crash hardened memory module in compliance with any applicable Code of Federal Regulations, or any other suitable hardened memory device as is known in the art. The wired and/or wireless data links can include any one of or combination of discrete signal inputs, standard or proprietary Ethernet, serial connections, and wireless connections.

DARS 900 further comprises a video analytics system 910 that includes a track and/or object detection and infrastructure monitoring component 914. The track detection and infrastructure monitoring component 914 comprises an artificial intelligence component 924, such as a supervised learning and/or reinforcement learning component, or other neural network or artificial intelligence component, an object detection and location component 926, and an obstruction detection component 928 that detects obstructions present on or near the tracks and/or camera obstructions such as personnel blocking the camera's view. In this implementation, live video data is captured by at least one camera 940 mounted in the cab of the asset 964, on the asset 964, or in the vicinity of the asset 964. The cameras 940 are placed at an appropriate height and angle to capture video data in and around the asset 964 and obtain a sufficient amount of the view for further processing. The live video data and image data is captured in front of and/or around the asset 964 by the cameras 940 and is fed to the track and/or object detection and infrastructure monitoring component 914 for analysis. The track detection and infrastructure monitoring component 914 of the video analytics system 910 processes the live video and image data frame by frame to detect the presence of the rail tracks and any objects of interest. Camera position parameters such as height, angle, shift, focal length, and field of view can either be fed to the track and/or object detection and infrastructure monitoring component 914 or the cameras 940 can be configured to allow the video analytics system 910 to detect and determine the camera position and parameters.

To make a status determination, such as cab occupancy detection, the video analytics system 910 uses the supervised learning and/or reinforcement learning component 924, and/or other artificial intelligence and learning algorithms to evaluate, for example, video data from cameras 940, asset data 934 such as speed, GPS data, and inertial sensor data, weather component 936 data, and route/crew manifest data, and GIS component data 938. Cab occupancy detection is inherently susceptible to environmental noise sources such as light reflecting off clouds and sunlight passing through buildings and trees while the asset is moving. To handle environmental noise, the supervised learning and/or reinforcement learning component 924, the object detection and location component 926, the obstruction detection component, asset component 934 data that can include speed, GPS data, and inertial sensor data, weather component 936 data, and other learning algorithms are composed together to form internal and/or external status determinations involving the mobile asset 964. The track and/or object detection and infrastructure monitoring component 914 can also include a facial recognition system adapted to allow authorizing access to a locomotive as part of a locomotive security system in this illustrated exemplary implementation, a fatigue detection component adapted to monitor crew alertness, and activity detection component to detect unauthorized activities such as smoking.

Additionally, the video analytics system 910 may receive location information, including latitude and longitude coordinates, of a signal, such as a stop signal, traffic signal, speed limit signal, and/or object signal near the tracks, from the asset owner. The video analytics system 910 then determines whether the location information received from the asset owner is correct. If the location information is correct, the video analytics system 910 stores the information and will not recheck the location information again for a predetermined amount of time, such as checking the location information on a monthly basis. If the location information is not correct, the video analytics system 910 determines the correct location information and reports the correct location information to the asset owners, stores the location information, and will not recheck the location information again for a predetermined amount of time, such as checking the location information on a monthly basis. Storing the location information provides easier detection of a signal, such as a stop signal, traffic signal, speed limit signal, and/or object signals near the tracks.

Artificial intelligence, such as supervised learning and/or reinforcement learning, using the artificial intelligence component 924, of the tracks is performed by making use of various information obtained from consecutive frames of video and/or images and also using additional information received from the data center 966 and a vehicle data component 934 that includes inertial sensor data and GPS data to determine learned data. The object detection and location component 926 utilizes the learned data received from the supervised learning and/or reinforcement learning component 924 and specific information about the mobile asset 964 and railroad, such as, for example, track width and curvatures, ties positioning, and vehicle speed to differentiate the rail tracks, signs, signals, etc., from other objects to determine object detection data. The obstruction detection component 928 utilizes the object detection data received from the object detection and location component 926, such as information on obstructions present on or near the tracks and/or camera obstructions such as personnel blocking the cameras view, and additional information from a weather component 936, a route/crew manifest and GIS data component 938, and the vehicle data component 934 that includes inertial sensor data and GPS data to enhance accuracy and determine obstruction detection data. Mobile asset data from the vehicle data component 934 includes, but is not limited to, speed, location, acceleration, yaw/pitch rate, and rail crossings. Any additional information received and utilized from the data center 966 includes, but is not limited to, day and night details and geographic position of the mobile asset 964.

Infrastructure objects of interest, information processed by the track and/or object detection and infrastructure monitoring component 914, and diagnosis and monitoring information is sent to the data encoder 908 of the data recorder 902 via onboard data links 942 to encode the data. The data recorder 902 stores the encoded data in the crash hardened memory module 904, and optionally in the optional non-crash hardened removable storage device of the sixth embodiment, and sends the encoded information to a remote data manager 946 in the data center 966 via a wireless data link 944. The remote data manager 946 stores the encoded data in a remote data repository 948 in the data center 966.

To determine obstruction detection 928 or object detection 926, such as the presence of track in front of the asset, objects on and/or near the tracks, obstructions on or near the tracks, and/or obstructions blocking the cameras view 964, the vehicle analytics system 910 uses the supervised learning and/or reinforcement learning component 924, or other artificial intelligence, object detection and location component 926, and obstruction detection component 928, and other image processing algorithms to process and evaluate camera images and video data from cameras 940 in real-time. The track and/or object detection and infrastructure monitoring component 914 uses the processed video data along with asset component 934 data that can include speed, GPS data, and inertial sensor data, weather component 936 data, and route/crew manifest and GIS component 938 data, to determine the external status determinations, such as lead and trail mobile assets, in real-time. When processing image and video data for track and/or object detection, for example, the video analytics system 910 automatically configures the cameras 940 parameters needed for track detection, detects run through switches, counts the number of tracks, detects any additional tracks along the side of the asset 964, determines the track on which the asset 964 is currently running, detects the track geometry defects, detects track washout scenarios such as detecting water near the track within defined limits of the tracks, and detects missing slope or track scenarios. Object detection accuracy depends on the existing lighting condition in and around the asset 964. DARS 900 will handle the different lighting conditions with the aid of additional data collected from onboard the asset 964 and the data center 966. DARS 900 is enhanced to work in various lighting conditions, to work in various weather conditions, to detect more objects of interest, to integrate with existing database systems to create, audit, and update data automatically, to detect multiple tracks, to work consistently with curved tracks, to detect any obstructions, to detect any track defect that could possibly cause safety issues, and to work in low cost embedded systems.

The internal and/or external status determination from the video analytics system 910, such as cab occupancy; object detection and location, such as track detection and detection of objects near tracks; and obstruction detection, such as obstructions on or near the tracks and obstructions blocking the cameras, is provided to the data recorder 902, along with any data from a vehicle management system (VMS) or digital video recorder component 932, via onboard data links 942. The data recorder 902 stores the internal and/or external status determination, the object detection and location component 926 data, and the obstruction detection component 928 data in the crash hardened memory module 904, and optionally in the non-crash hardened removable storage device of the sixth embodiment, and the remote data repository 948 via the remote data manager 946 located in the data center 966. A web server 958 provides the internal and/or external status determination, the object detection and location component 926 information, and the obstruction detection component 928 information to a remotely located user 968 via a web client 962 upon request.

The data encoder 908 encodes at least a minimum set of data that is typically defined by a regulatory agency. The data encoder 908 receives video, image, and audio data from any of the cameras 940, the video analytics system 910, and the video management system 932 and compresses or encodes and time synchronizes the data in order to facilitate efficient real-time transmission and replication to the remote data repository 948. The data encoder 908 transmits the encoded data to the onboard data manager 906 which then sends the encoded video, image, and audio data to the remote data repository 948 via the remote data manager 946 located in the data center 966 in response to an on-demand request by the user 968 or in response to certain operating conditions being observed onboard the asset 964. The onboard data manager 906 and the remote data manager 946 work in unison to manage the data replication process. The remote data manager 946 in the data center 966 can manage the replication of data from a plurality of assets 964.

The onboard data manager 906 determines if the event detected, the internal and/or external status determination, object detection and location, and/or obstruction detection, should be queued or sent off immediately based on prioritization of the event detected. For example, in a normal operating situation, detecting an obstruction on the track is much more urgent than detecting whether someone is in the cab of the asset 964. The onboard data manager 906 also sends data to the queuing repository (not shown). In near real-time mode, the onboard data manager 906 stores the encoded data received from the data encoder 908 and any event information in the crash hardened memory module 904 and in the queueing repository. After five minutes of encoded data has accumulated in the queuing repository, the onboard data manager 906 stores the five minutes of encoded data to a remote data repository 948 via the remote data manager 946 in the data center 966 over the wireless data link 944. In real-time mode, the onboard data manager 906 stores the encoded data received from the data encoder 908 and any event information to the crash hardened memory module 904 and to the remote data repository 948 via the remote data manager 946 in the data center 966 over the wireless data link 944 every configurable predetermined time period, such as, for example, every second or every 0.10 seconds.

In this implementation, the onboard data manager 906 sends the video data, audio data, internal and/or external status determination, object detection and location information, obstruction detection information, and any other data or event information to the remote data repository 948 via the remote data manager 946 in the data center 966 through the wireless data link 944. Wireless data link 944 can be, for example, a wireless local area network (WLAN), wireless metropolitan area network (WMAN), wireless wide area network (WWAN), wireless virtual private network (WVPN), a cellular telephone network or any other means of transferring data from the data recorder 902 to, in this example, the remote data manager 946. The process of retrieving the data remotely from the asset 964 requires a wireless connection between the asset 964 and the data center 966. When a wireless data connection is not available, the data is stored and queued until wireless connectivity is restored.

In parallel with data recording, the data recorder 902 continuously and autonomously replicates data to the remote data repository 948. The replication process has two modes, a real-time mode and a near real-time mode. In real-time mode, the data is replicated to the remote data repository 948 every second. In near real-time mode, the data is replicated to the remote data repository 948 every five minutes. The rates used for near real-time mode and real-time mode are configurable and the rate used for real-time mode can be adjusted to support high resolution data by replicating data to the remote data repository 948 every 0.10 seconds. Near real-time mode is used during normal operation, under most conditions, in order to improve the efficiency of the data replication process.

Real-time mode can be initiated based on events occurring onboard the asset 964 or by a request initiated from the data center 966. A typical data center 966 initiated request for real-time mode is initiated when the remotely located user 968 has requested real-time information from the web client 962. A typical reason for real-time mode to originate onboard the asset 964 is the detection of an event or incident involving the asset 964 such as an operator initiating an emergency stop request, emergency braking activity, rapid acceleration or deceleration in any axis, or loss of input power to the data recorder 902. When transitioning from near real-time mode to real-time mode, all data not yet replicated to the remote data repository 948 is replicated and stored in the remote data repository 948 and then live replication is initiated. The transition between near real-time mode and real-time mode typically occurs in less than five seconds. After a predetermined amount of time has passed since the event or incident, predetermined amount of time of inactivity, or when the user 968 no longer desires real-time information from the asset 964, the data recorder 902 reverts to near real-time mode. The predetermined amount of time required to initiate the transition is configurable and is typically set to ten minutes.

When the data recorder 902 is in real-time mode, the onboard data manager 906 attempts to continuously empty its queue to the remote data manager 946, storing the data to the crash hardened memory module 940, and optionally to the optional non-crash hardened removable storage device of the sixth embodiment, and sending the data to the remote data manager 946 simultaneously.

Upon receiving video data, audio data, internal and/or external status determination, object detection and location information, obstruction detection information, and any other data or information to be replicated from the data recorder 902, the remote data manager 946 stores the data it receives from the onboard data manager 906, such as encoded data and detected event data, to the remote data repository 948 in the data center 966. The remote data repository 948 can be, for example, cloud-based data storage or any other suitable remote data storage. When data is received, a process is initiated that causes a data decoder 954 to decode the recently replicated data from the remote data repository 948 and send the decoded data to a track/object detection/location information component 950 that looks at the stored data for additional 'post-processed' events. The track/object detection/location information component 950 includes an object/obstruction detection component for determining internal and/or external status determinations, object detection and location information, and obstruction detection information, in this implementation. Upon detecting internal and/or external information, object detection and location information, and/or obstruction detection information, the track/object detection/location information component 950 stores the information in the remote data repository 948.

Figure 16A:
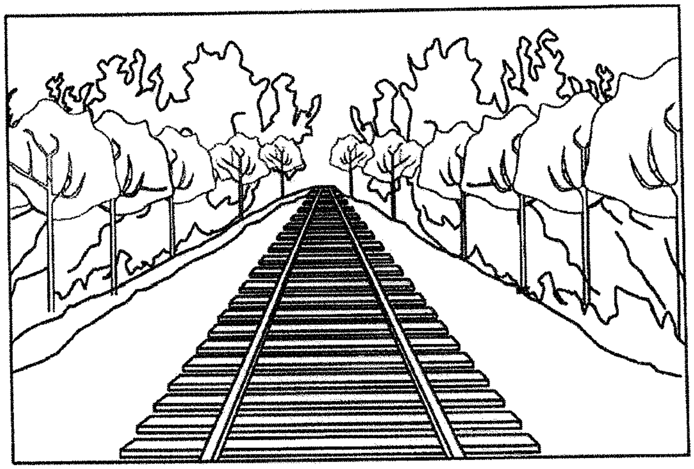
FIG. 16A is a diagram that illustrates exemplary track detection in accordance with implementations of this disclosure.
Figure 16B:
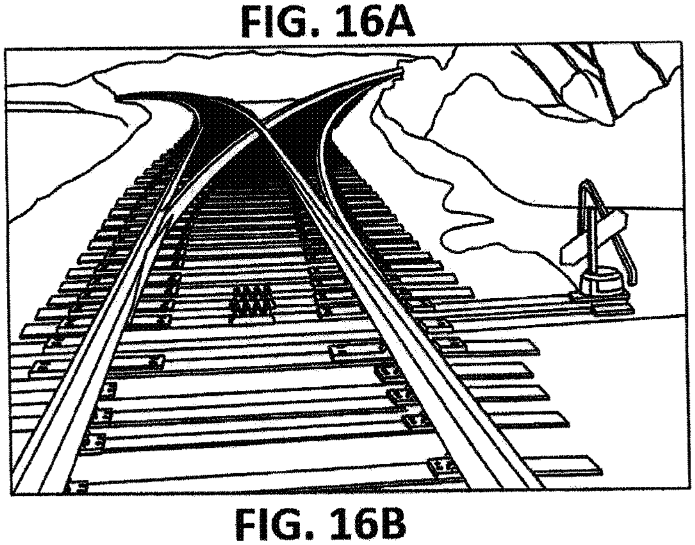
FIG. 16B is a diagram that illustrates exemplary track detection and switch detection in accordance with implementations of this disclosure.
Figure 16C:
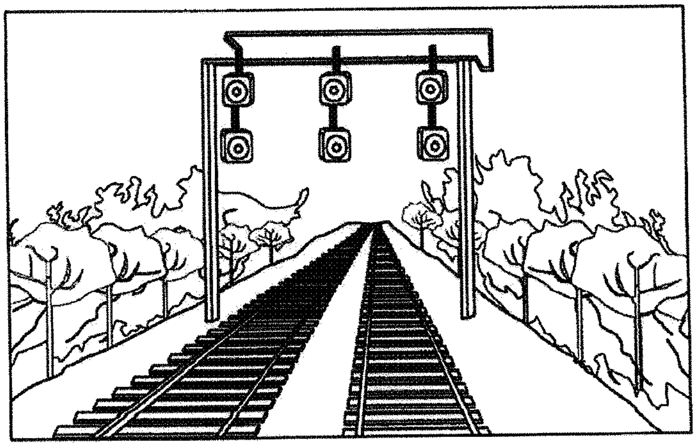
FIG. 16C is a diagram that illustrates exemplary track detection, count the number of tracks, and signal detection in accordance with implementations of this disclosure.
Figure 16D:
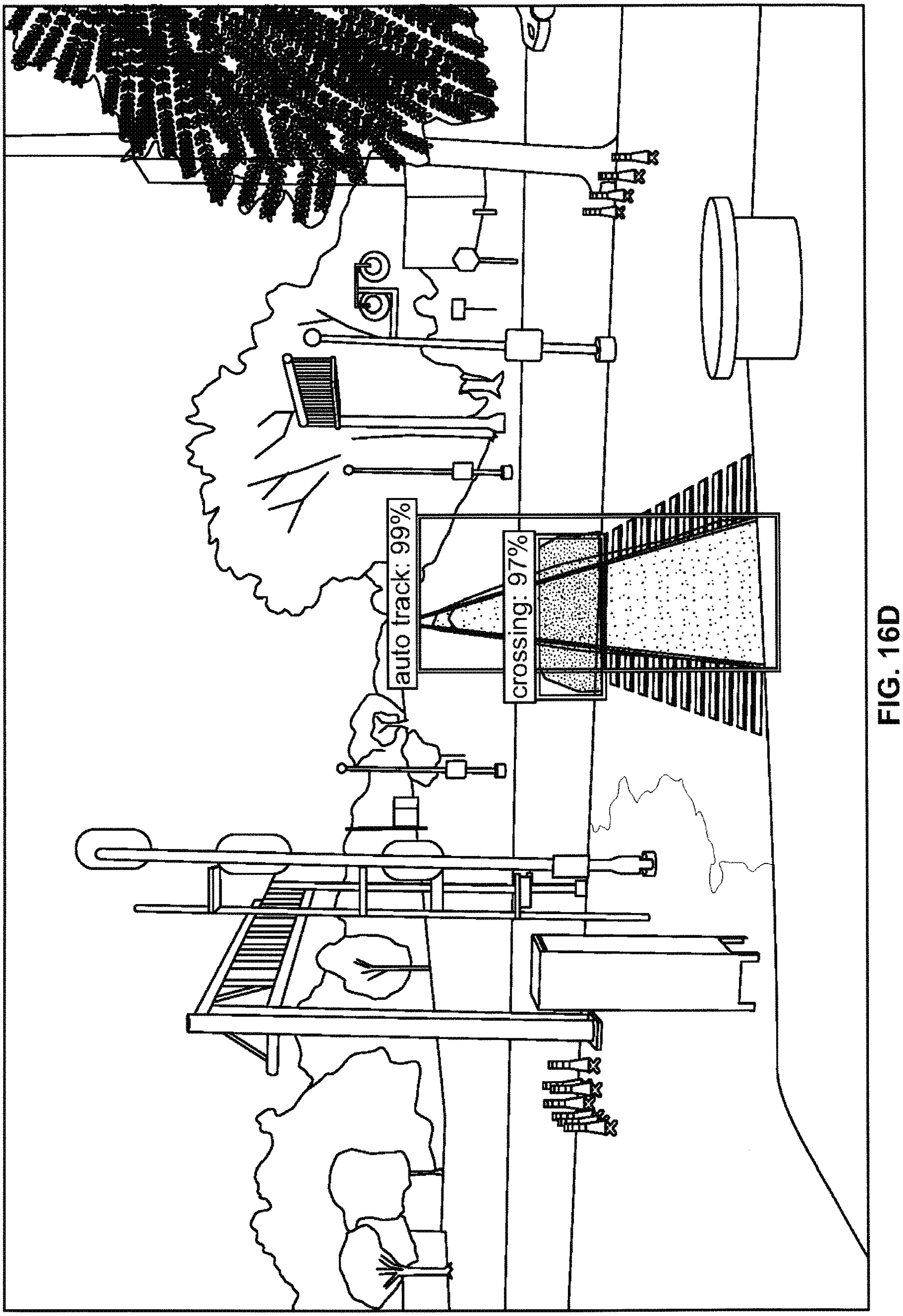
FIG. 16D is a diagram that illustrates exemplary crossing and track detection in accordance with implementations of this disclosure.
Figure 16E:
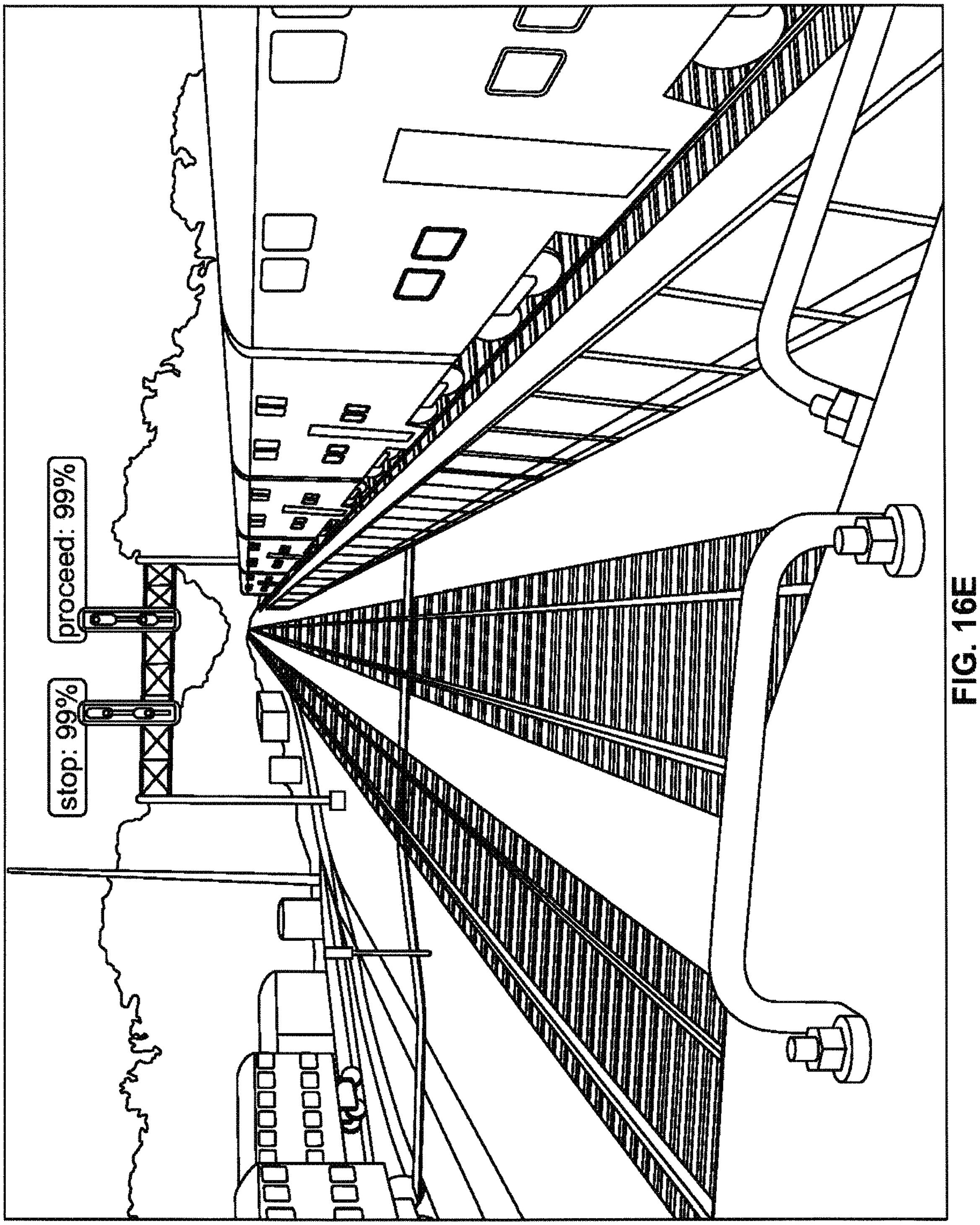
FIG. 16E is a diagram that illustrates exemplary dual overhead signal detection in accordance with implementations of this disclosure.
Figure 16F:
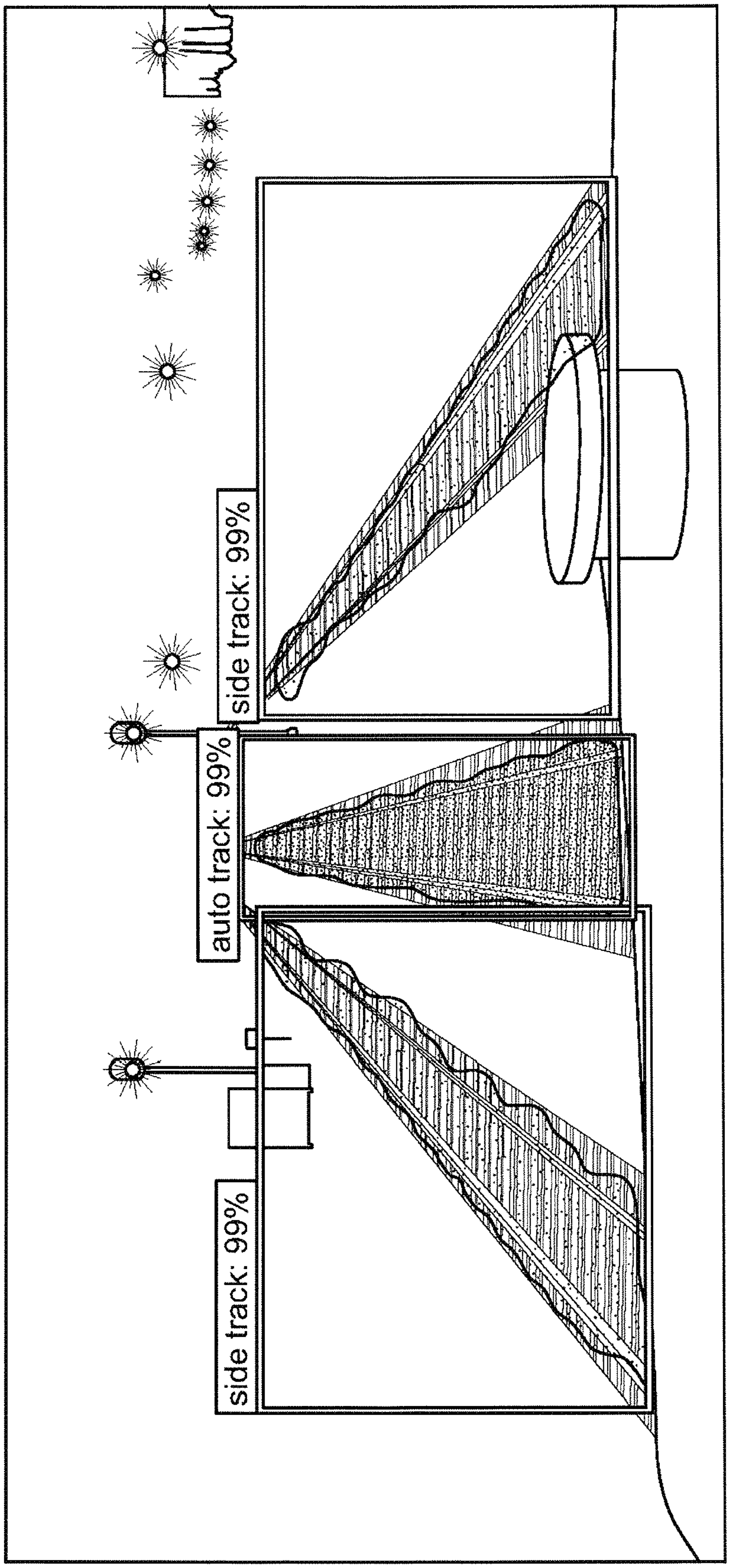
FIG. 16F is a diagram that illustrates exemplary multi-track detection in accordance with implementations of this disclosure.
Figure 16G:
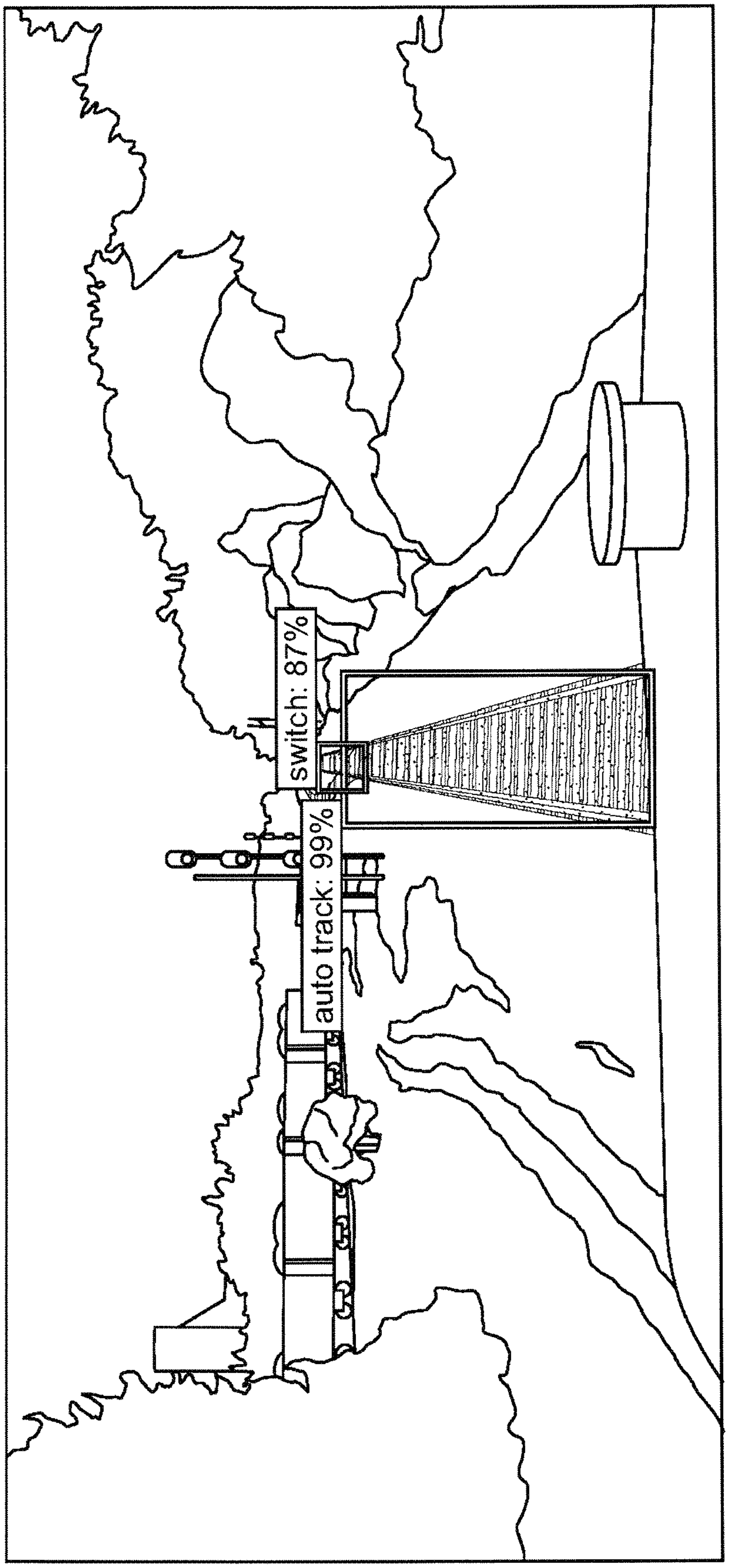
FIG. 16G is a diagram that illustrates exemplary switch and track detection in accordance with implementations of this disclosure.
Figure 16H:
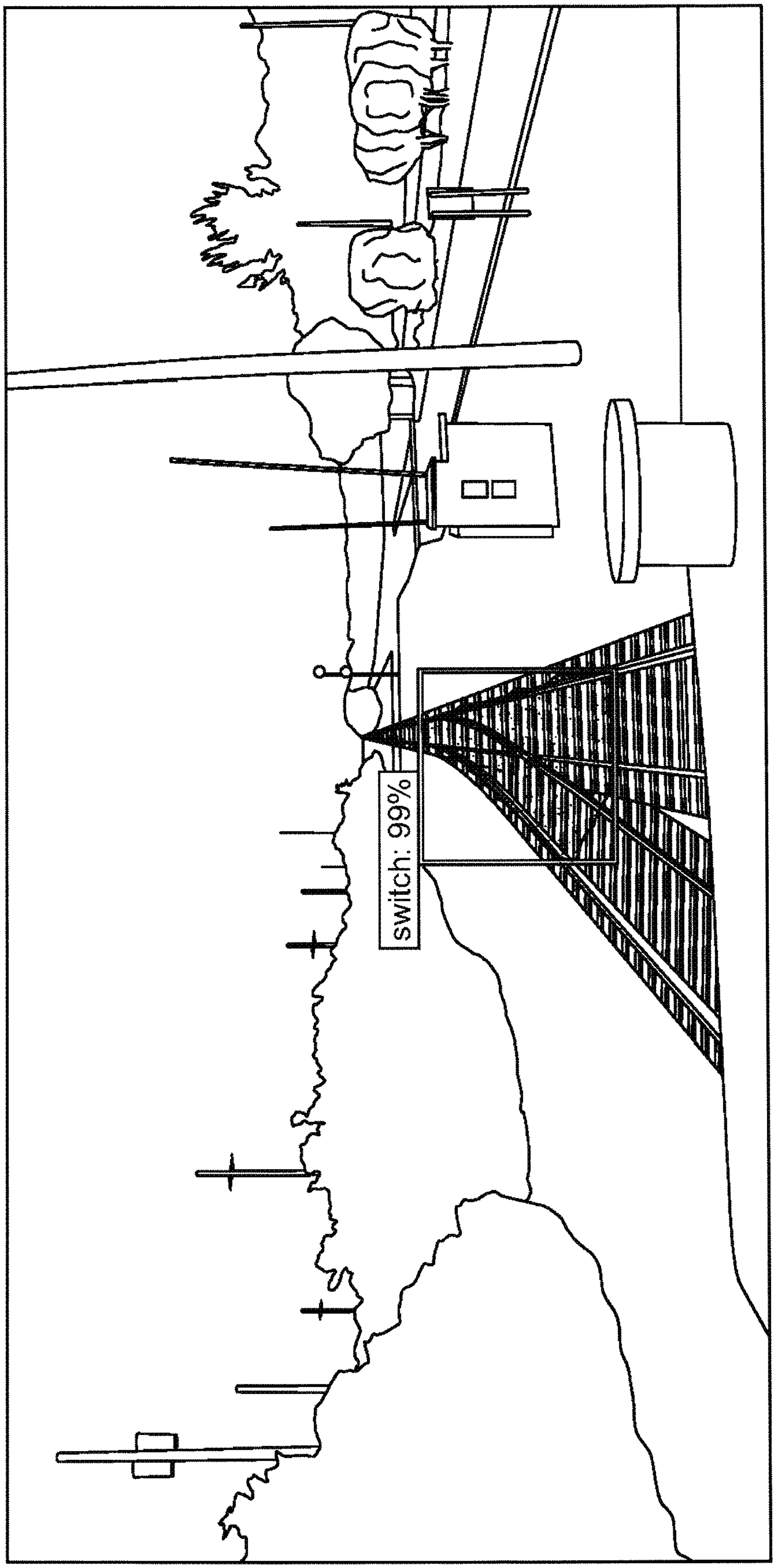
FIG. 16H is a diagram that illustrates exemplary switch detection in accordance with implementations of this disclosure.

The remotely located user 968 can access video data, audio data, internal and/or external status determination, object detection and location information, obstruction detection information, and any other information stored in the remote data repository 948, including track information, asset information, and cab occupancy information, relating to the specific asset 964, or a plurality of assets, using the standard web client 962, such as a web browser, or a virtual reality device (not shown), such as the virtual reality device 828 of FIG. 8, which, in this implementation, can display thumbnail images of selected cameras. The web client 962 communicates the user's 968 request for information to a web server 958 through a network 960 using common web standards, protocols, and techniques. Network 960 can be, for example, the Internet. Network 960 can also be a local area network (LAN), metropolitan area network (MAN), wide area network (WAN), virtual private network (VPN), a cellular telephone network or any other means of transferring data from the web server 958 to, in this example, the web client 962. The web server 958 requests the desired data from the remote data repository 948 and the data decoder 954 obtains the requested data relating to the specific asset 964 from the remote data repository 948 upon request from the web server 958. The data decoder 954 decodes the requested data and sends the decoded data to a localizer 956. The localizer 956 identifies the profile settings set by user 968 by accessing the web client 962 and uses the profile settings to prepare the information being sent to the web client 962 for presentation to the user 968, as the raw encoded data and detected track/object detection/location information is saved to the remote data repository 948 using coordinated universal time (UTC) and international system of units (SI units). The localizer 956 converts the decoded data into a format desired by the user 968, such as the user's 968 preferred unit of measure and language. The localizer 956 sends the localized data in the user's 968 preferred format to the web server 958 as requested. The web server 958 then sends the localized data to the web client 962 for viewing and analysis, providing playback and real-time display of standard video and 360 degrees video, along with the internal and/or external status determination, object detection and location information, and obstruction detection information, such as the track and/or object detection (FIG. 16A), track and switch detection (FIG. 16B), track and/or object detection, count the number of tracks, and signal detection (FIG. 16C), crossing and track and/or object detection (FIG. 16D), dual overhead signal detection (FIG. 16E), multi-track and/or multi-object detection (FIG. 16F), switch and track and/or object detection (FIG. 16G), and switch detection (FIG. 16H).

The web client 962 is enhanced with a software application that provides the playback of 360 degrees video and/or other video in a variety of different modes. The user 968 can elect the mode in which the software application presents the video playback, such as, for example, fisheye view, dewarped view, panorama view, double panorama view, and quad view.

Figure 17:
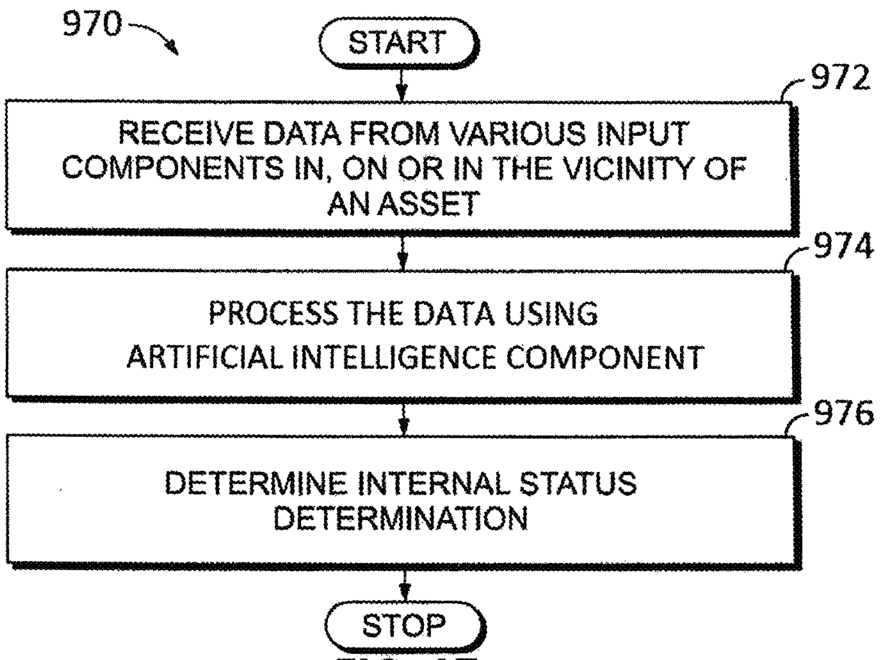
FIG. 17 is a flow diagram of a process for determining an internal status of the mobile asset in accordance with implementations of this disclosure.

FIG. 17 is a flow diagram showing a process 970 for determining an internal status of the asset 964 in accordance with an implementation of this disclosure. The video analytics system 910 receives data signals from various input components 972, such as cameras 940, including, but not limited to, 360 degrees cameras, fixed cameras, narrow view cameras, wide view cameras, 360 degrees fisheye view cameras, radar, LIDAR, and/or other cameras, on, in, or in the vicinity of the asset 964, vehicle data component 934, weather component 936, and route/manifest/GIS component 938. The video analytics system 910 processes the data signals using supervised learning and/or reinforcement learning component 974 and determines an internal status 976 such as cab occupancy.

Figure 18:
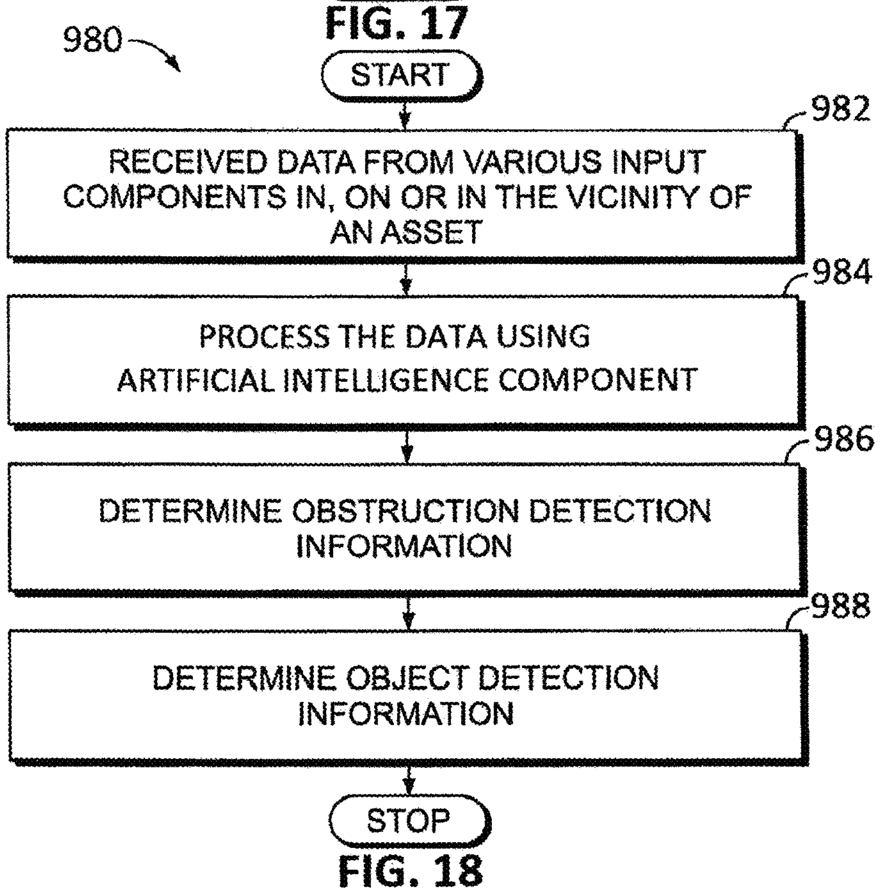
FIG. 18 is a flow diagram of a process for determining object detection and obstruction detection occurring externally to the mobile asset in accordance with implementations of this disclosure.

FIG. 18 is a flow diagram showing a process 980 for determining object detection/location and obstruction detection occurring externally and internally to the asset 964 in accordance with an implementation of this disclosure. The video analytics system 910 receives data signals from various input components 982, such as cameras 940, including, but not limited to, 360 degrees cameras, fixed cameras, narrow view cameras, wide view cameras, 360 degrees fisheye view cameras, radar, LIDAR, and/or other cameras, on, in or in vicinity of the asset 964, vehicle data component 934, weather component 936, and route/manifest/GIS component 938. The video analytics system 910 processes the data signals using the supervised learning and/or reinforcement learning component 924, the object detection/location component 926, and the obstruction detection component 928 984 and determines obstruction detection 986 and object detection and location 988 such as track presence.

For simplicity of explanation, process 970 and process 980 are depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

A real-time data acquisition and recording data sharing system works in conjunction with a real-time data acquisition and recording system, such as, for example, DARS 100, 200, and a viewer which provides real-time, or near real-time, access to a wide range of data, such as event and operational data, video data, and audio data, of a high value asset, such as a locomotive for example, to remotely located users such as asset owners, operators, and investigators. The data acquisition and recording system records data relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data acquisition and recording system on the asset to request a download of specific data, to locate and transfer files, and to use a custom application to view the data. The real-time data acquisition and recording system retains typical recording capability and adds the ability to stream data to a remote data repository and remotely located end users prior to, during, and after an incident.

A remotely located user, such as an asset owner, operator, and/or investigator, may access a common web browser to navigate to live and/or historic desired data relating to a selected asset to view and analyze the operational efficiency and safety of assets in real-time or near real-time. The ability to view operations in real-time, or near real-time, enables rapid evaluation and adjustment of behavior. During an incident, for example, real-time information and/or data can facilitate triaging the situation and provide valuable information to first responders. During normal operation, for example, near real-time information and/or data can be used to audit crew performance and to aid network wide situational awareness.

The remotely located user may access a common web browser to use the viewer and navigate to desired data relating to a selected asset, or plurality of assets, to view and analyze the operational efficiency and safety of assets in real-time or near real-time. The viewer provides the ability to view operations and/or video, including, but not limited to, 360 degrees video, in real-time, or near real-time, which enables rapid evaluation and adjustment of crew behavior. Owners, operators, and investigators can view and analyze the operational efficiency, safety of people, vehicles, and infrastructure and can investigate or inspect an incident. During an incident, for example, 360 degrees video can facilitate triaging the situation and provide valuable information to first responders and investigators. During normal operation, for example, 360 degrees video can be used to audit crew performance and to aid network wide situational awareness. Additionally, remotely located users can view 360 degrees videos with the viewer in various modes through the use of a virtual reality device or through a standard web client, such as a web browser, thereby eliminating the need to download and use external applications to watch the video.

The data sharing system allows the user to share data obtained from the data acquisition and recording system to remotely located users. The user can share data with remote recipient end users that have internet access and a modern web browser in a secure, controlled, tracked, and audited way. The user, instead of sharing files, shares a URL to the data. URL based data sharing enables the user to control, track, and audit sensitive data. The user will be able to share data to improve the safety of the world's transportation systems without fear of unauthorized data dissemination. The data can be shared by investigators with remotely located users, using the web client, without the need to locate and download the "black box."

Data may include, but is not limited to, analog and frequency parameters such as speed, pressure, temperature, current, voltage, and acceleration which originate from the asset and/or nearby assets; Boolean data such as switch positions, actuator position, warning light illumination, and actuator commands; global positioning system (GPS) data and/or geographic information system (GIS) data such as position, speed, and altitude; internally generated information such as the regulatory speed limit for an asset given its current position; video and image information from cameras located at various locations in, on, or in the vicinity of the asset; audio information from microphones located at various locations in, on, or in vicinity of the asset; information about the operational plan for the asset that is sent to the asset from a data center such as route, schedule, and cargo manifest information; information about the environmental conditions, including current and forecasted weather conditions, of the area in which the asset is currently operating in or is planned to operate in; asset control status and operational data generated by systems such as positive train control (PTC) in locomotives; and data derived from a combination of any of the above including, but not limited to, additional data, video, and audio analysis and analytics.

FIGS. 1 and 2 illustrate a field implementation of the first embodiment and the second embodiment, respectively, of the exemplary real-time data acquisition and recording system (DARS) 100, 200 in which aspects of the disclosure can be implemented. DARS 100, 200 includes the data recorder 154, 254 that is installed on the vehicle or mobile asset 148, 248 and communicates with any number of various information sources through any combination of onboard wired and/or wireless data links 170, 270, such as a wireless gateway/router, or off-board information sources via the data center 150, 250 of DARS 100, 200 via data links such as wireless data links 146. Data recorder 154, 254 comprises the onboard data manager 120, 220, the data encoder 122, 222, the vehicle event detector 156, 256, the queueing repository 158, 258, and the wireless gateway/router 172, 272. Additionally, in this implementation, data recorder 154, 254 can include the crash hardened memory module 118, 218 and/or the Ethernet switch 162, 262 with or without power over Ethernet (POE). The exemplary hardened memory module 118, 218 can be, for example, a crashworthy event recorder memory module that complies with the Code of Federal Regulations and/or the Federal Railroad Administration regulations, a crash survivable memory unit that complies with the Code of Federal Regulations and/or the Federal Aviation Administration regulations, a crash hardened memory module in compliance with any applicable Code of Federal Regulations, or any other suitable hardened memory device as is known in the art. In the second embodiment, shown in FIG. 2, the data recorder 254 can further include the optional non-crash hardened removable storage device 219.

The wired and/or wireless data links 170, 270 can include any one of or combination of discrete signal inputs, standard or proprietary Ethernet, serial connections, and wireless connections. Ethernet connected devices may utilize the data recorder's 154, 254 Ethernet switch 162, 262 and can utilize POE. Ethernet switch 162, 262 may be internal or external and may support POE. Additionally, data from remote data sources, such as the map component 164, 264, the route/crew manifest component 124, 224, and the weather component 126, 226 in the implementation of FIGS. 1 and 2, is available to the onboard data manager 120, 220 and the vehicle event detector 156, 256 from the data center 150, 250 through the wireless data link 146, 246 and the wireless gateway/router 172, 272.

Data recorder 154, 254 gathers data or information from a wide variety of sources, which can vary widely based on the asset's configuration, through onboard data links 170, 270. The data encoder 122, 222 encodes at least a minimum set of data that is typically defined by a regulatory agency. In this implementation, the data encoder 122, 222 receives data from a wide variety of asset 148, 248 sources and data center 150, 250 sources. Information sources can include any number of components in the asset 148, 248, such as any of analog inputs 102, 202, digital inputs 104, 204, I/O module 106, 206, vehicle controller 108, 208, engine controller 110, 210, inertial sensors 112, 212, global positioning system (GPS) 114, 214, cameras 116, 216, positive train control (PTC)/signal data 166, 266, fuel data 168, 268, cellular transmission detectors (not shown), internally driven data and any additional data signals, and any number of components in the data center 150, 250, such as any of the route/crew manifest component 124, 224, the weather component 126, 226, the map component 164, 264, and any additional data signals. The cameras 116, 216, or image measuring devices and/or video measuring devices, include, but are not limited to, 360 degrees cameras, fixed cameras, narrow view cameras, wide view cameras, 360 degrees fisheye view cameras, and/or other cameras inside and outside the asset 148. The data encoder 122, 222 compresses or encodes the data and time synchronizes the data in order to facilitate efficient real-time transmission and replication to the remote data repository 130, 230. The data encoder 122, 222 transmits the encoded data to the onboard data manager 120, 220 which then saves the encoded data in the crash hardened memory module 118, 218 and the queuing repository 158, 258 for replication to the remote data repository 130, 230 via the remote data manager 132, 232 located in the data center 150, 250. Optionally, the onboard data manager 120, 220 can also save a tertiary copy of the encoded data in the non-crash hardened removable storage device 219 of the second embodiment shown in FIG. 2. The onboard data manager 120, 220 and the remote data manager 132, 232 work in unison to manage the data replication process. A single remote data manager 132, 232 in the data center 150, 250 can manage the replication of data from a plurality of assets 148, 248.

The data from the various input components and data from the in-cab audio/graphical user interface (GUI) 160, 260 are sent to the vehicle event detector 156, 256. The vehicle event detector 156, 256 processes the data to determine whether an event, incident, or other predefined situation involving the asset 148, 248 has occurred. When the vehicle event detector 156, 256 detects signals that indicate a predefined event occurred, the vehicle event detector 156, 256 sends the processed data that a predefined event occurred, along with supporting data surrounding the predefined event, to the onboard data manager 120, 220. The vehicle event detector 156, 256 detects events based on data from a wide variety of sources, such as the analog inputs 102, 202, the digital inputs 104, 204, the I/O module 106, 206, the vehicle controller 108, 208, the engine controller 110, 210, the inertial sensors 112, 212, the GPS 114, 214, the cameras 116, 216, the route/crew manifest component 124, 224, the weather component 126, 226, the map component 164, 264, the PTC/signal data 166, 266, and the fuel data 168, 268, which can vary based on the asset's configuration. When the vehicle event detector 156, 256 detects an event, the detected asset event information is stored in the queuing repository 158, 258 and can optionally be presented to the crew of the asset 148, 248 via the in-cab audio/graphical user interface (GUI) 160, 260.

The onboard data manager 120, 220 also sends data to the queuing repository 158. In near real-time mode, the onboard data manager 120, 220 stores the encoded data received from the data encoder 122, 222 and any event information in the crash hardened memory module 118, 218 and in the queueing repository 158, 258. In the second embodiment of FIG. 2, the onboard data manager 220 can optionally store the encoded data in the non-crash hardened removable storage device 219. After five minutes of encoded data has accumulated in the queuing repository 158, 258, the onboard data manager 120, 220 stores the five minutes of encoded data to the remote data repository 130, 230 via the remote data manager 132, 232 in the data center 150, 250 over the wireless data link 146, 246 accessed through the wireless gateway/router 172, 272. In real-time mode, the onboard data manager 120, 220 stores the encoded data received from the data encoder 122, 222 and any event information to the crash hardened memory module 118, 218, and optionally in the non-crash hardened removable storage device 219 of FIG. 2, and to the remote data repository 130, 230 via the remote data manager 132, 232 in the data center 150, 250 over the wireless data link 146, 246 accessed through the wireless gateway/router 172, 272. The onboard data manager 120, 220 and the remote data manager 132, 232 can communicate over a variety of wireless communications links, such as Wi-Fi, cellular, satellite, and private wireless systems utilizing the wireless gateway/router 172, 272. Wireless data link 146, 246 can be, for example, a wireless local area network (WLAN), wireless metropolitan area network (WMAN), wireless wide area network (WWAN), a private wireless system, a cellular telephone network or any other means of transferring data from the data recorder 154, 254 of DARS 100, 200 to, in this example, the remote data manager 130, 230 of DARS 100, 200. When a wireless data connection is not available, the data is stored in memory and queued in queueing repository 158, 258 until wireless connectivity is restored and the data replication process can resume.

In parallel with data recording, data recorder 154, 254 continuously and autonomously replicates data to the remote data repository 130, 230. The replication process has two modes, a real-time mode and a near real-time mode. In real-time mode, the data is replicated to the remote data repository 130, 230 every second. In near real-time mode, the data is replicated to the remote data repository 130, 230 every five minutes. The rates used for near real-time mode and real-time mode are configurable and the rate used for real-time mode can be adjusted to support high resolution data by replicating data to the remote data repository 130, 230 every 0.10 seconds. When the DARS 100, 200 is in near real-time mode, the onboard data manager 120, 220 queues data in the queuing repository 158, 258 before replicating the data to the remote data manager 132, 232. The onboard data manager 120, 220 also replicates the vehicle event detector information queued in the queueing repository 158, 258 to the remote data manager 132, 232. Near real-time mode is used during normal operation, under most conditions, in order to improve the efficiency of the data replication process.

Real-time mode can be initiated based on events occurring and detected by the vehicle event detector 156, 256 onboard the asset 148, 248 or by a request initiated from the data center 150, 250. A typical data center 150, 250 initiated request for real-time mode is initiated when the remotely located user 152, 252 has requested real-time information from the web client 142, 242. A typical reason for real-time mode to originate onboard the asset 148, 248 is the detection of an event or incident by the vehicle event detector 156, 256 such as an operator initiating an emergency stop request, emergency braking activity, rapid acceleration or deceleration in any axis, or loss of input power to the data recorder 154, 254. When transitioning from near real-time mode to real-time mode, all data not yet replicated to the remote data repository 130, 230 is replicated and stored in the remote data repository 130, 230 and then live replication is initiated. The transition between near real-time mode and real-time mode typically occurs in less than five seconds. After a predetermined amount of time has passed since the event or incident, a predetermined amount of time of inactivity, or when the user 152, 252 no longer desires real-time information from the asset 148, 248, the data recorder 154, 254 reverts to near real-time mode. The predetermined amount of time required to initiate the transition is configurable and is typically set to ten minutes.

When the data recorder 154, 254 is in real-time mode, the onboard data manager 120, 220 attempts to continuously empty its queue to the remote data manager 132, 232, storing the data to the crash hardened memory module 118, 218, and optionally to the non-crash hardened removable storage device 219 of FIG. 2, and sending the data to the remote data manager 132, 232 simultaneously. The onboard data manager 120, 220 also sends the detected vehicle information queued in the queuing repository 158, 258 to the remote data manager 132, 232.

Upon receiving data to be replicated from the data recorder 154, 254, along with data from the map component 164, 264, the route/crew manifest component 124, 224, and the weather component 126, 226, the remote data manager 132, 232 stores the compressed data to the remote data repository 130, 230 in the data center 150, 250 of DARS 100, 200. The remote data repository 130, 230 can be, for example, cloud-based data storage or any other suitable remote data storage. When data is received, a process is initiated that causes the data decoder 136, 236 to decode the recently replicated data for/from the remote data repository 130, 230 and send the decoded data to the remote event detector 134, 234. The remote data manager 132, 232 stores vehicle event information in the remote data repository 130, 230. When the remote event detector 134, 234 receives the decoded data, it processes the decoded data to determine if an event of interest is found in the decoded data. The decoded information is then used by the remote event detector 134, 234 to detect events, incidents, or other predefined situations, in the data occurring with the asset 148, 248. Upon detecting an event of interest from the decoded data previously stored in the remote data repository 130, 230, the remote event detector 134, 234 stores the event information and supporting data in the remote data repository 130, 230. When the remote data manager 132, 232 receives remote event detector 134, 234 information, the remote data manager 132, 232 stores the information in the remote data repository 130, 230.

The remotely located user 152, 252 can access information, including vehicle event detector information, relating to the specific asset 148, 248, or a plurality of assets, using the standard web client 142, 242, such as the web browser, or the virtual reality device (not shown) which, in this implementation, can display thumbnail images from selected cameras. The web client 142, 242 communicates the user's 152, 252 request for information to the web server 140, 240 through the network 144, 244 using common web standards, protocols, and techniques. Network 144, 244 can be, for example, the Internet. Network 144, 244 can also be a local area network (LAN), metropolitan area network (MAN), wide area network (WAN), virtual private network (VPN), a cellular telephone network, or any other means of transferring data from the web server 140, 240 to, in this example, the web client 142, 242. The web server 140, 240 requests the desired data from the data decoder 136, 236. The data decoder 136, 236 obtains the requested data relating to the specific asset 148, 248, or the plurality of assets, from the remote data repository 130, 230 upon request from the web server 140, 240. The data decoder 136, 236 decodes the requested data and sends the decoded data to the localizer 138, 238. Localization is the process of converting data to formats desired by the end user, such as converting the data to the user's preferred language and units of measure. The localizer 138, 238 identifies the profile settings set by user 152, 252 by accessing the web client 142, 242 and uses the profile settings to prepare the information being sent to the web client 142, 242 for presentation to the user 152, 252 in the user's preferred language and units of measure, as the raw encoded data and detected event information is saved to the remote data repository 130, 230 using coordinated universal time (UTC) and international system of units (SI units). The localizer 138, 238 converts the decoded data into a format desired by the user 152, 252, such as the user's 152, 252 preferred language and units of measure. The localizer 138, 238 sends the localized data in the user's 152, 252 preferred format to the web server 140, 240 as requested. The web server 140, 240 then sends the localized data of the asset, or plurality of assets, to the web client 142, 242 for viewing and analysis, providing playback and real-time display of standard video and 360 degrees video through the viewer. The web client 142, 242 can display and the user 152, 252 can view the data, video, and audio for a single asset or simultaneously view the data, video, and audio for a plurality of assets. The web client 142, 242 can also provide synchronous playback and real-time display of data along with the plurality of video and audio data from both standard and 360 degrees video sources on, in, or in the vicinity of the asset, nearby assets, and/or remotely located sites. The web client 142, 242 can play the video data on the viewer for the user 152, 252 who can interact with the video for viewing and analysis. The user 152, 252 can also download the video data using the web client 142, 242 and can then use the virtual reality device, such as the virtual reality device 828 of FIG. 8, to interact with the video data on the viewer for viewing and analysis.

The web client 142, 242 is enhanced with a software application that provides the playback of video data and/or 360 degrees video, in a variety of different modes. The user 152, 252 can elect the mode in which the software application presents the video playback, such as, for example, fisheye view, dewarped panorama view, dewarped double panorama view, and dewarped quad view.

The user 152, 252 can further share data with remotely located recipient end users that have internet access and a modern web browser in a secure, controlled, tracked, and audited way using the data sharing system of the present disclosure. The user 152, 252, instead of sharing files, shares a URL to the data. URL based data sharing enables the user to control, track, and audit sensitive data. The user will be able to share data to improve the safety of the world's transportation systems without fear of unauthorized data dissemination. An administrator has permission to increase and/or decrease the native permissions of the user 152, 252 and each remotely located recipient end user. The native permission of the user 152, 252 and each remotely located recipient end user determines the permissions that the particular remotely located recipient end user has to view data on the web client 142, 242. The data sharing system is used by asset 148, 248 owners, operators, and investigators to share real-time data about operational efficiency and safety of vehicles. The sharing of data enables rapid evaluation and adjustment of behavior.

Figure 19:
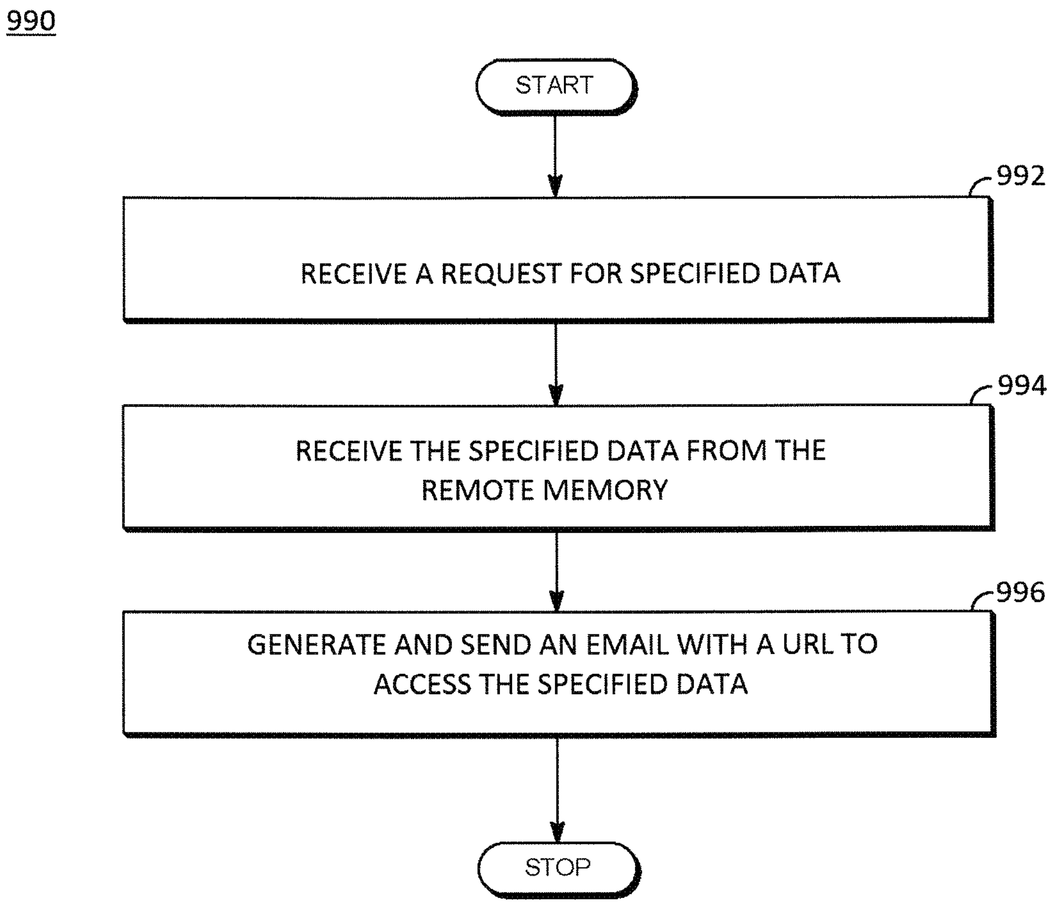
FIG. 19 is a flow diagram of a process for sharing data and/or information from the mobile asset through a web browser or virtual reality device in accordance with implementations of this disclosure.

FIG. 19 is a flow diagram showing a process 990 for sharing data and/or information from the asset 148, 248 through a web browser, such as the web browser 826 of FIG. 8, or virtual reality device, such as the virtual reality device 828 of FIG. 8. Typically, the user 152, 252 will request that the data center 150, 250 share asset 148, 248 data using the web client 142, 242 992 (FIG. 19). A typical reason for data sharing is the detection of an incident, such as an operator initiating an emergency stop request, emergency braking activity, rapid acceleration or deceleration in any axis, and/or loss of input power to DARS 100, 200. No file will be downloaded or sent to the remotely located recipient end user. User 152, 252 will not be able to share more than what their native permission on the web client 142, 242 allows. The remotely located recipient end user will be able to see data based on their own native permissions on the web client 142, 242. Such sharing activity is logged by the web client 142, 242 in the data center 150, 250. The administrator is able to share data to a plurality of users 152, 252 who natively do not have access to the data through the web client 142, 242 using permission escalation. Such permission escalation activity will also be logged by the web client 142, 242 in the data center 150, 250.

As previously discussed, the user 152, 252 accesses information, including vehicle event detector 156, 256 information, using the web client 142, 242. Using common web standards, protocols, and techniques, such as internet or private network 144, 244, the web client 142, 242 communicates with the web server 140, 240 the information desired by the user 152, 252. The web server 140, 240 requests the desired data from the data decoder 136, 236. Data is extracted and/or decoded by the data decoder 136, 236 and then the data is localized by the localizer 138, 238, converting the data to formats desired by the user 152, 252 as described above. The web server 140, 240 then sends the localized data to the web client 142, 242 for viewing and analysis 994 (FIG. 19).

The sharer end user 152, 252 can share this information, including vehicle event detector 156, 256 information and video data, with a plurality of remotely located recipient end users using the web client 142, 242, regardless of whether the recipient end user has a pre-registered account on the web client 142, 242. The sharer end user 152, 252 can share the information and data with a plurality of remotely located recipient end users regardless of whether the recipient end user has a pre-registered account on the web client 142, 242. During this process the web client 142, 242 will generate an email with a URL that points to the data in the data center 150, 250 996 (FIG. 19). The remotely located recipient end user receives the email with the URL address to access the data. The URL address is not a link to files. No files are shared with the recipient end users. The data is not a discrete file, but a range of data pulled from the remote data repository 130 based on the shared web-based viewer link. The URL address sent via email is a link to the web-based viewer that allows the recipient end user to view a specific segment of data synchronized with still images and video via the web-based viewer. When the remotely located recipient end user clicks on the URL, they will be able to access the shared information using their own web client 142, 242 and the sharing activity will be logged by the web client 142, 242 in the data center 150, 250.

For simplicity of explanation, process 990 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

A seventh embodiment of a real-time data acquisition and recording system and automated signal compliance monitoring and alerting system described herein provides real-time, or near real-time, access to a wide range of data, such as event and operational data, video data, and audio data, related to a high value asset to remotely located users such as asset owners, operators and investigators. The automated signal compliance monitoring and alerting system records data, via a data recorder, relating to the asset and streams the data to a remote data repository and remotely located users prior to, during, and after an incident has occurred. The data is streamed to the remote data repository in real-time, or near real-time, making information available at least up to the time of an incident or emergency situation, thereby virtually eliminating the need to locate and download the "black box" in order to investigate an incident involving the asset and eliminating the need to interact with the data recorder on the asset to request a download of specific data, to locate and transfer files, and to use a custom application to view the data. The system of the present disclosure retains typical recording capability and adds the ability to stream data to a remote data repository and remote end users prior to, during, and after an incident. In the vast majority of situations, the information recorded in the data recorder is redundant and not required as data has already been acquired and stored in the remote data repository.

The automated signal monitoring and alerting system also automatically monitors and provides historical and real-time alerting for mobile assets, such as locomotives, trains, airplanes, and automobiles, in violation of a signal aspect, such as a stop light, traffic light, and/or speed limit signal, or operating the mobile asset unsafely in an attempt to maintain compliance to a signal, such as a stop light, traffic light, and/or speed limit signal. The automated signal monitoring and alerting system combines the use of image analytics, GPS location, braking forces, and vehicles speed, as well as automated electronic notifications, to alert personnel onboard and/or off-board the mobile asset in real-time when a mobile asset violates safe operating rules, such as, for example, when a stop signal is passed by a mobile asset prior to stopping and receiving authority (red light violation), when a restricting signal indicating reduced speed limits is violated by a mobile asset traveling at a greater speed, and/or when a mobile asset applies late and/or excessive braking forces in order to stop before passing a stop/red signal.

Prior to the automated signal monitoring and alerting system of the present disclosure, operations center personnel relied on mobile asset crews to report when a safe operating rule is violated. Sometimes a catastrophic mobile asset on mobile asset collision resulted, with subsequent investigations realizing the safe operating rules violation had occurred. Additionally, excessive braking forces may have caused mechanical failure to a part of the mobile asset and, in situations where the mobile asset is a locomotive and/or train, excessive braking forces may have resulted in derailment, with subsequent investigations finding the safe operating rule violation as the root cause. The system of the present disclosure enables users to monitor and/or be alerted when a safe operating rule violation occurs, prior to the occurrence of mechanical failure, collision, derailment, and/or another accident.

An end user may subscribe to be alerted when a safe operating rule violation has occurred, and will receive email, text message, and/or in-browser electronic notifications within minutes of the actual event occurring. The end user may utilize historical records to analyze data to identify patterns, such as, for example, problem locations, compromised line of sight, faulty equipment, and underperforming crews, which can be useful in implementing new and safer operating rules or crew educational opportunities for continuous improvement. The system of the present disclosure enables the end user to leverage continuous electronic monitoring and extensive image analytics to understand any and all times when a mobile asset is operating unsafely due to a safe operating rule violation and/or signal non-compliance.

The automated signal monitoring and alerting system is used by vehicle and/or mobile asset owners, operators, and investigators to view and analyze the operational efficiency and safety of mobile assets in real-time. The ability to view operations in real-time enables rapid evaluation and adjustment of behavior. During an incident, real-time information can facilitate triaging the situation and provide valuable information to first responders. During normal operation, near real-time information can be used to audit crew performance and to aid network wide operational safety and awareness.

The automated signal monitoring and alerting system utilizes outward facing cameras and/or other cameras, GPS location, speed, and acceleration, as well as vehicle, train, and/or mobile asset brake pressure sensor data in a completely integrated, time-synchronized, automated system to identify unsafe and potentially catastrophic operating practices to provide real-time feedback to mobile asset crews and management. The automated signal monitoring and alerting system also provides automated data and video download to users with various data sources so as to allow complete knowledge of the operating environment at the time of alerting.

Data may include, but is not limited to, analog and digital parameters such as speed, pressure, temperature, current, voltage, and acceleration which originate from the asset and/or nearby assets; Boolean data such as switch positions, actuator position, warning light illumination, and actuator commands; global positioning system (GPS) data and/or geographic information system (GIS) data such as position, speed, and altitude; internally generated information such as the regulatory speed limit for an asset given its current position; video and image information from cameras located at various locations in, on, or in the vicinity of the asset; audio information from microphones located at various locations in, on, or in vicinity of the asset; information about the operational plan for the asset that is sent to the asset from a data center such as route, schedule, and cargo manifest information; information about the environmental conditions, including current and forecasted weather conditions, of the area in which the asset is currently operating in or is planned to operate in; asset control status and operational data generated by systems such as positive train control (PTC) in locomotives; and data derived from a combination from any of the above including, but not limited to, additional data, video, and audio analysis and analytics.

FIG. 19 illustrates a field implementation of the seventh embodiment of the exemplary real-time data acquisition and recording system (DARS) 1000 and automated signal monitoring and alerting system 1080 in which aspects of the disclosure can be implemented. DARS 1000 is a system that delivers real-time information to remotely located end users from a data recording device. DARS 1000 includes a data recorder 1054 that is installed on a vehicle or mobile asset 1048 and communicates with any number of various information sources through any combination of onboard wired and/or wireless data links 1070 such as a wireless gateway/router, or off-board information sources via a data center 1050 of DARS 1000 via data links such as wireless data links 1046. Data recorder 1054 comprises an onboard data manager 1020, a data encoder 1022, a vehicle event detector 1056, a queueing repository 1058, and a wireless gateway/router 1072. Additionally, in this implementation, data recorder 1054 can include a crash hardened memory module 1018 and/or an Ethernet switch 1062 with or without power over Ethernet (POE). An exemplary hardened memory module 1018 can be, for example, a crashworthy event recorder memory module that complies with the Code of Federal Regulations and/or the Federal Railroad Administration regulations, a crash survivable memory unit that complies with the Code of Federal Regulations and/or the Federal Aviation Administration regulations, a crash hardened memory module in compliance with any applicable Code of Federal Regulations, or any other suitable hardened memory device as is known in the art. In an eighth embodiment, the data recorder can further include an optional non-crash hardened removable storage device (not shown).

The wired and/or wireless data links 1070 can include any one of or combination of discrete signal inputs, standard or proprietary Ethernet, serial connections, and wireless connections. Ethernet connected devices may utilize the data recorder's 1054 Ethernet switch 1062 and can utilize POE. Ethernet switch 1062 may be internal or external and may support POE. Additionally, data from remote data sources, such as a map component 1064, a route/crew manifest component 1024, and a weather component 1026 in the implementation of FIG. 19, is available to the onboard data manager 1020 and the vehicle event detector 1056 from the data center 1050 through the wireless data link 1046 and the wireless gateway/router 1072.

Data recorder 1054 gathers data or information from a wide variety of sources, which can vary widely based on the asset's configuration, through onboard data link 1070. The data encoder 1022 encodes at least a minimum set of data that is typically defined by a regulatory agency. In this implementation, the data encoder 1022 receives data from a wide variety of asset 1048 sources and data center 1050 sources. Information sources can include any number of components in the asset 1048, such as any of analog inputs 1002, digital inputs 1004, I/O module 1006, vehicle controller 1008, engine controller 1010, inertial sensors 1012, global positioning system (GPS) 1014, cameras 1016, positive train control (PTC)/signal data 1066, fuel data 1068, cellular transmission detectors (not shown), internally driven data and any additional data signals, and any number of components in the data center 1050, such as any of the route/crew manifest component 1024, the weather component 1026, the map component 1064, and any additional data signals. Furthermore, asset 1048 information sources can be connected to the data recorder 1054 through any combination of wired or wireless data links 1070. The data encoder 1022 compresses or encodes the data and time synchronizes the data in order to facilitate efficient real-time transmission and replication to a remote data repository 1030. The data encoder 1022 transmits the encoded data to the onboard data manager 1020 which then saves the encoded data in the crash hardened memory module 1018 and the queuing repository 1058 for replication to the remote data repository 1030 via a remote data manager 1032 located in the data center 1050. Optionally, the onboard data manager 1020 can also save a tertiary copy of the encoded data in the non-crash hardened removable storage device of the eighth embodiment. The onboard data manager 1020 and the remote data manager 1032 work in unison to manage the data replication process. A single remote data manager 1032 in the data center 1050 can manage the replication of data from a plurality of assets 1048.

The data from the various input components and data from an in-cab audio/graphic user interface (GUI) 1060 are sent to a vehicle event detector 1056. The vehicle event detector 1056 processes the data to determine whether an event, incident, or other predefined situation involving the asset 1048 has occurred. When the vehicle event detector 1056 detects signals that indicate a predefined event occurred, the vehicle event detector 1056 sends the processed data that a predefined event occurred along with supporting data surrounding the predefined event to the onboard data manager 1020. The vehicle event detector 1056 detects events based on data from a wide variety of sources, such as the analog inputs 1002, the digital inputs 1004, the I/O module 1006, the vehicle controller 1008, the engine controller 1010, the inertial sensors 1012, the GPS 1014, the cameras 1016, the route/crew manifest component 1024, the weather component 1026, the map component 1064, the PTC/signal data 1066, and the fuel data 1068, which can vary based on the asset's configuration. When the vehicle event detector 1056 detects an event, the detected asset event information is stored in a queuing repository 1058 and can optionally be presented to the crew of the asset 1048 via the in-cab audio/graphical user interface (GUI) 1060.

Figure 20:
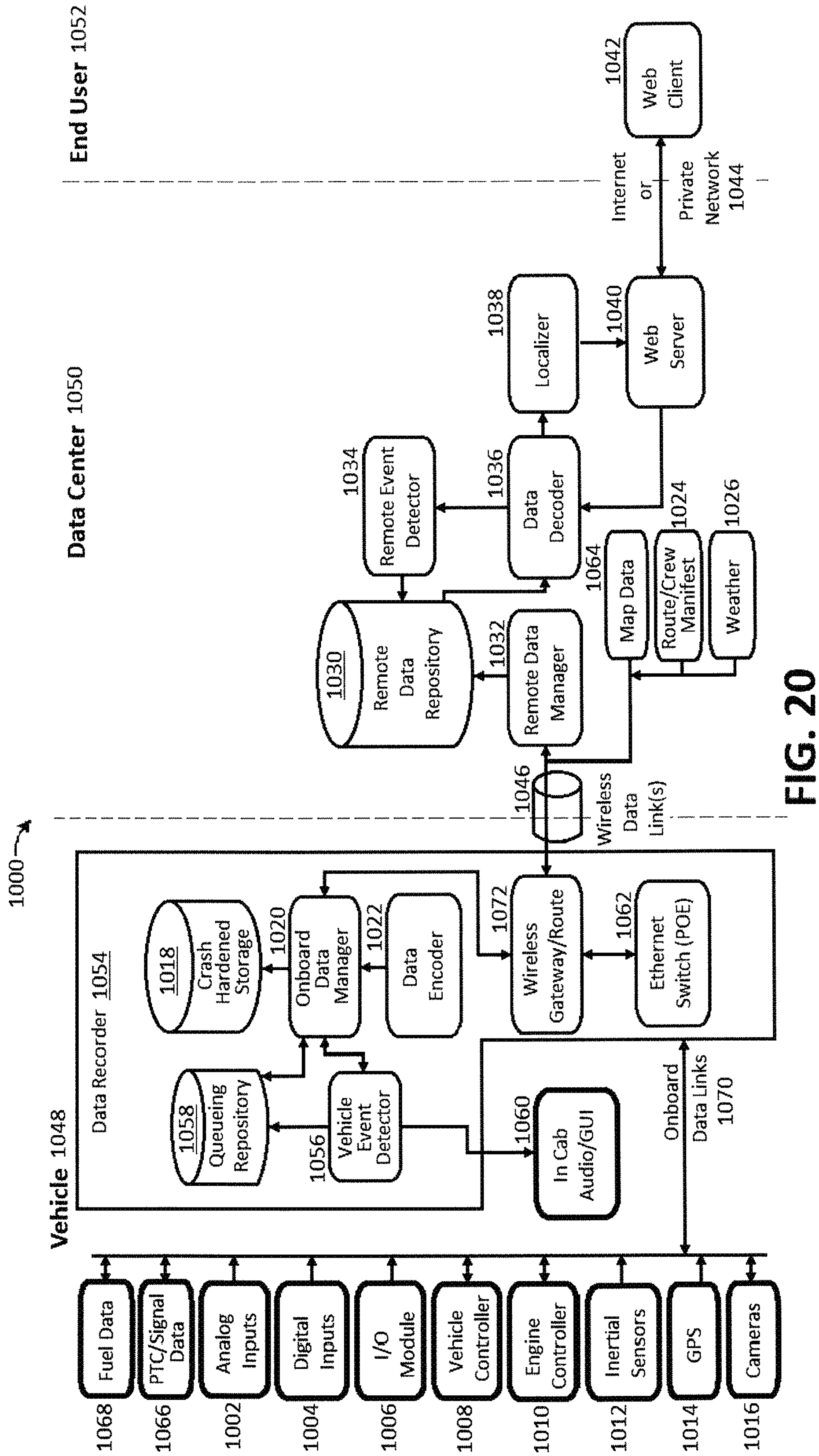
FIG. 20 illustrates a field implementation of a seventh embodiment of an exemplary real-time data acquisition and recording system in accordance with implementations of this disclosure.

When the asset's 1048 location indicates that a signal 1082 has been crossed, excessive braking has occurred and the asset 1048 stopped within close location of the signal 1082, or speed restrictions applied by means of signal aspect, the onboard data manager 1020 will initiate outward facing camera image analysis to determine the meaning or aspect of the signal 1082, as shown in FIG. 20. Utilizing state of the art image processing techniques, outward facing camera footage can be analyzed by a previously trained neural network or artificial intelligence component to decipher signal aspect and operating rules implications. The analysis and/or processing by the neural network or artificial intelligence component, in this exemplary implementation, is done in a back office. In another embodiment, the analysis and/or processing by the neural network or artificial intelligence component is done on the asset 1048. The output of the signal aspect decoding is combined with other sensor data to determine whether the asset 1048 has grossly violated signal indication by occupying railroad tracks, in this exemplary implementation, which may lead to a train on train collision, or has operated in an unsafe manner to achieve signal compliance. When the asset 1048 is found to be out of compliance, an electronic alert will be stored in the back office, as well as delivered to users who have subscribed to receive such alerts, after associating the railroad's business rules to the signal and asset operations. These alerts can then be mined either directly via a database or by using the website graphical user interface, or a web client 1042, provided to users.

Additionally, an audible alert can be added to the cab of the asset 1048 which would alert the crew of an impending signal violation, impending bad situation that the crew may respond to faster in case the crew was distracted or otherwise not paying attention to a track obstruction, stop signal, and/or if the asset 1048 is speeding in a zone where the signal requires a lower speed limit.

The automated signal monitoring and alerting system 1080 is also enhanced to automatically perform video analytics to determine signal meaning each time a monitored asset crosses a signal, to automatically perform video analytics to determine signal meaning whenever an asset experiences excessive braking forces and comes to a stop within a pre-defined distance, and to monitor asset speed to determine whether the asset is moving at a speed greater than is authorized as determined by the signal aspect. The image analytics is done onboard the asset 1048 to reduce delay between the actual event and the electronic notification to users and/or subscribers. The functionality of the automated signal monitoring and alerting system 1080 is enhanced to allow automated inward and outward facing video downloads at the time of alert to enhance the user's experience and decrease the work necessary to investigate the event. The functionality of the automated signal monitoring and alerting system 1080 is also enhanced to provide real-time audible cues within the non-compliant asset 1048 to alert crew in case of distraction or other reason for not following safe operating practices with respect to signal rules and meaning.

Additionally, the automated signal monitoring and alerting system 1080 and/or video analytics system 910 may receive location information, including latitude and longitude coordinates, of a signal, such as a stop signal, traffic signal, speed limit signal, and/or object signal near the tracks, from the asset owner. The video analytics system 910 then determines whether the location information received from the asset owner is correct. If the location information is correct, the video analytics system 910 stores the information and will not recheck the location information again for a predetermined amount of time, such as checking the location information on a monthly basis. If the location information is not correct, the video analytics system 910 determines the correct location information and reports the correct location information to the asset owners, stores the location information, and will not recheck the location information again for a predetermined amount of time, such as checking the location information on a monthly basis. Storing the location information provides easier detection of a signal, such as a stop signal, traffic signal, speed limit signal, and/or object signal near the tracks.

The onboard data manager 1020 also sends data to the queuing repository 1058. In near real-time mode, the onboard data manager 1020 stores the encoded data received from the data encoder 1022 and any event information in the crash hardened memory module 1018 and in the queueing repository 1058. In the eighth embodiment, the onboard data manager 1020 can also optionally store the encoded data in the non-crash hardened removable storage device of the eighth embodiment. After five minutes of encoded data has accumulated in the queuing repository 1058, the onboard data manager 1020 stores the five minutes of encoded data to the remote data repository 1030 via the remote data manager 1032 in the data center 1050 over the wireless data link 1046 accessed through the wireless gateway/router 1072. In real-time mode, the onboard data manager 1020 stores the encoded data received from the data encoder 1022 and any event information to the crash hardened memory module 1018, and optionally in the non-crash hardened removable storage device of the eighth embodiment, and to the remote data repository 1030 via the remote data manager 1032 in the data center 1050 over the wireless data link 1046 accessed through the wireless gateway/router 1072. The process of replicating data to the remote data repository 1030 requires a wireless data connection between the asset 1048 and the data center 1050. The onboard data manager 1020 and the remote data manager 1032 can communicate over a variety of wireless communications links, such as Wi-Fi, cellular, satellite, and private wireless systems utilizing the wireless gateway/router 1072. Wireless data link 1046 can be, for example, a wireless local area network (WLAN), wireless metropolitan area network (WMAN), wireless wide area network (WWAN), a private wireless system, a cellular telephone network or any other means of transferring data from the data recorder 1054 of DARS 1000 to, in this example, the remote data manager 1030 of DARS 1000. When a wireless data connection is not available, the data is stored in memory and queued in queueing repository 1058 until wireless connectivity is restored and the data replication process can resume.

In parallel with data recording, data recorder 1054 continuously and autonomously replicates data to the remote data repository 1030. The replication process has two modes, a real-time mode and a near real-time mode. In real-time mode, the data is replicated to the remote data repository 1030 every second. In near real-time mode, the data is replicated to the remote data repository 1030 every five minutes. The rates used for near real-time mode and real-time mode are configurable and the rate used for real-time mode can be adjusted to support high resolution data by replicating data to the remote data repository 1030 every 0.10 seconds. When DARS 1000 is in near real-time mode, the onboard data manager 1020 queues data in the queuing repository 1058 before replicating the data to the remote data manager 1032. The onboard data manager 1020 also replicates the vehicle event detector information queued in the queueing repository 1058 to the remote data manager 1032. Near real-time mode is used during normal operation, under most conditions, in order to improve the efficiency of the data replication process.

Real-time mode can be initiated based on events occurring and detected by the vehicle event detector 1056 onboard the asset 1048 or by a request initiated from the data center 1050. A typical data center 1050 initiated request for real-time mode is initiated when a remotely located user 1052 has requested real-time information from the web client 1042. A typical reason for real-time mode to originate onboard the asset 1048 is the detection of an event or incident by the vehicle event detector 1056 such as an operator initiating an emergency stop request, emergency braking activity, rapid acceleration or deceleration in any axis, or loss of input power to the data recorder 1054. When transitioning from near real-time mode to real-time mode, all data not yet replicated to the remote data repository 1030 is replicated and stored in the remote data repository 1030 and then live replication is initiated. The transition between near real-time mode and real-time mode typically occurs in less than five seconds. After a predetermined amount of time has passed since the event or incident, a predetermined amount of time of inactivity, or when the user 1052 no longer desires real-time information from the asset 1048, the data recorder 1054 reverts to near real-time mode. The predetermined amount of time required to initiate the transition is configurable and is typically set to ten minutes.

When the data recorder 1054 is in real-time mode, the onboard data manager 1020 attempts to continuously empty its queue to the remote data manager 1032, storing the data to the crash hardened memory module 1018, and optionally to the non-crash hardened removable storage device of the eighth embodiment, and sending the data to the remote data manager 1032 simultaneously. The onboard data manager 1020 also sends the detected vehicle information queued in the queuing repository 1058 to the remote data manager 1032.

Upon receiving data to be replicated from the data recorder 1054, along with data from the map component 1064, the route/crew manifest component 1024, and the weather component 1026, the remote data manager 1032 stores the compressed data to the remote data repository 1030 in the data center 1050 of DARS 1000. The remote data repository 1030 can be, for example, cloud-based data storage or any other suitable remote data storage. When data is received, a process is initiated that causes a data decoder 1036 to decode the recently replicated data for/from the remote data repository 1030 and send the decoded data to a remote event detector 1034. The remote data manager 1032 stores vehicle event information in the remote data repository 1030. When the remote event detector 1034 receives the decoded data, it processes the decoded data to determine if an event of interest is found in the decoded data. The decoded information is then used by the remote event detector 1034 to detect events, incidents, or other predefined situations, in the data occurring with the asset 1048. Upon detecting an event of interest from the decoded data, the remote event detector 1034 stores the event information and supporting data in the remote data repository 1030. When the remote data manager 1032 receives remote event detector 1034 information, the remote data manager 1032 stores the information in the remote data repository 1030.

The remotely located user 1052 can access information, including vehicle event detector information, relating to the specific asset 1048, or a plurality of assets, using the standard web client 1042, such as a web browser, or a virtual reality device (not shown) which, in this implementation, can display thumbnail images from selected cameras. The web client 1042 communicates the user's 1052 request for information to a web server 1040 through a network 1044 using common web standards, protocols, and techniques. Network 1044 can be, for example, the Internet. Network 1044 can also be a local area network (LAN), metropolitan area network (MAN), wide area network (WAN), virtual private network (VPN), a cellular telephone network or any other means of transferring data from the web server 1040 to, in this example, the web client 1042. The web server 1040 requests the desired data from the data decoder 1036. The data decoder 1036 obtains the requested data relating to the specific asset 1048, or plurality of assets, from the remote data repository 1030 upon request from the web server 1040. The data decoder 1036 decodes the requested data and sends the decoded data to a localizer 1038. Localization is the process of converting data to formats desired by the end user, such as converting the data to the user's preferred language and units of measure. The localizer 1038 identifies the profile settings set by user 1052 by accessing the web client 1042 and uses the profile settings to prepare the information being sent to the web client 1042 for presentation to the user 1052, as the raw encoded data and detected event information is saved to the remote data repository 1030 using coordinated universal time (UTC) and international system of units (SI units). The localizer 1038 converts the decoded data into a format desired by the user 1052, such as the user's 1052 preferred language and units of measure. The localizer 1038 sends the localized data in the user's 1052 preferred format to the web server 1040 as requested. The web server 1040 then sends the localized data of the asset, or plurality of assets, to the web client 1042 for viewing and analysis, providing playback and real-time display of standard video, 360 degrees video, and/or other video. The web client 1042 can display and the user 1052 can view the data, video, and audio for a single asset or simultaneously view the data, video, and audio for a plurality of assets. The web client 1042 can also provide synchronous playback and real-time display of data along with the plurality of video and audio data from image measuring sources, standard video sources, 360 degrees video sources, and/or other video sources, and/or range measuring sources, on, in, or in the vicinity of the asset, nearby assets, and/or remotely located sites.

Figure 21:
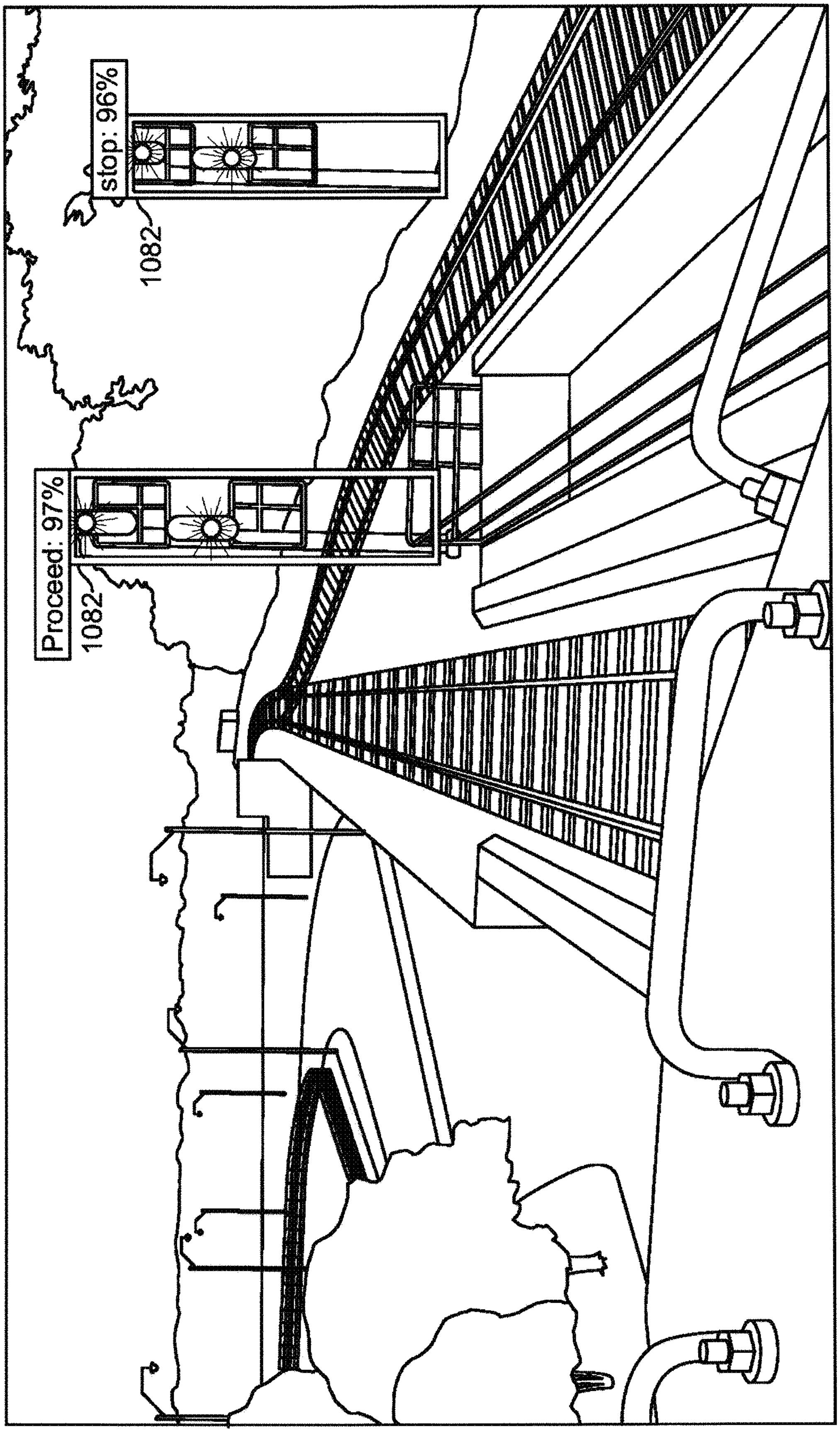
FIG. 21 is a diagram that illustrates exemplary signal detection of an automated signal compliance monitoring and alerting system in accordance with implementations of this disclosure.
Figure 22:
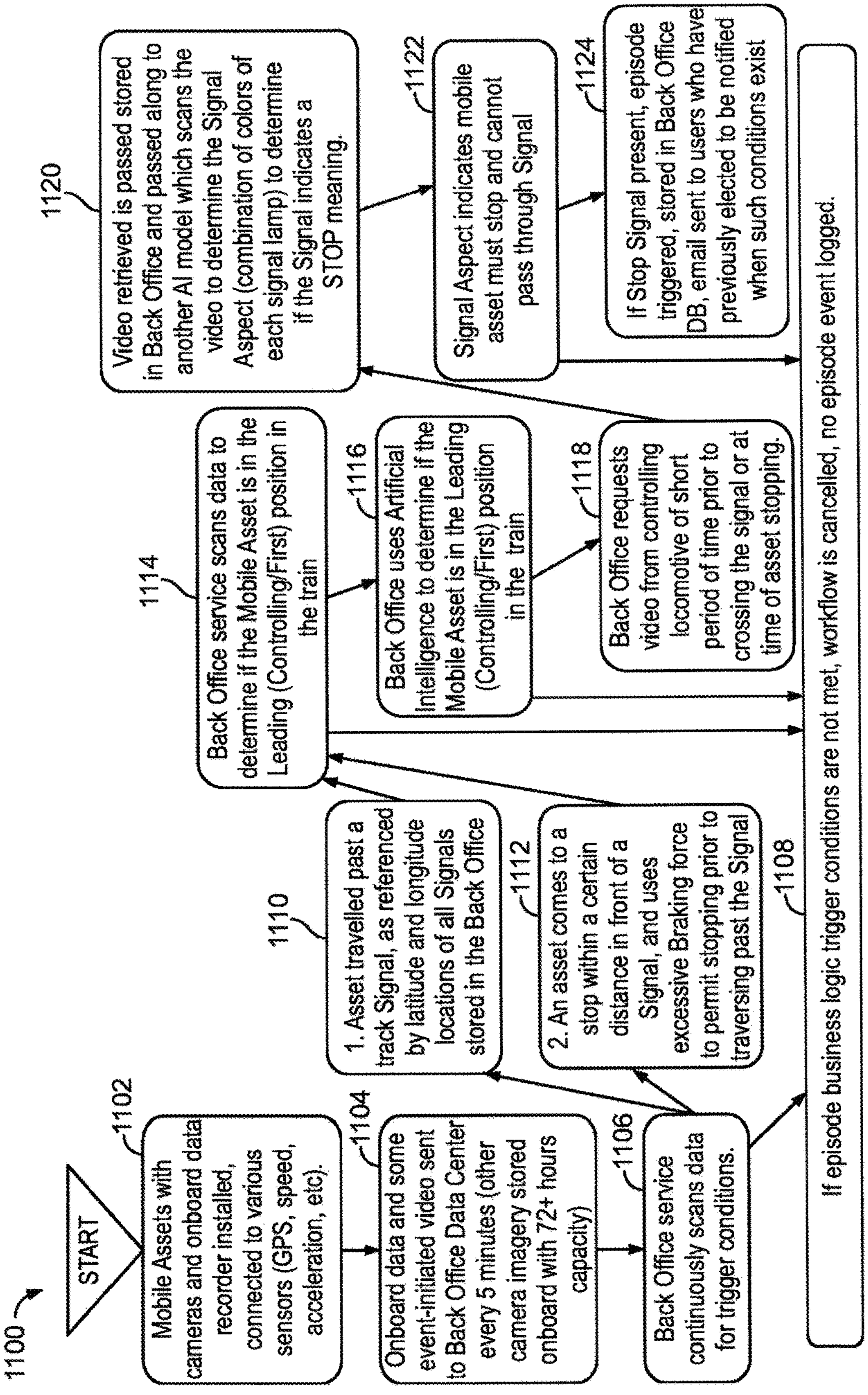
FIG. 22 is a flow diagram of a first embodiment of a process for determining signal compliance in accordance with implementations of this disclosure.

FIG. 21 is a flow diagram showing a first illustrated embodiment of a process 1100 for determining signal compliance in accordance with an implementation of this disclosure. After the DARS 1000 and cameras 1016 are installed and connected to various sensors on the asset 1048, such as analog inputs 1002, digital inputs 1004, I/O module 1006, vehicle controller 1008, engine controller 1010, inertial sensors 1012, global positioning system (GPS) 1014, cameras 1016, positive train control (PTC)/signal data 1066, fuel data 1068, cellular transmission detectors (not shown), internally driven data and any additional data signals, 1102, onboard data from the various sensors and/or event-initiated video and/or still images are sent to a back office data center 1074 every five minutes and camera imagery is stored onboard the asset 1048 with over 72 hours of capacity 1104. The back office data center 1074 service continuously scans the data for trigger conditions 1106. If episode business logic trigger conditions are not met, the workflow is cancelled and no episode event is logged 1108. If the asset 1048 travelled past a track signal 1082 as referenced by latitude and longitude coordinates of all signals stored in the back office data center 1074 1110 and/or the asset 1048 came to a stop within a certain distance in front of the signal 1082 and used excessive braking force to permit stopping prior to traversing past the signal 1082 1112, the back office data center 1074 service scans the data to determine if the train car, in this illustrated embodiment, is in the leading, controlling, or first position in the train asset 1048 1114. The back office data center 1074 uses a first artificial intelligence model to determine if the train car is in the leading, controlling, or first position in the train asset 1048 1116. If the train car is not in the leading, controlling, or first position in the train asset 1048, the episode business logic trigger conditions are not met, the workflow is cancelled and no episode event is logged 1108. If the train car is in the leading, controlling, or first position in the train asset 1048, the back office data center 1074 requests video content from the lead, controlling, or first position locomotive taken a short period of time prior to crossing the signal 1082 and/or at the time of the asset 1048 stopping 1118. The video content retrieved is passed to and/or stored in the back office data center 1074 and passed along to a second artificial intelligence model that scans the video content to determine the signal 1082 aspect, such as the combination of colors of each signal lamp, to determine if the signal 1082 indicates a STOP meaning 1120. The back office data center 1074 determines whether the signal 1082 aspect indicates that the asset 1048 must stop and cannot pass through the signal 1082 1122. If the signal 1082 aspect does not indicate that the asset 1048 must stop and cannot pass through the signal 1082, the episode business logic trigger conditions are not met, the workflow is cancelled and no episode event is logged 1108. If the signal 1082 aspect does indicate that the asset 1048 must stop and cannot pass through the signal 1082 and the stop signal is present, an episode is triggered, stored in the back office data center 1074 database, and emails are sent to users who have previously elected to be notified when such conditions exist 1124.

For simplicity of explanation, process 1100 is depicted and described as a series of steps. However, steps in accordance with this disclosure can occur in various orders and/or concurrently. Additionally, steps in accordance with this disclosure may occur with other steps not presented and described herein. Furthermore, not all illustrated steps may be required to implement a method in accordance with the disclosed subject matter.

A connected diagnostic system described herein, used with a real-time data acquisition and recording system, such as DARS 100, 200, 1000 as shown in FIGS. 1, 2, and 20, respectively, provides real-time access to a wide range of data, such as event and operational data, video data, and audio data, related to a high value asset and provides an in-cab experience of the high value asset to remotely located users, such as asset owners, operators, maintenance technicians, supervisors, control centers, and investigators. The connected diagnostic system minimizes the amount of time and effort required by personnel to carry out their daily operations and maintenance of the assets. The connected diagnostic system provides a plurality of virtual remote instances of operator displays or onboard displays and/or Human Machine Interfaces (HMI), which can be accessed on a plurality of devices anywhere in the world. Various users would benefit from the connected diagnostic system of the present disclosure, such as operators, maintenance technicians, control centers, and supervisors. Operators work onboard the asset and are responsible for operating the asset and ensuring the safety of the passengers or the goods that the asset carries. Maintenance technicians are responsible for repairing and maintaining the equipment and machinery of the asset usually when the asset is stationary in a station or yard and can potentially be dispatched to the mainline to troubleshoot over-the-road incidents. Supervisors are responsible for overseeing the operations and maintenance of the assets. The control center is the hub for relaying information to the operators, helping them troubleshoot any issues on the asset and working closely with the supervisors and maintenance technicians. The control center also provides information on the daily operations of the asset, such as route information, station information, act on passenger emergencies, etc.

Figure 23A:
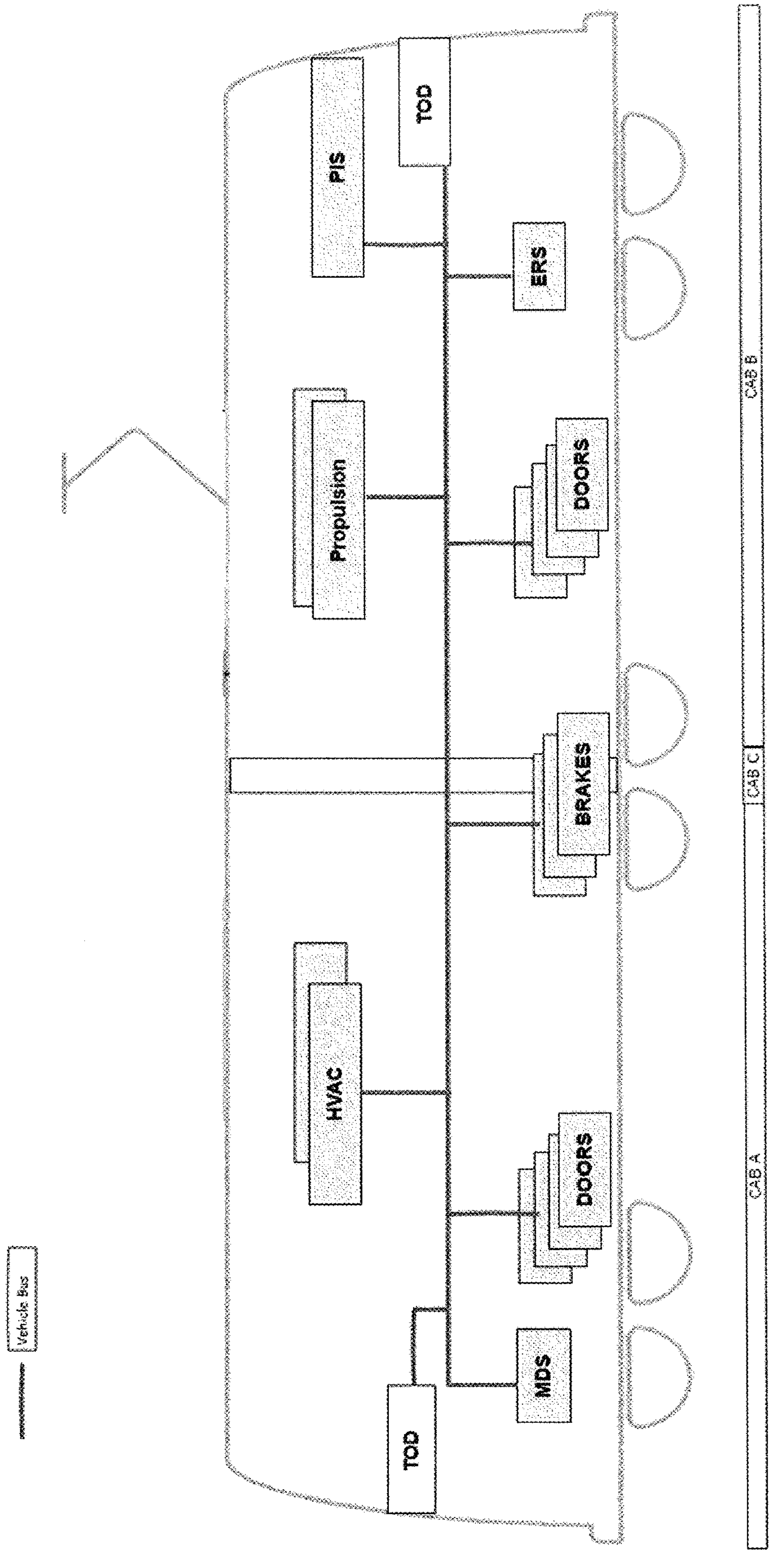
PRIOR ART FIG. 23A
FIG. 23A is a diagram showing an asset setup of the prior art, showing how components are connected via a vehicle bus.
Figure 23B:
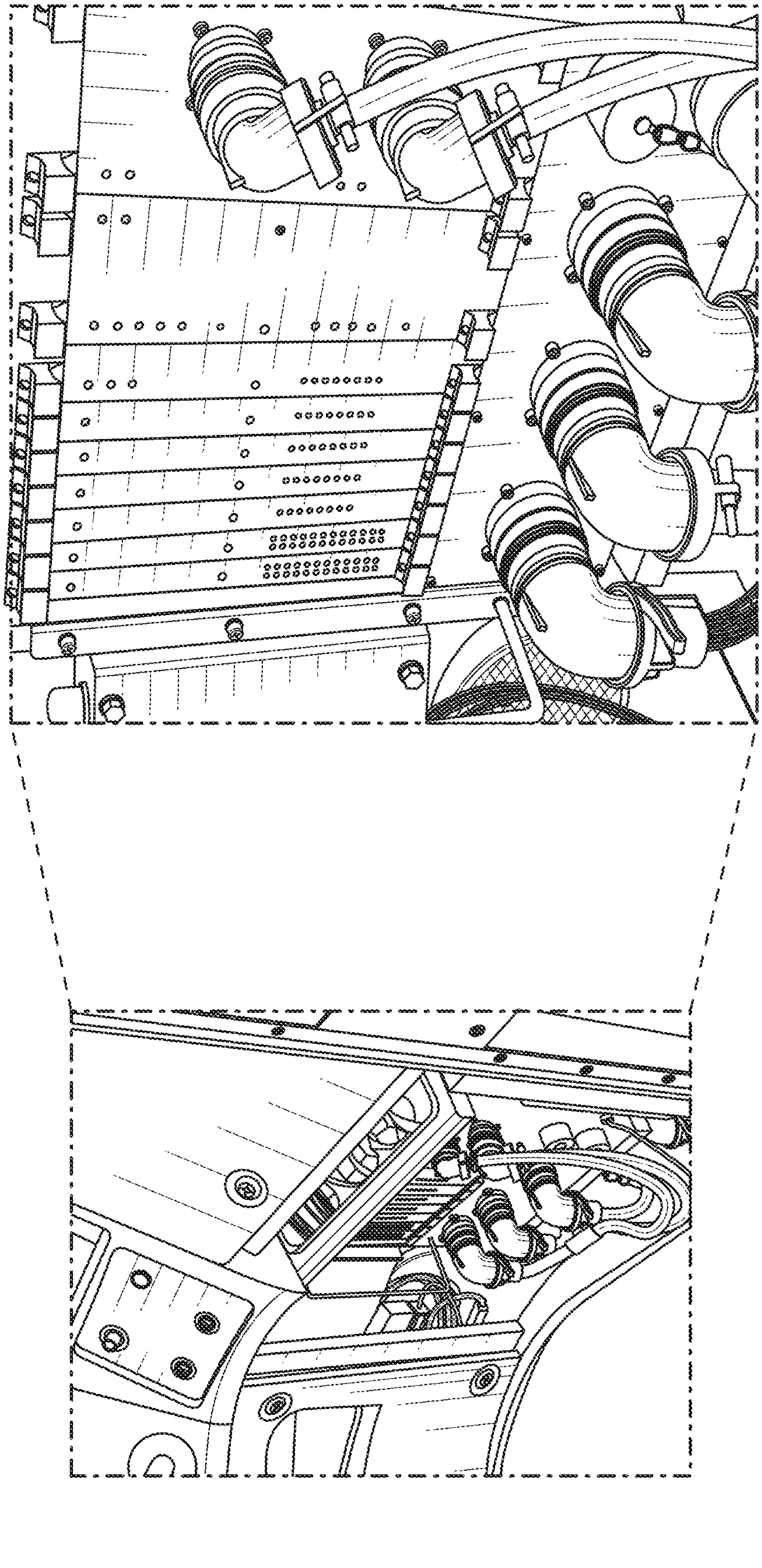
FIG. 23B (Prior Art)
FIG. 23B is a diagram showing a monitoring and diagnostic system (MDS) of the prior art installed on an asset.
Figure 23C:
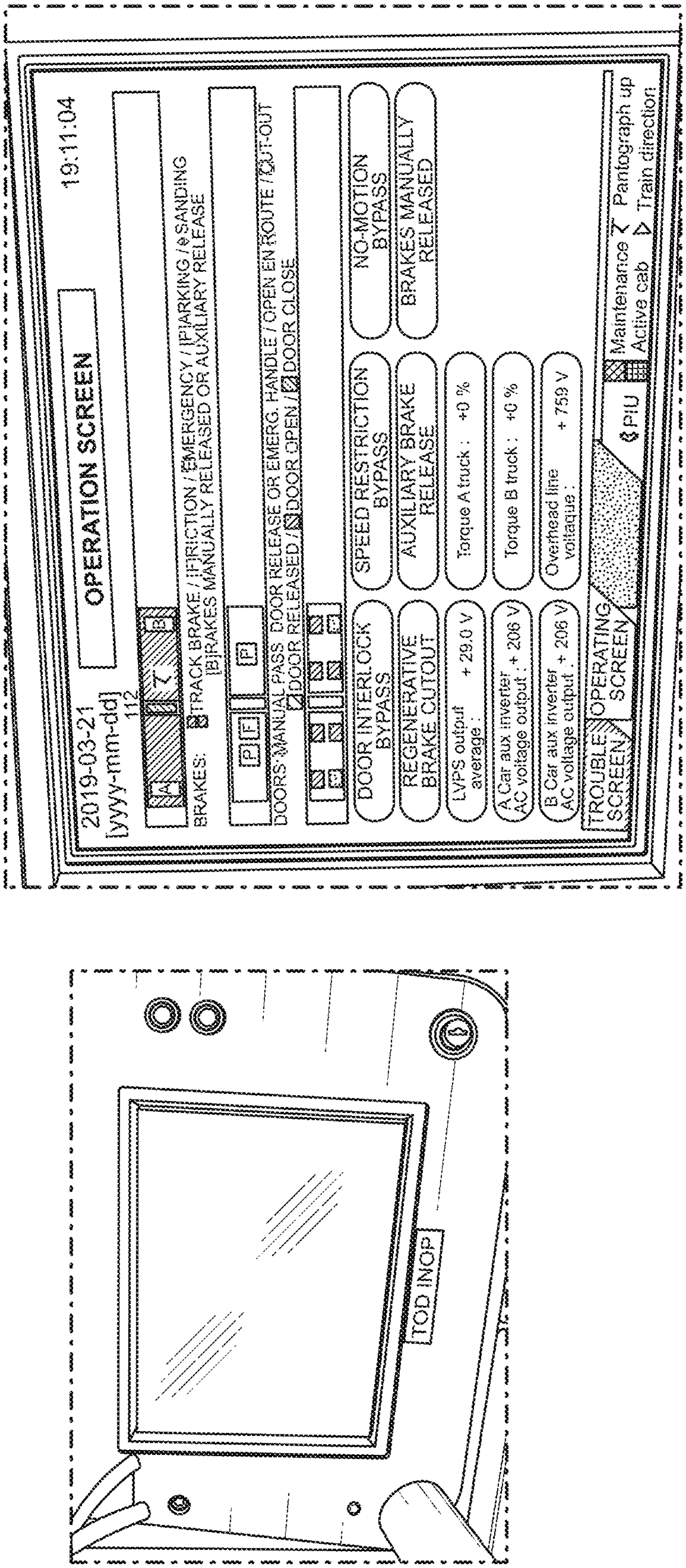
FIG. 23C (Prior Art)
FIG. 23C is a diagram of a train operator display (TOD) of the prior art installed in the asset.
Figure 23D:
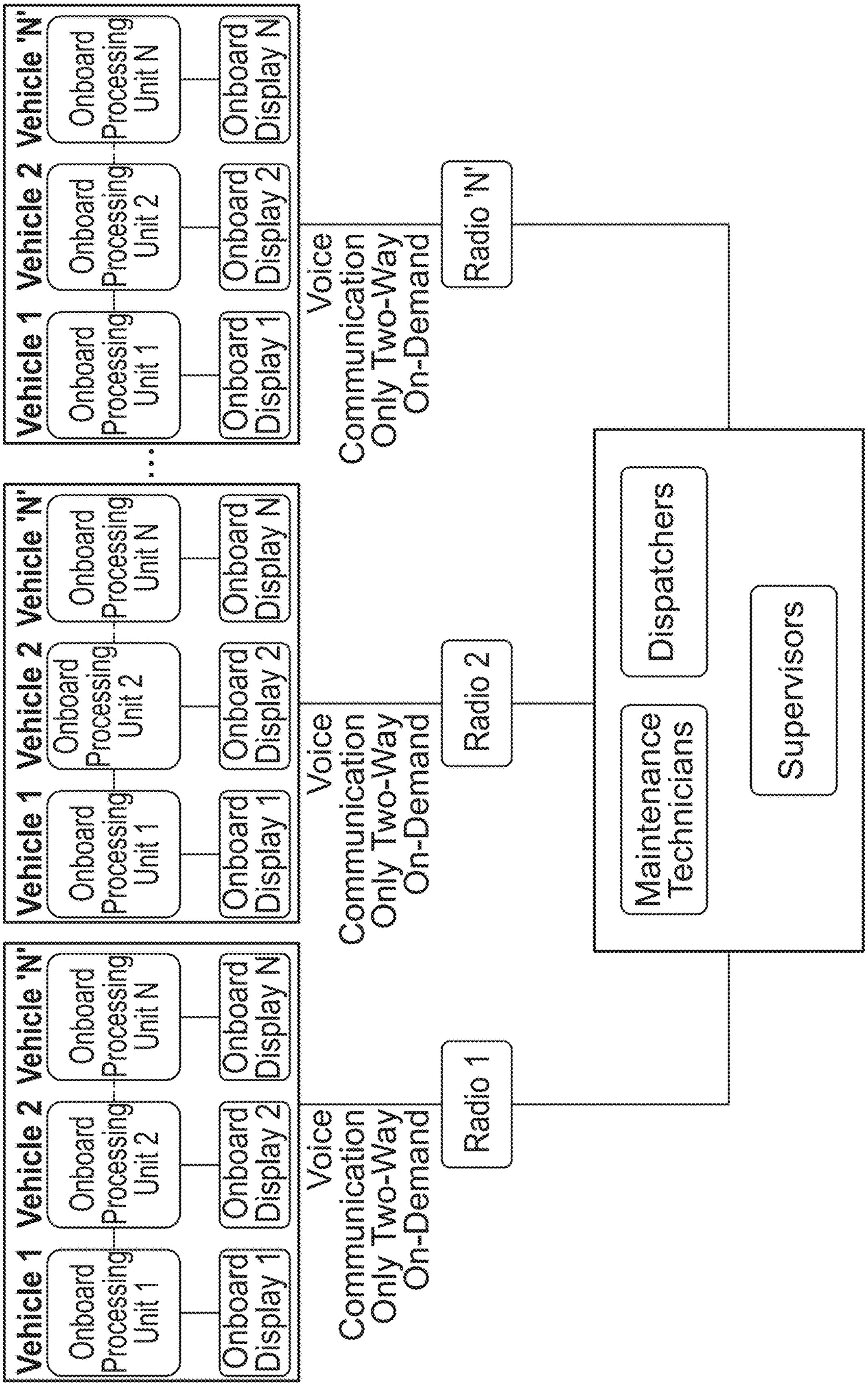
FIG. 23D (Prior Art)
FIG. 23D is a diagram showing the relay of information between mobile assets and control center of the prior art.

Prior to the connected diagnostic system of the present disclosure, existing systems, such as, for example, a monitoring and diagnostic system (MDS; FIG. 23B), installed on mobile assets, such as, for example, a train car (FIG. 23A), included an onboard processing unit that collected the data from the asset, systems, and/or devices onboard the asset and relayed the information to onboard displays, such as, for example, a train operator display (TOD; FIG. 23C), and/or Human Machine Interfaces (HMI). As shown in FIG. 23A, components of the train car, including the TODs, the MDS, the heating ventilation, and air conditioning (HVAC), the brakes, the doors, propulsion, the event recorder system (ERS), and the passenger information system (PIS), are connected to each other via a vehicle bus that is shown in dashed lines. As shown in FIG. 23D, this information is available for each vehicle and their respective trainset as a whole. Currently, using existing systems of the prior art, the remote users off-board the vehicle, e.g., control center, supervisors, maintenance personnel, etc., do not have access to the data and/or information from onboard the vehicle in real-time. The operator on the vehicle must relay the information via communication channels, such as radio or mobile phones, to contact the off-board users, which has to be done for each vehicle individually. The information that the operator relays can either be vehicle information or consist information. The operator does not have the ability to access and/or relay information for the entire fleet. The system of the present disclosure has reduced the need for operators to relay information, only in specialized scenarios, via communications channels, allowing remotely located users to access data and/or information from any asset using any remote device, such as mobile phones, laptops, tablets, and/or any device with compatible connectivity, from anywhere in the world.

The connected diagnostic system of the present disclosure provides several benefits over existing monitoring and diagnostic systems of the prior art. Namely, the connected diagnostic system of the present disclosure allows control centers and maintenance crews to rely on remote views of onboard operating displays and/or Human Machine Interfaces (HMIs) and Applicant's website information, provides access to a plurality of assets and/or trainsets simultaneously, allows historical data to be stored on the cloud and be accessible for years, provides each asset with a portable onboard display and/or HMI, maintains the software on the onboard operating displays and/or HMIs up-to-date with the latest technologies with over the air updates, performs remote diagnostics, maintains manuals and repair logs, provides asset and/or train routing and crew information, and allows the transmission of emergencies and alerts off-board.

The connected diagnostic system also provides remote access to an onboard display and/or the HMI on an asset. By interfacing with onboard devices on the asset and creating a virtual in-cab experience, the connected diagnostic system creates a remote view or remote instance of the onboard display and/or the HMI to remotely located end users that is exactly as shown on the asset. The remotely located end user can view the onboard display and/or the HMI through the remote instance on their remote device and can also navigate to screens different from the screen that is currently displayed on the onboard display and/or the HMI that the operator is viewing. The system of the present disclosure allows viewing of live data and historical data onboard the asset and off-board the asset for an entire fleet, providing the ability to undock the onboard display and/or the HMI to provide portability, thus providing the user the ability to troubleshoot issues on the asset; providing simultaneous visual and audible indication of events onboard the asset and off-board the asset to remotely located end users; providing natural language processing; providing the user with the ability to perform remote self-tests, fault acknowledgement, and other maintenance related functions such as providing location-centric fault information data that is not accessible to the operator; providing the ability to route a real-time view of the asset's assigned route, asset, crew, etc., from back office systems to the asset automatically, thereby reducing the need for manual crew entry of the asset's route; allowing integration with off-board maintenance management systems from the onboard display and/or the HMI on the asset, and providing remote updates to the technology of any onboard displays and/or HMIs, any onboard devices connected to the connected diagnostic system, and/or any element connected to the connected diagnostic system via over-the-air software updates continuously throughout the life cycle of the asset.

The remotely located user, such as an asset owner, operator, supervisor, maintenance crew, control center, and/or investigator, for example, may access a common web browser to navigate to live and/or historic desired data relating to a selected asset to view and analyze the data, information, operational efficiency, and/or safety of assets in real-time. The ability to view operations in real-time enables rapid evaluation and adjustment of behavior. During an incident, for example, real-time information and/or data can facilitate triaging the situation and provide valuable information to first responders. During normal operation, for example, real-time information and/or data can be used to audit crew performance, to aid operators and maintenance crews in asset troubleshooting, repair, and/or maintenance, and to aid network wide situational awareness.

Data may include, but is not limited to, analog and frequency parameters such as speed, pressure, temperature, current, voltage, and acceleration which originate from the asset and/or nearby assets; Boolean data such as switch positions, actuator position, warning light illumination, and actuator commands; global positioning system (GPS) data and/or geographic information system (GIS) data such as position, speed, and altitude; internally generated information such as the regulatory speed limit for an asset given its current position; video and image information from cameras located at various locations in, on, or in the vicinity of the asset; audio information from microphones located at various locations in, on, or in vicinity of the asset; information about the operational plan for the asset that is sent to the asset from a data center such as route, schedule, and cargo manifest information; information about the environmental conditions, including current and forecasted weather conditions, of the area in which the asset is currently operating in or is planned to operate in; asset control status and operational data generated by systems such as positive train control (PTC) in locomotives; and data derived from a combination from any of the above including, but not limited to, additional data, video, and audio analysis and analytics.

Figure 24:
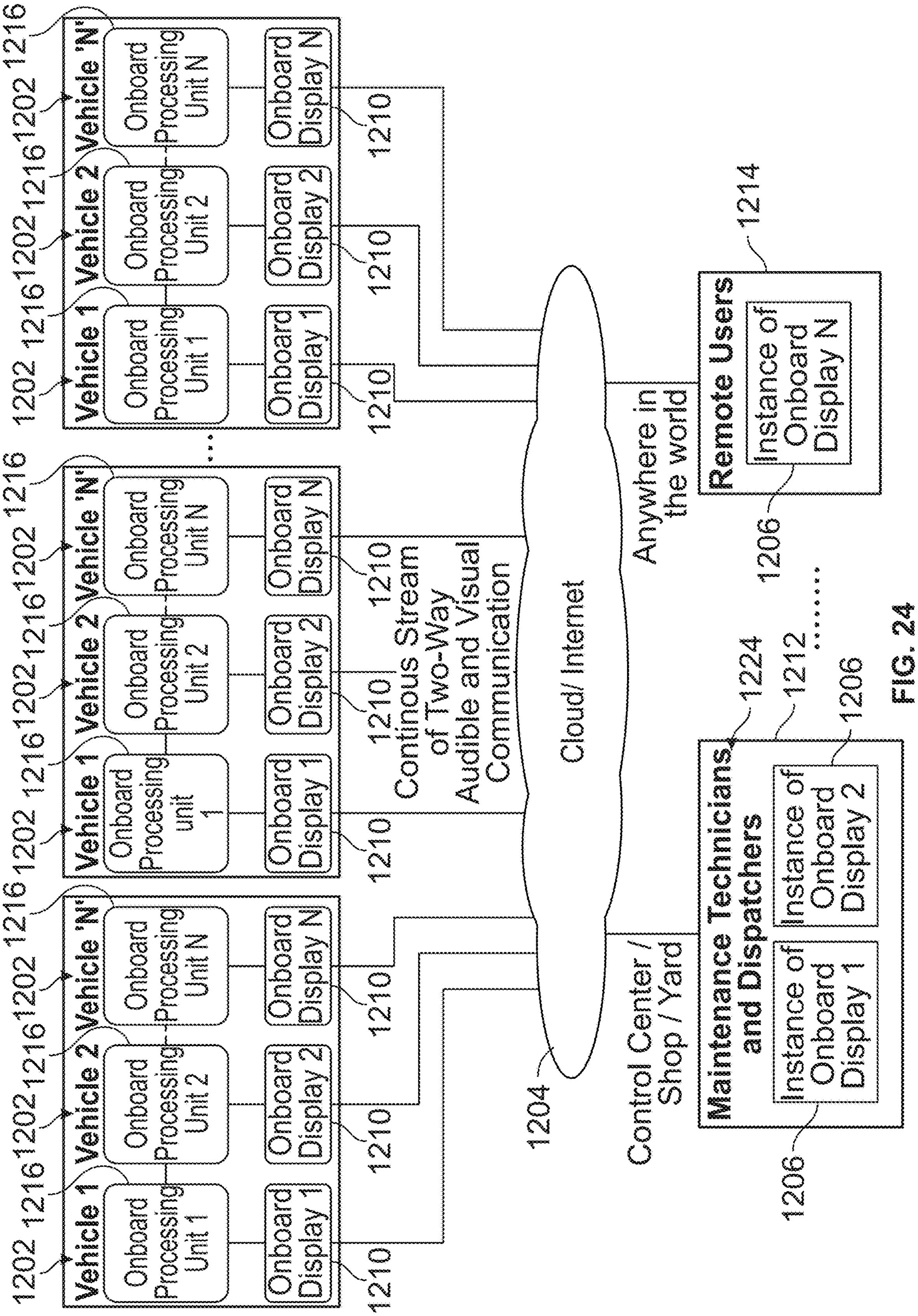
FIG. 24 is a diagram of a first embodiment of a connected diagnostic system, showing the relay of information between mobile assets, control center, and remote users, in accordance with implementations of this disclosure.

FIG. 24 illustrates a field implementation of a first embodiment of an exemplary connected diagnostic system 1200 in which aspects of the disclosure can be implemented. The connected diagnostic system 1200 delivers real-time information to a control center 1212 and remotely located end users 1214 from at least one data source onboard a mobile asset, such as the data recording device of DARS 100, 200, and 1000, and/or at least one data source remote from the mobile asset, such as the remote data repository of DARS 100, 200, and 1000, and provides asset 1202 data and/or information to all users simultaneously, where all users can interact with the data from onboard the asset simultaneously. The connected diagnostic system 1200 comprises a remote web platform 1208 which displays a remote instance 1206 of an onboard display and/or HMI 1210 of the mobile asset 1202, an onboard processing unit 1216, such as DARS 100, 200, 1000, an I/O device 1240, and an antenna 1238. The onboard display and/or HMI 1210 can be the mobile asset's 1202 own onboard display and/or HMI or it can be included with the connected diagnostic system 1200 and installed on the mobile asset 1202. The connected diagnostic system 1200 also needs access to a transmission modem. The transmission modem can by the asset's 1202 own transmission modem or it can be provided with the connected diagnostic system 1200. Data accessed and/or received via the onboard real-time display 1210 and remotely in real-time by a remote device is accessed from at least one data source onboard the mobile asset, such as the data recording device of DARS 100, 200, and 1000, and at least one data source remote from the mobile asset, such as the remote data repository of DARS, 100, 200, 1000. In this illustrated embodiment, data is collected via the data recorder 154, 254, 1054 of DARS 100, 200, 1000, respectively, transmitted wirelessly to the cloud via the wireless data links 146, 246, 1046 of DARS 100, 200, 1000, respectively, the data is stored in the remote data repository 130, 230, 1030 of DARS 100, 200, 1000, respectively, and the data is decoded using the data decoder 136, 236, 1036 and localized using the localizer 138, 238, 1038 DARS 100, 200, 1000, respectively, before being displayed on the web client 142, 242, 1042 via the web server 140, 240, 1040 of DARS 100, 200, 1000, respectively, as described above. The connected diagnostic system 1200 also uses the in-cab audio/GUI 160, 260, 1060 of DARS 100, 200, 1000, respectively, to display data, uses the remote data manager 132, 232, 1032 of DARS 100, 200, 1000, respectively, to manage data received from the connected diagnostic system 1200, and tests the data using the onboard processing unit 1216 and/or the remote event detector 134, 234, 1034 of DARS 100, 200, 1000, respectively, to look for predetermined events, episodes, and/or incidents. Each asset 1202 includes the connected diagnostic system 1200 and DARS 100, 200, or 1000. The onboard data from each asset 1202 is sent to a cloud platform 1204 and can be accessed by a plurality of users on a plurality of devices in any location around the world. The connected diagnostic system 1200 of the present disclosure provides portability, which can be used by the maintenance crew for asset troubleshooting, and allows access to multiple instances 1206 of the asset 1202 data and/or information on remote devices using the remote web platform 1208. Multiple instances 1206 of the same onboard display and/or the HMI 1210 of the asset 1202 can be accessed by multiple users and vice versa. Any remote instance 1206 of the onboard display and/or the HMI 1210 can be from any asset 1202 in the fleet and can only by accessed by users when authenticated and authorized. Optional radio communication is also available for the onboard crew to contact the control center 1212 and maintenance technicians.

The various technologies in the connected diagnostic system 1200 provide the onboard processing unit 1216, such as DARS 100, 200, 1000, that serves as a centralized location for data exchange between individual systems on the asset 1202 through multiple communication interfaces and/or channels. The connected diagnostic system 1200 is connected to the remote web platform 1208 and/or the onboard display and/or the HMI 1210 and/or a plurality of onboard displays and/or HMIs 1210 that provide troubleshooting ability to personnel by providing suggested corrective actions. The current setup of the connected diagnostic system 1200 acts as a source to collect, process, and report information and/or data to the remote web platform 1208 and/or onboard displays and/or HMIs 1210 regarding the status of the assets 1202 systems. Onboard components that the onboard processing unit 1216 connects to include, but is not limited to, event recorders, such as information sources and the data recorder 154, 254, 1054 of DARS 100, 200, 1000, respectively; displays; speedometers; control systems; passenger information and communication systems; vehicle emergency alerts; heating ventilation, and air conditioning (HVAC); brake systems; door systems; auxiliary power systems (APS); and automated passenger counter (APC).

Figure 25A:
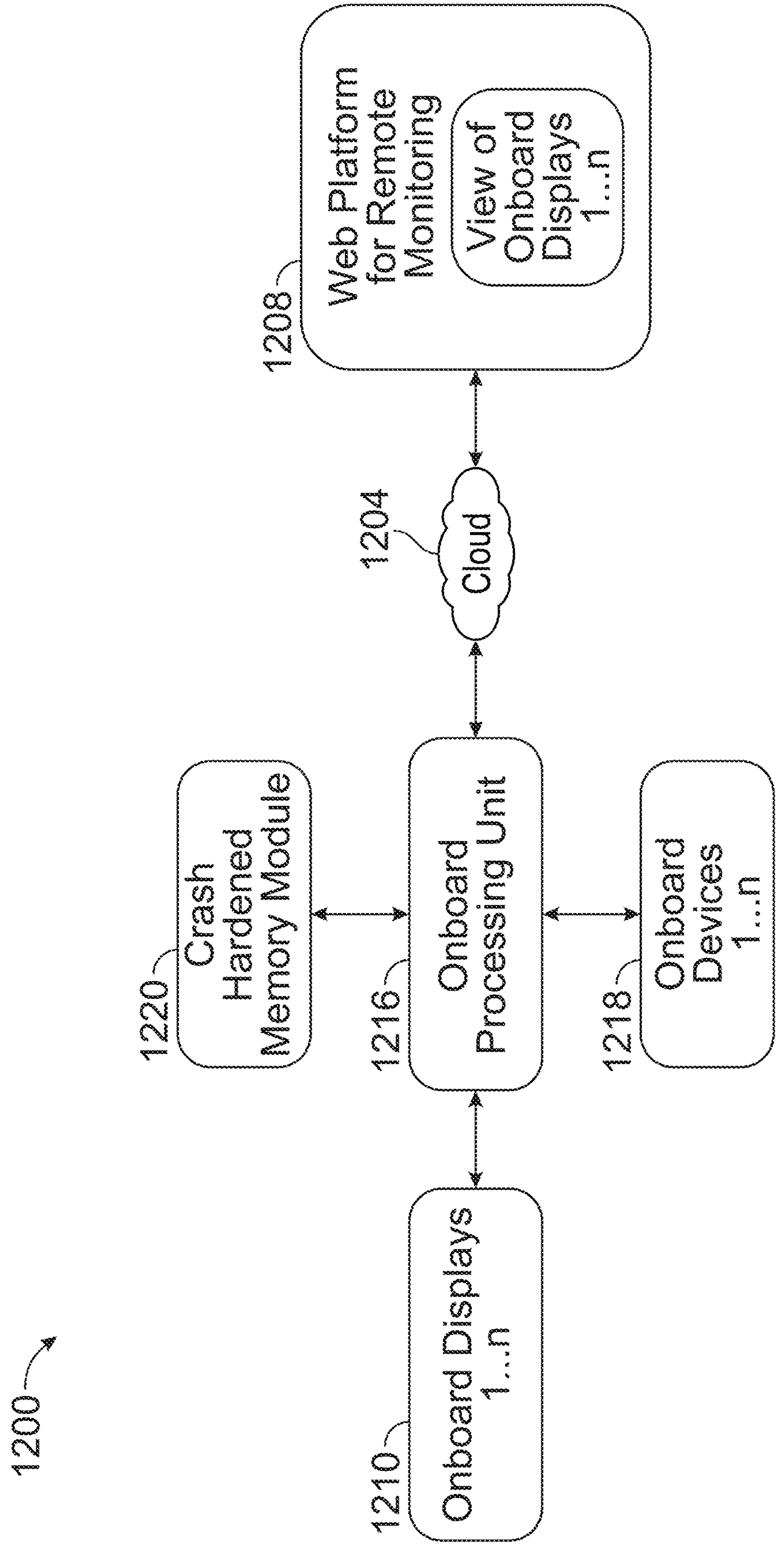
FIG. 25A is a diagram of the first embodiment of the connected diagnostic system, showing the configuration of a plurality of devices on a mobile asset, in accordance with implementations of this disclosure.
Figure 25B:
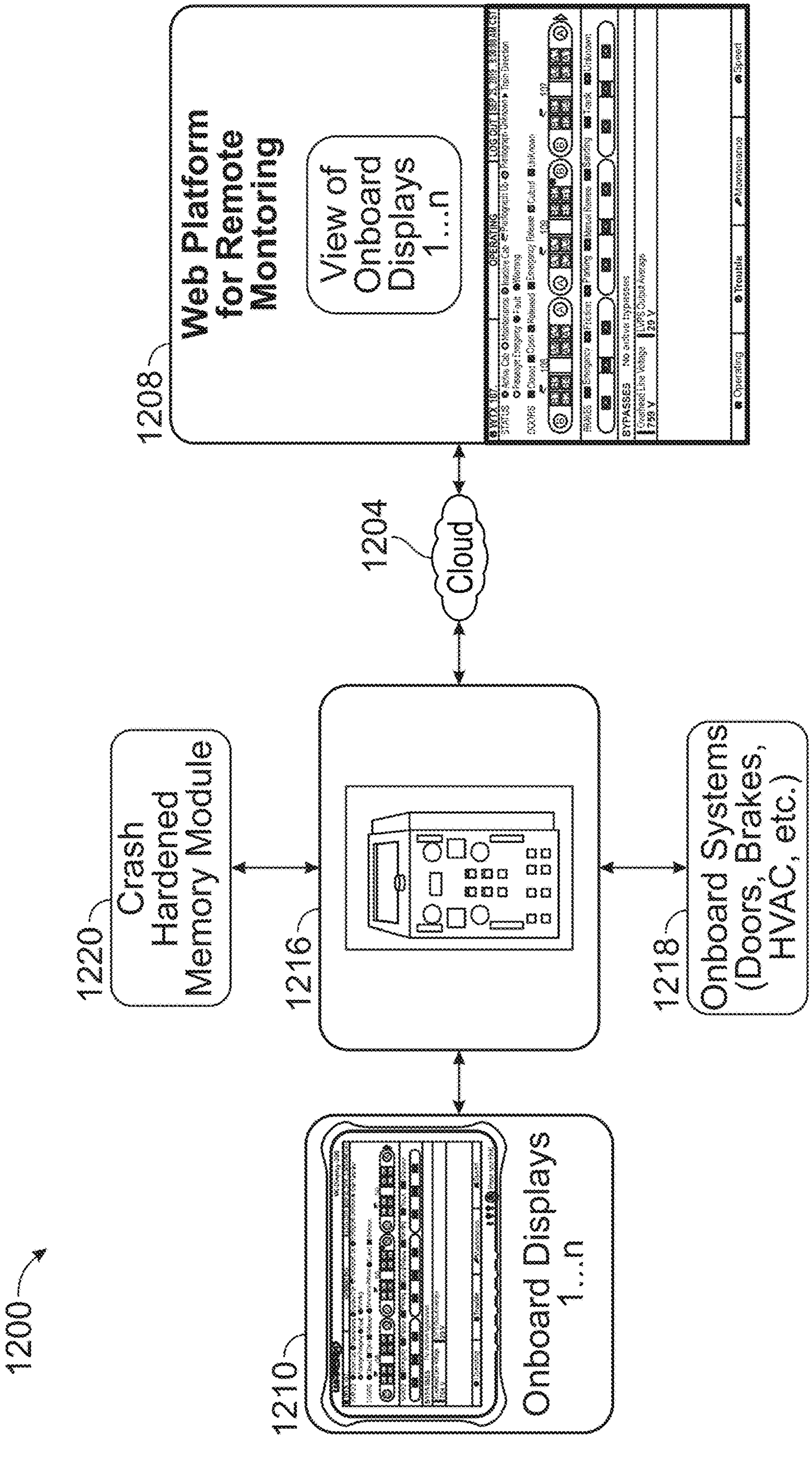
FIG. 25B is a diagram of the first embodiment of the connected diagnostic system, showing the configuration of the plurality of devices on the asset, showing an instance of an onboard display and an instance of a remote view of the onboard display, in accordance with implementations of this disclosure.
Figure 26A:
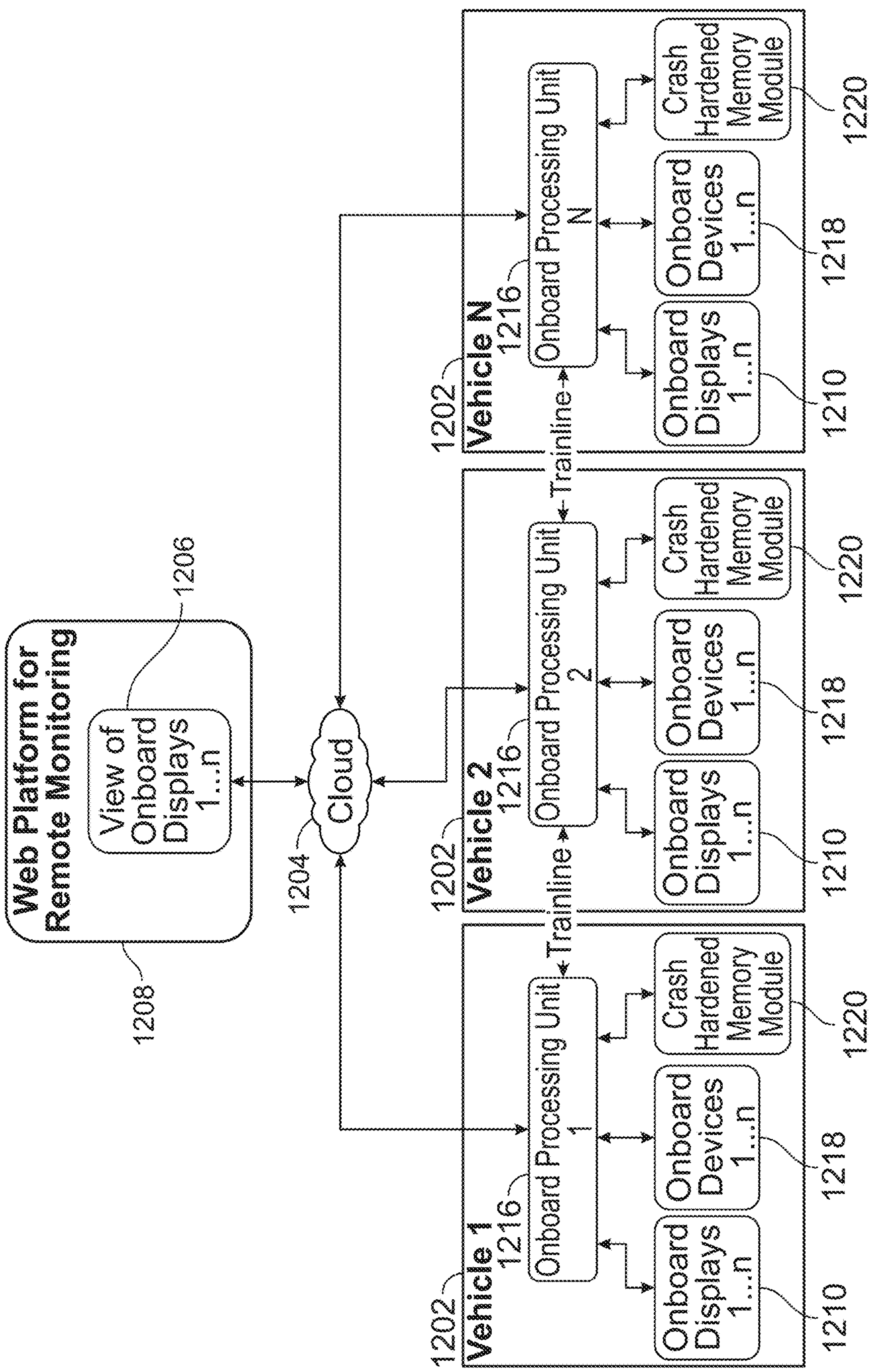
FIG. 26A is a diagram of the first embodiment of the connected diagnostic system, showing a plurality of assets connected in a consist, in accordance with implementations of this disclosure.
Figure 26B:
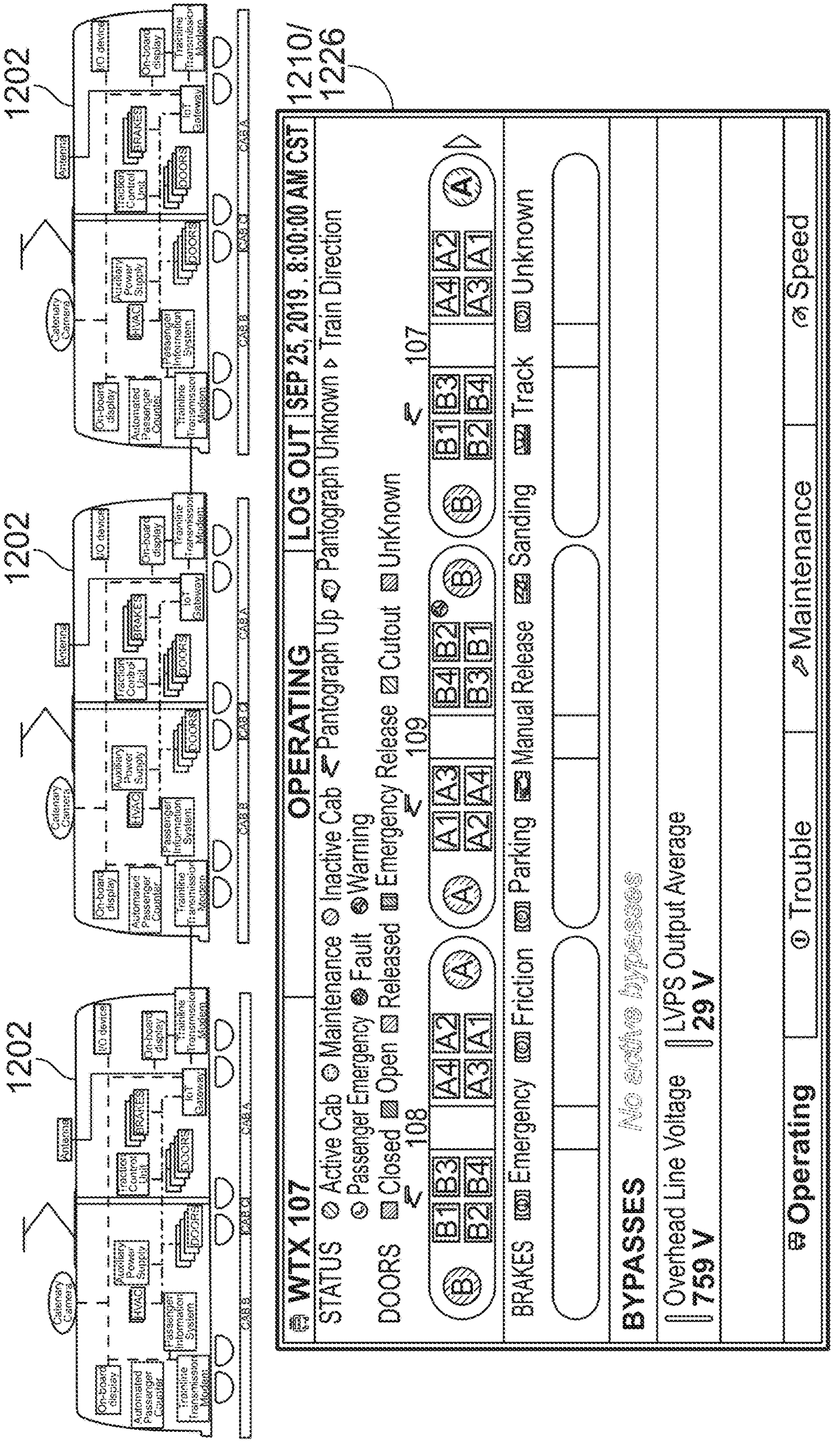
FIG. 26B is a diagram of the first embodiment of the connected diagnostic system, showing a plurality of assets connected in a consist and an instance of the onboard display and/or the Human Machine Interface (HMI) of one of the assets, in accordance with implementations of this disclosure.
Figure 27A:
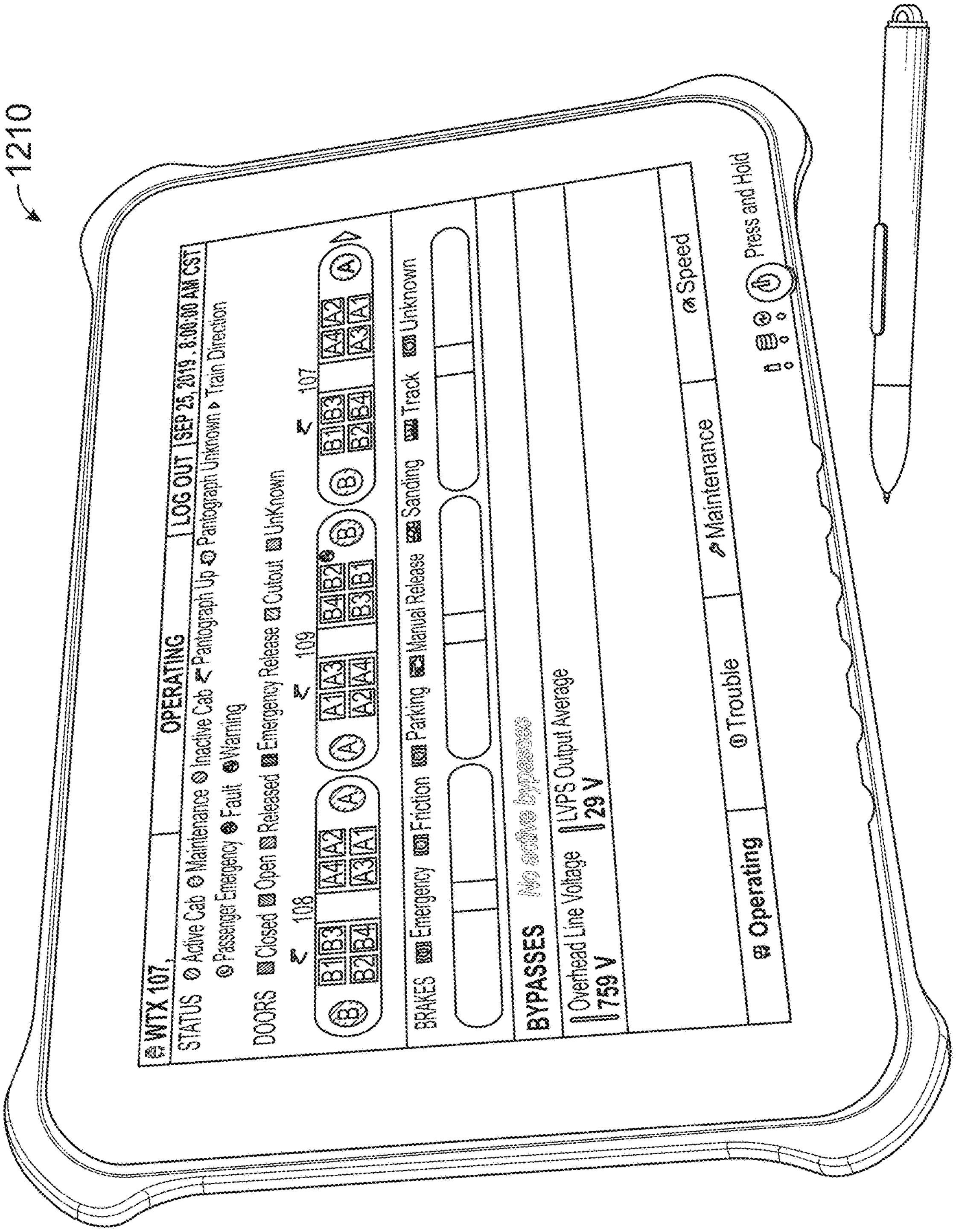
FIG. 27A is a perspective view of an instance of the onboard display and/or the Human Machine Interface (HMI) of the first embodiment of the connected diagnostic system in accordance with implementations of this disclosure.
Figure 27B:
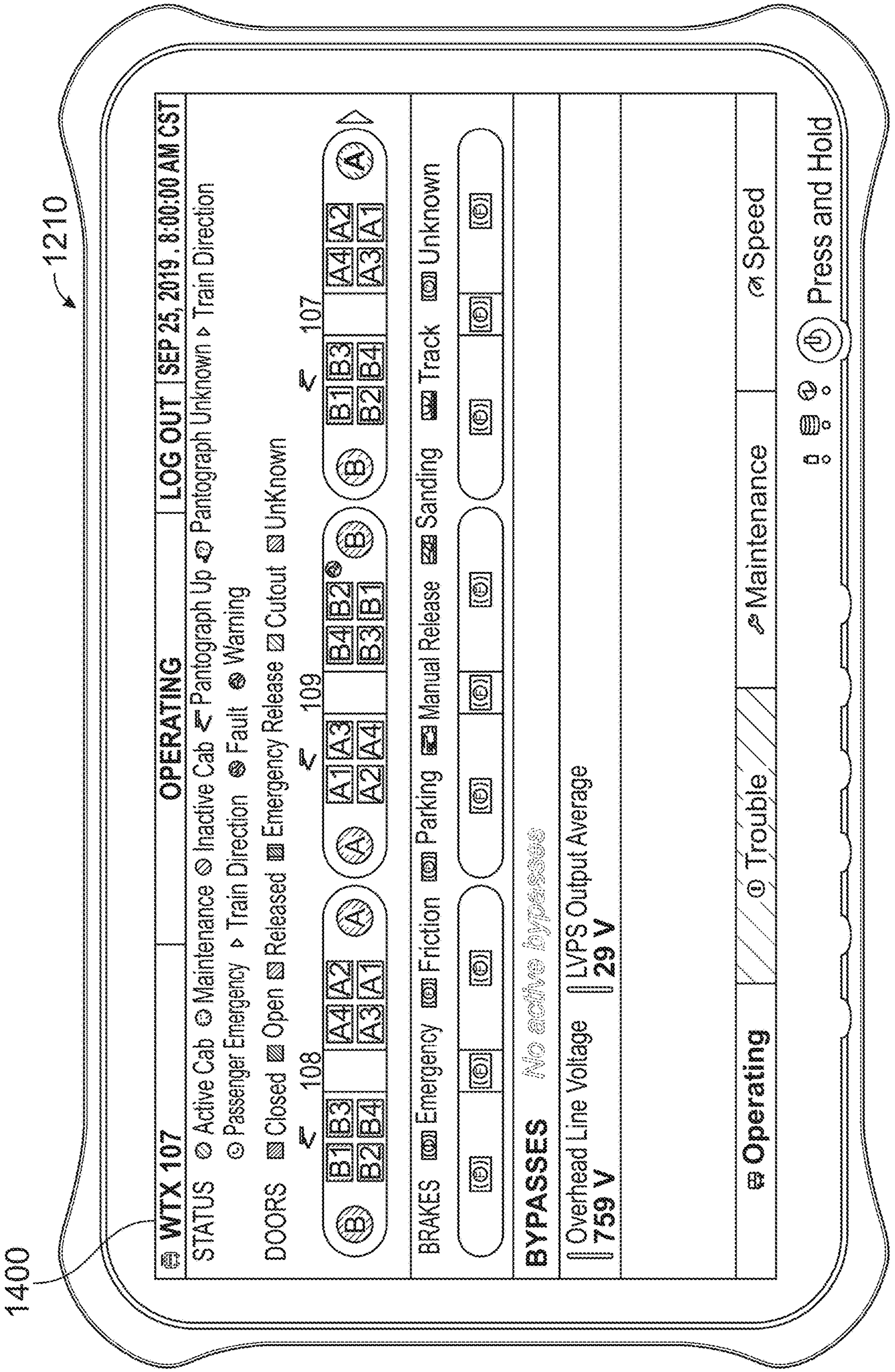
FIG. 27B is a perspective view of an instance of the onboard display and/or the Human Machine Interface (HMI) of the first embodiment of the connected diagnostic system in accordance with implementations of this disclosure.
Figure 27C:
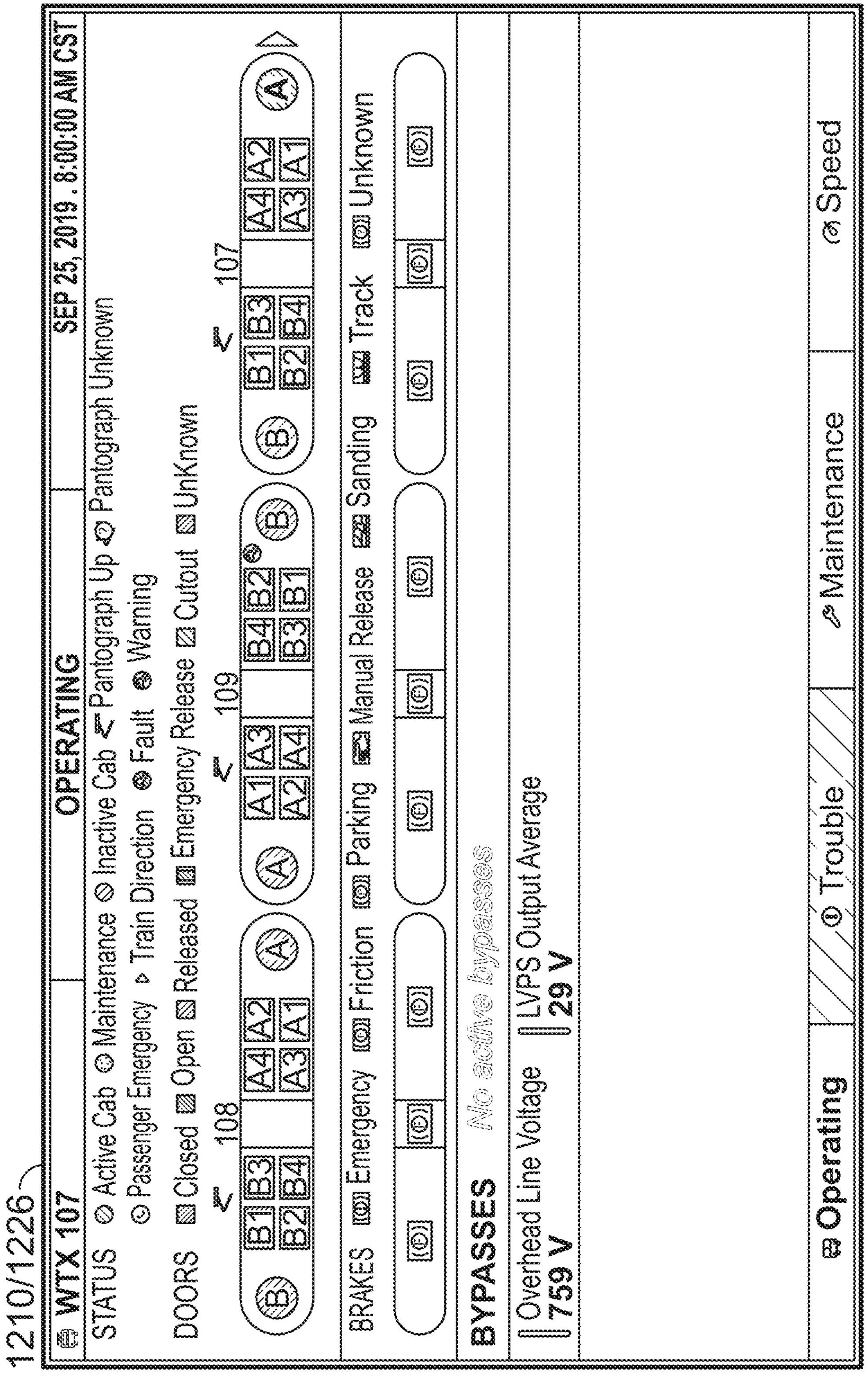
FIG. 27C is a perspective view of an instance of the remote view of the onboard display and/or the Human Machine Interface (HMI) of the first embodiment of the connected diagnostic system in accordance with implementations of this disclosure.
Figure 31A:
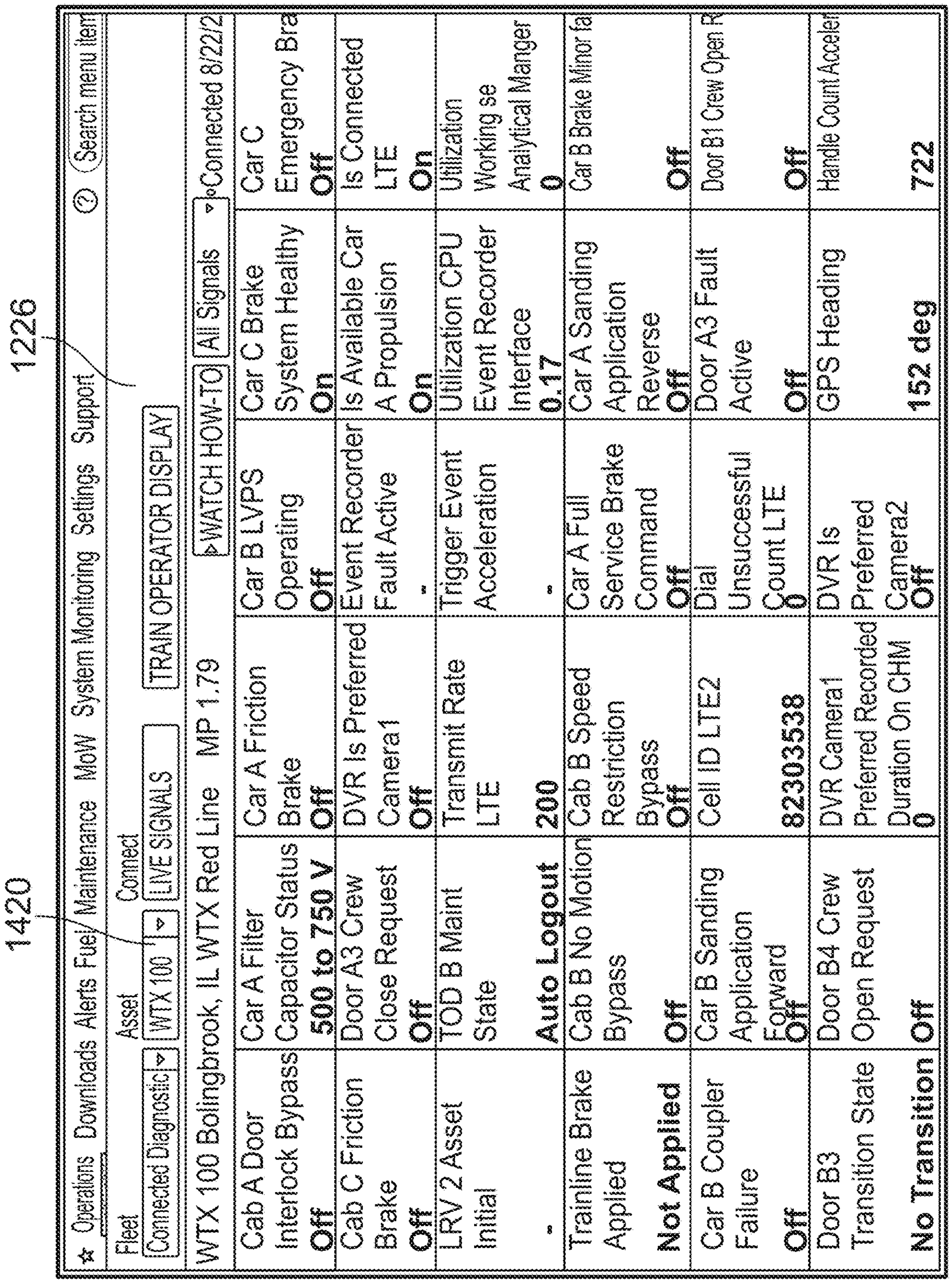
FIG. 31A is a diagram of an instance of an instance of an operations screen display of the asset of FIG. 28A on the onboard display and/or Human Machine Interface (HMI), showing live signals, of the first embodiment of the connected diagnostic system in accordance with implementations of this disclosure.
Figure 31B:
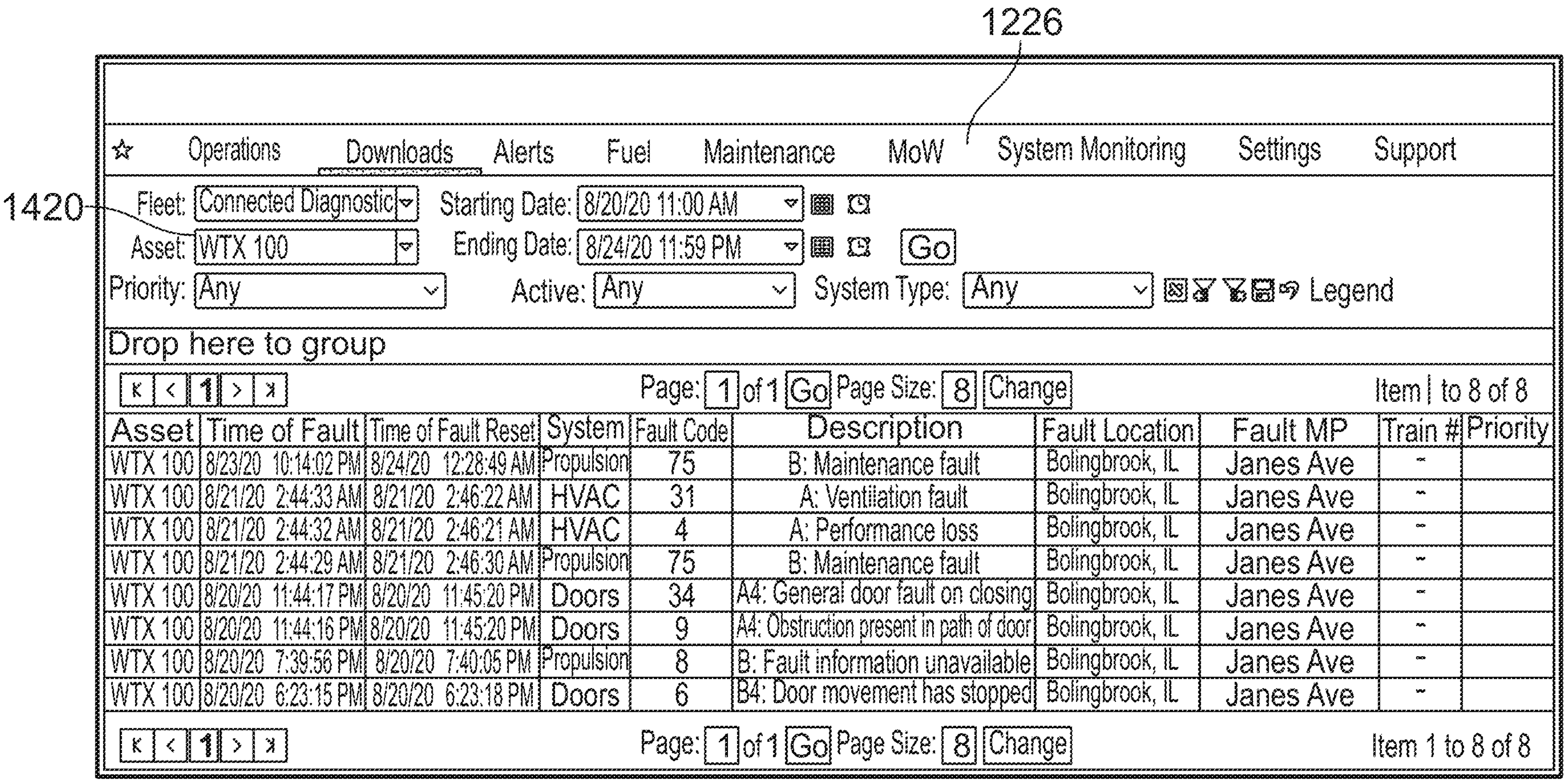
FIG. 31B is a diagram of an instance of a downloads screen display of a log of faults of the asset of FIG. 28A on a remote platform of the first embodiment of the connected diagnostic system in accordance with implementations of this disclosure.

Referring to FIGS. 25A and 25B, the connected diagnostic system 1200 can include the onboard displays and/or HMIs 1210 (FIGS. 27A and 27B), installed on a plurality of vehicles or mobile assets 1202 and connected at the same time, that act as an intelligent dashboard to provide information to remotely located end users 1214, via the onboard processing unit 1214 that streams the data to remotely located end users, while the assets 1202 are stationary or in motion. The remote web platform 1208 and/or onboard displays and/or HMIs 1210 are connected to the onboard processing unit 1216 that gathers and stores information to populate the remote instance 1206 of the onboard displays and/or HMIs 1210 and/or the onboard displays and/or HMIs 1210, such as, for example, the train operator display of one illustrated exemplary implementation, shown in FIG. 31A, that includes information relating to operations, downloads, alerts, fuel, maintenance, maintenance of way (MoW), system monitoring, settings, and support. The onboard processing unit 1216 allows streaming of data from onboard devices 1218 and DARS 100, 200, 1000, for example, to a cloud platform 1204, allows streaming of data from onboard devices 1218 and DARS 100, 200, 1000, for example, to remotely located end users 1214, and provides access to the remote web platform 1208. The remote web platform 1208 provides a remote, live look-in of the onboard display and/or the HMI 1210 of the asset 1202, such as, for example, the onboard train operator display of FIG. 27B and the remote off-board train operator display of FIG. 27C. The onboard display and/or the HMI 1210 allows visibility to events, such as faults, alerts, warnings, and informative messages, that occur onboard the asset 1202 and provides recommended troubleshooting steps. Remotely located end users 1214 can also view the same data simultaneously in a remote instance of the onboard display and/or the HMI 1210 using their remote devices, which allows remotely located end users 1214 to view any information and/or data that is onboard the asset 1202 remotely. The HMI is available on the remote web platform 1208 as well as on the onboard display 1210. When a plurality of assets 1202 are connected to each other, shown in FIGS. 26A and 26B, multiple onboard processing units 1216 communicate with their respective onboard devices 1218 and onboard displays and/or HMIs 1210 to send the data to the cloud platform 1204. This data is viewed on the remote web platform 1208 where the multiple onboard displays and/or HMIs 1210 from each of the assets 1202 can be accessed simultaneously.

Figure 28A:
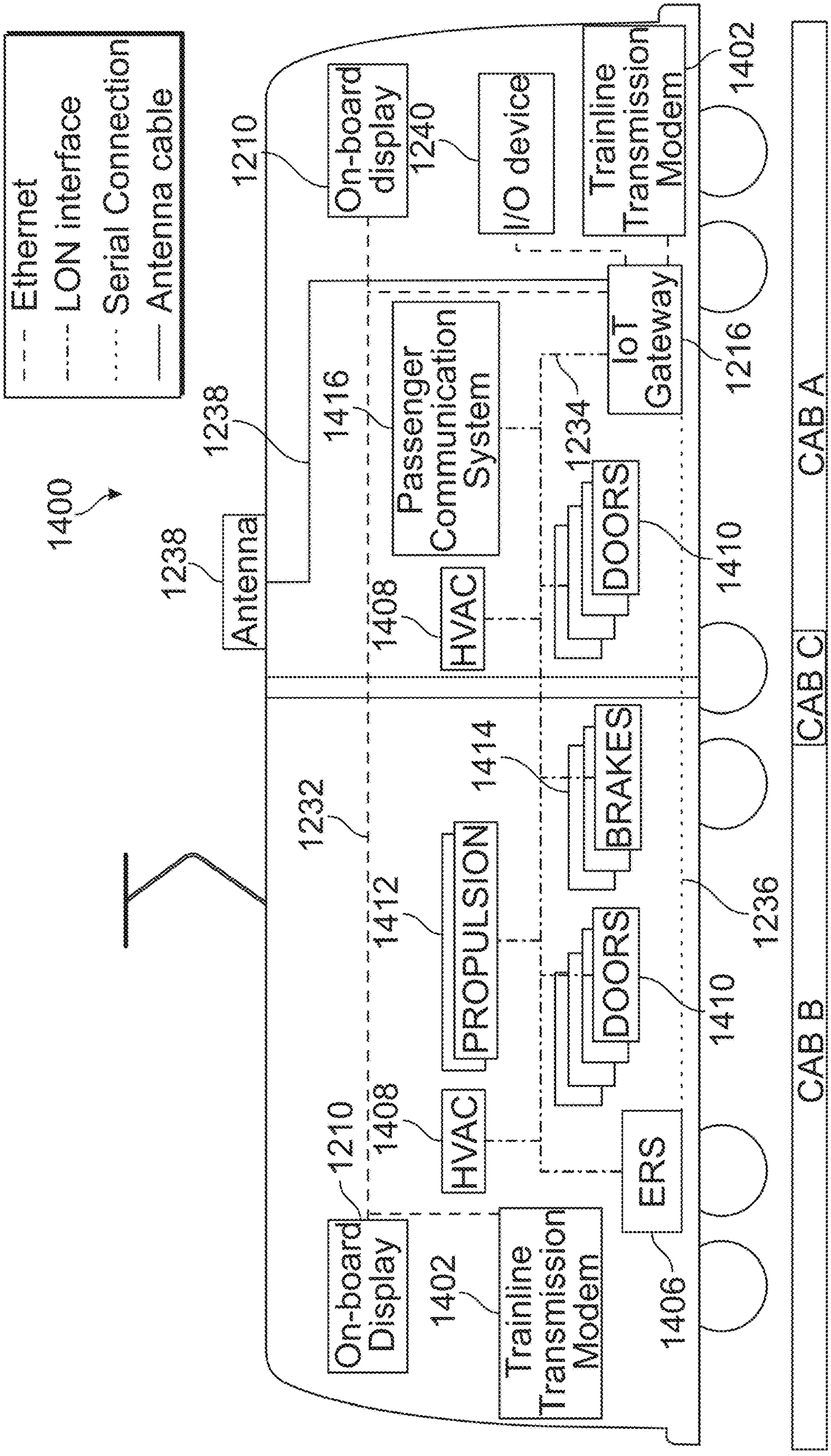
FIG. 28A is a diagram of a first illustrated exemplary implementation of an asset setup including the first embodiment of the connected diagnostic system, showing how components are connected via onboard asset communication channels and off-board communication channels, in accordance with implementations of this disclosure.
Figure 28B:
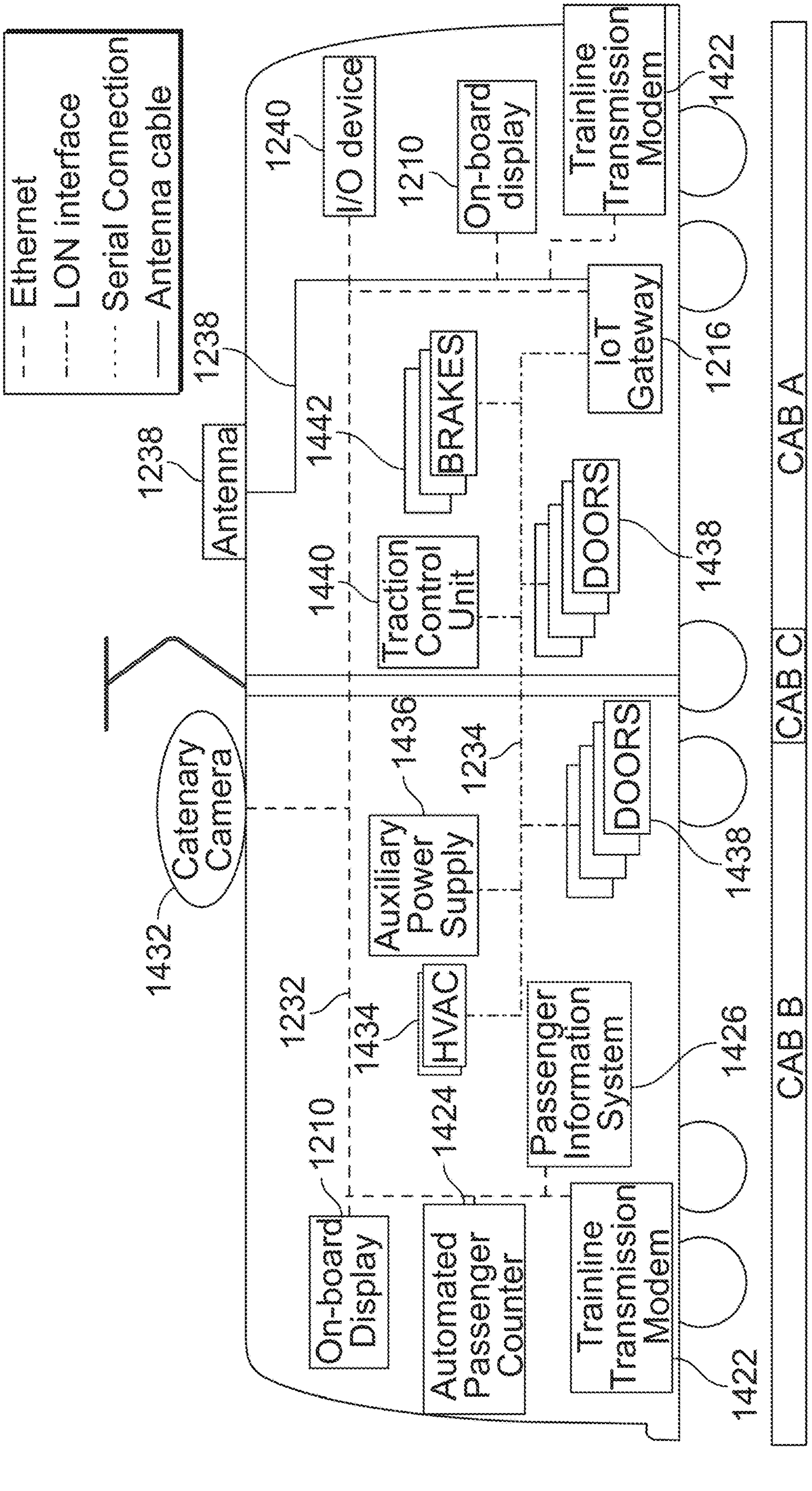
FIG. 28B is a diagram of a second illustrated exemplary implementation of an asset setup including the first embodiment of the connected diagnostic system and a catenary camera, showing how components are connected via onboard asset communication channels and off-board communication channels, in accordance with implementations of this disclosure.
Figure 28C:
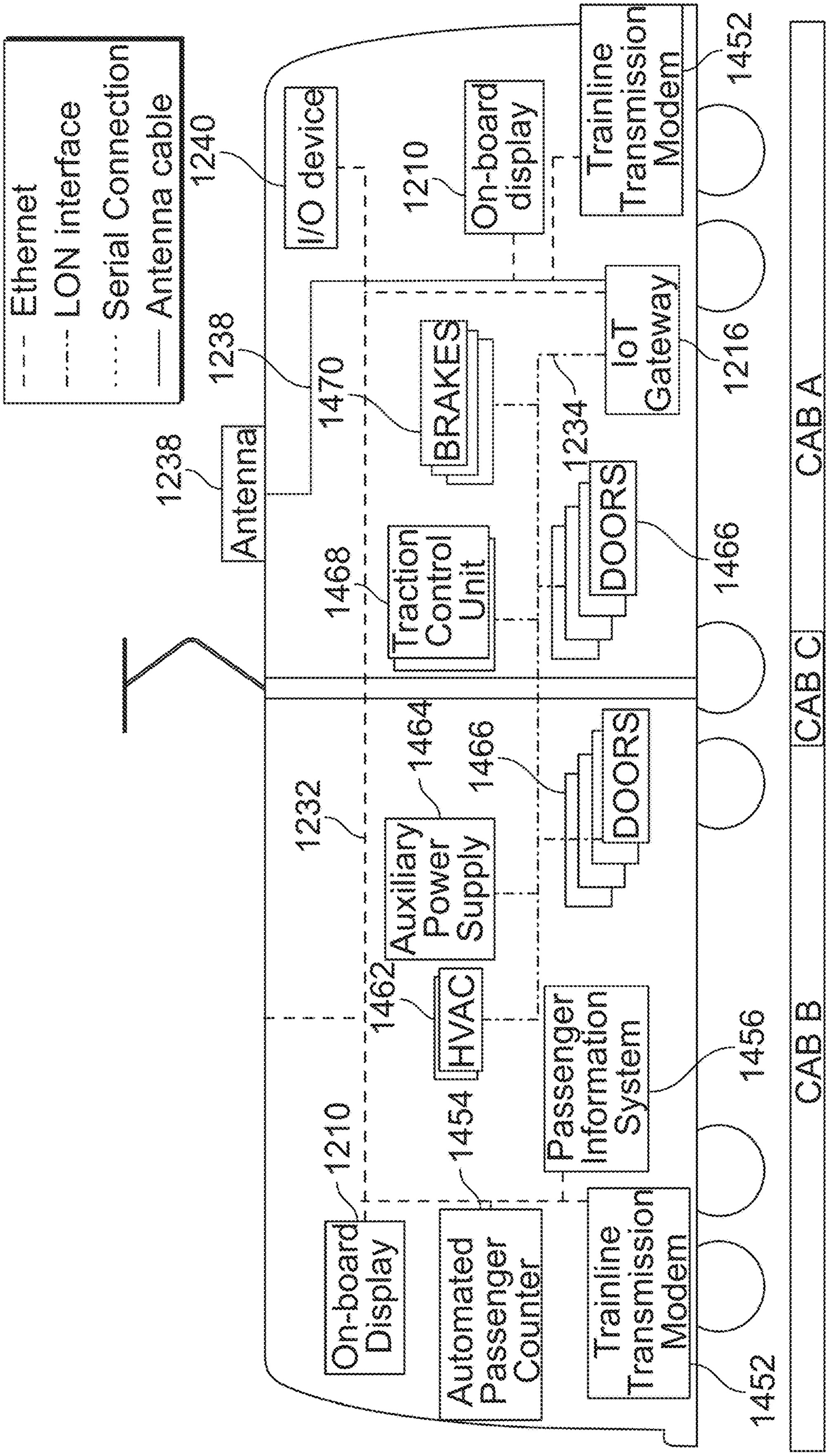
FIG. 28C is a diagram of a third illustrated exemplary implementation of an asset setup including the first embodiment of the connected diagnostic system, without a catenary camera, showing how components are connected via onboard asset communication channels and off-board communication channels, in accordance with implementations of this disclosure.

The onboard processing unit 1216 of the connected diagnostic system 1200 is capable of interfacing with various communication channels that are onboard the asset 1202, off-board the asset 1202, wired, and wireless to provide an instance 1206 showing a remote view 1226 (FIG. 27C) of the onboard display and/or the HMI 1210 (FIGS. 25A and 25B) and to allow remote visibility of the onboard systems to drive troubleshooting and diagnostic. The wired and/or wireless data links of the onboard processing unit 1216 can include any one of or combination of discrete signal inputs and/or outputs and/or analog signal inputs and/or outputs, standard or proprietary Ethernet, serial connections, and wireless connections. Examples of onboard asset communication channels 1228 (FIGS. 34, 35, and 37) include, but are not limited to, serial communication, Controller Area Network (CAN), Local Operating Network (LON), Ethernet, Multifunction Vehicle Bus (MVB), or any other means of transferring data from the onboard processing unit 1214 of the connected diagnostic system 1200 to, in this example, the onboard displays and/or HMIs 1210. Examples of onboard asset communication channels 1228 are shown in three illustrated exemplary implementations in FIGS. 28A, 28B, and 28C. FIG. 28A illustrates a train car 1400 where the communication channel of components (train operator displays 1210, Ethernet transmission modems 1402, and Input/Output (I/O) device 1240) connected to the onboard processing unit 1216 via Ethernet 1232 is shown in dashed lines, the communication channel of components (event recorder system (ERS) 1406, HVACs 1408, doors 1410, propulsion 1412, brakes 1414, and passenger communication system 1416) connected to the onboard processing unit 1216 via a LON interface 1234 is shown in thin chain lines, and the communication channel of components (ERS 1406) connected to the onboard processing unit 1216 via a serial connection 1236 is shown in dotted lines. FIG. 28B illustrates a train car 1420 where the communication channel of components (train operator displays 1210, Ethernet transmission modems 1422, APC 1424, passenger information system (PIS) 1426, I/O device 1428, DARS Internet of things (IoT) gateway 1216, catenary cameras 1432) connected via Ethernet 1232 is shown in dashed lines and the communication channel of components (HVAC 1434, APS 1436, doors 1438, traction control unit 1440, brakes 1442, and DARS IoT gateway 1216) connected via the LON interface 1234 is shown in thin chain lines. FIG. 28C illustrates a train car 1450 where the communication channel of components (train operator displays 1210, Ethernet transmission modems 1452, APC 1454, PIS 1456, I/O device 1240, and DARS Internet of things (IoT) gateway 1216) connected via Ethernet 1232 is shown in dashed lines and the communication channel of components (HVAC 1462, APS 1464, doors 1466, traction control unit 1468, brakes 1470, and DARS IoT gateway 1216) connected via the LON interface 1234 is shown in thin chain lines. Examples of off-board asset communication channels 1230 (FIGS. 34-37) include, but are not limited to, Wi-Fi, wireless local area network (WLAN), wireless metropolitan area network (WMAN), wireless wide area network (WWAN), a private wireless system, a satellite network, a cellular telephone network, or any other means of transferring data from the onboard processing unit 1216 of the connected diagnostic system 1200 to, in this example, remotely located end users 1214 (FIG. 24). Examples of off-board asset communication channels 1230 are shown in three illustrated exemplary implementations in FIGS. 28A, 28B, and 28C. FIG. 28A illustrates the train car 1400 where the communication channel of components, namely the onboard processing unit 1216, such as the DARS IoT gateway, connected via the antenna 1238 is shown in solid lines. FIG. 28B illustrates the train car 1420 where the communication channel of components, namely the onboard processing unit (DARS IoT gateway) 1216, connected via the antenna 1238 is shown in solid lines. FIG. 28C illustrated the train car 1450 where the communication channel of components, namely the onboard processing unit (DARS IoT gateway) 1216, connected via the antenna 1238 is shown in solid lines.

Wireless connectivity enables real-time location information and navigation data, which allows tracking of the asset 1202 remotely and provides users accurate availability and service information. Diagnostic logs from the onboard processing unit 1216 are streamed instantly to the cloud platform 1204 and can be accessed by the control center 1212 for reliable serviceability. The data and/or diagnostic logs are optionally stored in an integrated or standalone crash hardened memory module 1220 (FIGS. 25A and 25B) of the connected diagnostic system 1200 and/or the crash hardened memory module 118 of DARS 100, the crash hardened memory module 218 of DARS 200, optionally in the non-crash hardened storage 219 of DARS 200, and/or the crash hardened memory module 1018 of DARS 1000, in the event of an incident and are still accessible onboard the asset 1202 and/or off-board the asset 1202. An exemplary hardened memory module 1220 can be, for example, a crashworthy event recorder memory module that complies with the Federal Railroad Administration Regulations of the Code of Federal Regulations, a crash survivable memory unit that complies with the Code of Federal Regulations and/or the Federal Aviation Administration regulations, a crash hardened memory module in compliance with any applicable Code of Federal Regulations, or any other suitable hardened memory device as is known in the art.

The onboard processing unit 1216 collects data from different devices, including, but not limited to, onboard devices 1218 and the data recorder 154, 254, 1054 of DARS 100, 200, 1000, respectively, and information sources of DARS 100, 200, 1000, which can include any number of components in the asset 148, 248, 1048, such as any of analog inputs 102, 202, 1002, digital inputs 104, 204, 1004, I/O module 106, 206, 1006, vehicle controller 108, 208, 1008, engine controller 110, 210, 1010, inertial sensors 112, 212, 1012, global positioning system (GPS) 114, 214, 1014, cameras 116, 216, 1016, positive train control (PTC)/signal data 166, 266, 1066, fuel data 168, 268, 1068, cellular transmission detectors (not shown), internally driven data and any additional data signals, and any number of components in the data center 150, 250, 1050, such as any of the route/crew manifest component 124, 224, 1024, the weather component 126, 226, 1026, the map component 164, 264, 1064, and any additional data signals, and makes the data immediately available on the cloud platform 1204 for remote monitoring of the assets 1202.

Figure 29:
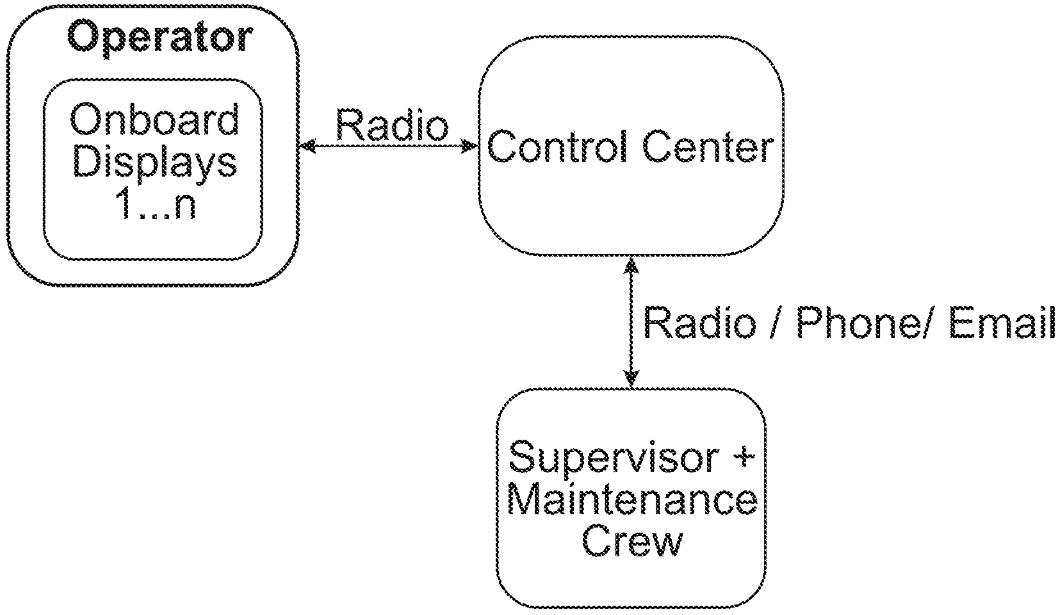
FIG. 29 (Prior Art)
FIG. 29 is a diagram of the existing workflow for vehicle operations of the prior art.

Prior to the connected diagnostic system 1200 of the present disclosure, existing systems allowed either onboard or off-board views of data generated by onboard devices and was generally limited to data from only a single asset or data from a consist. FIG. 29 provides insights to the workflow of the interaction, in existing systems, between an operator, control center, and maintenance crew. When a vehicle is in operation and there is an issue, the operator generally must reach the control center via radio. The control center then initiates a conversation back and forth between the operator and maintenance crew to troubleshoot the issue or dispatch crew to further enable troubleshooting. Dispatch is required in cases where the crew is unable to assist the vehicle troubleshooting remotely. Timely resolution is required to reduce service disruption for passengers and to maintain customer satisfaction.

Figure 28D:
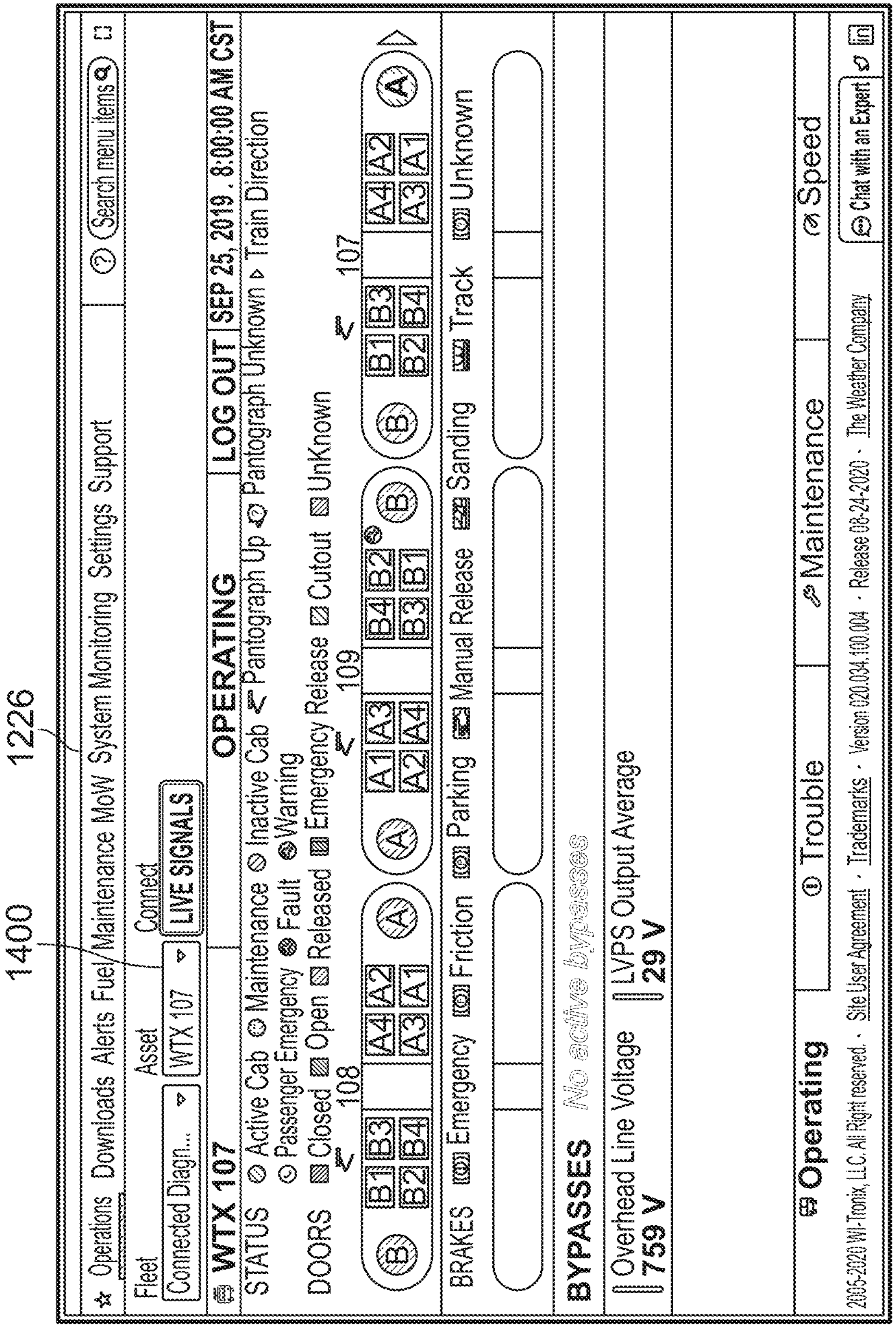
FIG. 28D is a diagram of an instance of a remote view of the onboard display and/or the Human Machine Interface (HMI) of the first embodiment of the connected diagnostic system in accordance with implementations of this disclosure.
Figure 30:
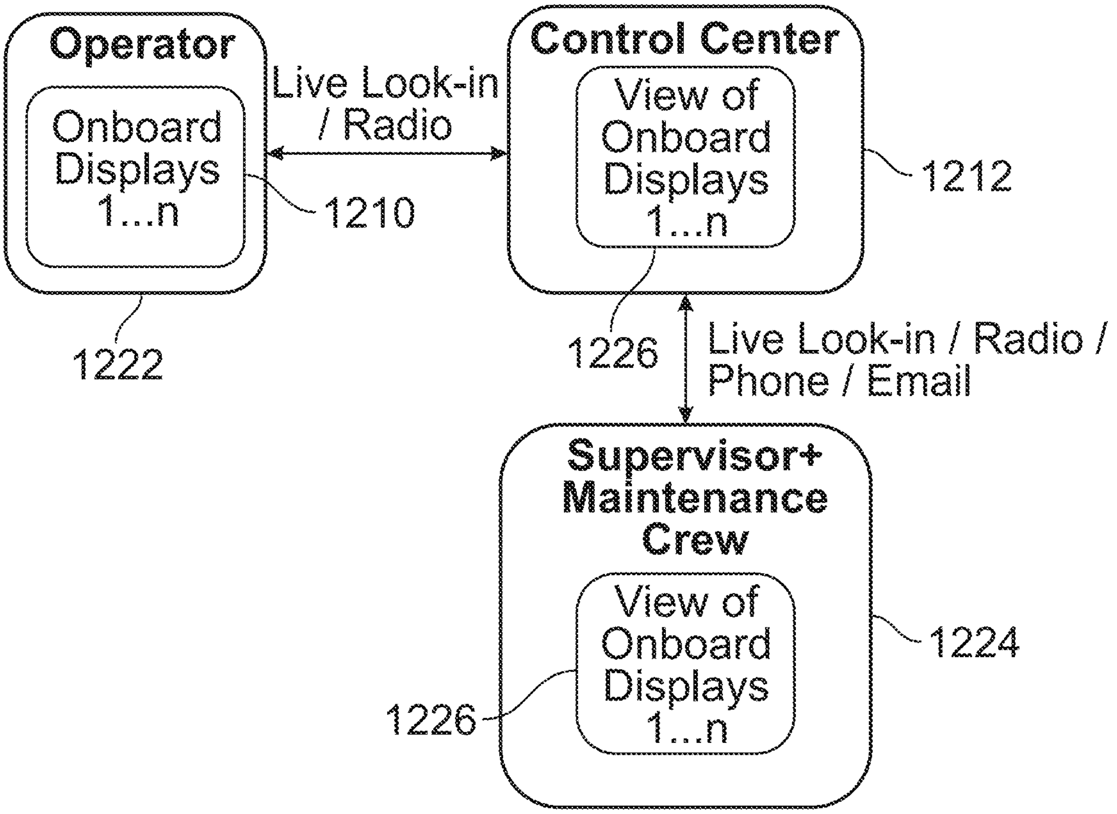
FIG. 30 is a diagram of a workflow for vehicle operations of the first embodiment of the connected diagnostic system in accordance with implementations of this disclosure.

Referring to FIG. 30, which provides a view of the workflow of the connected diagnostic system 1200 between operators 1222, the control center 1212, and supervisors and/or maintenance crew 1224, the connected diagnostic system 1200 allows simultaneous remote and onboard viewing of data from onboard displays and/or HMIs 1210 for any asset 1202 in the fleet. The remote access to the data can be viewed on a plurality of devices including, but not limited to, desktop computers, tablets, mobile phones, and/or other handheld devices. Supervisors, control centers, and other remotely located end users 1214 can view the operator display 1210 (FIG. 28D) remotely in real-time and the connected diagnostic system 1200 provides the remotely located end users 1214 with the ability to navigate to screens different from the view on the onboard display and/or the HMI 1210 onboard the asset 1202, which creates a virtual in-cab experience and allows real-time action to allow remote guidance, troubleshooting, and repair of the asset 1202. The connected diagnostic system 1200 enables rapid resolution of issues by reducing the time required to relay information and minimizes service disruptions. In some cases, the control center 1212 is able to dispatch the maintenance crew 1224 before the operator 1222 calls in to request assistance since the control center 1212 has access to all onboard information. Maintenance crews 1224 also have access to the same information as the operator 1222 and the control center 1212, which helps them quickly identify the issues and aids in faster resolution.

Prior to the connected diagnostic system 1200 of the present disclosure, existing systems provided access to current data on the vehicle for a single device or in the consist form. This data was only available onboard the vehicle or off-board the vehicle.

The connected diagnostic system 1200 is not limited to only a single asset or consist. The connected diagnostic system 1200 allows users to access data for any asset 1202 in the fleet. With the connected diagnostic system 1200, the data is available simultaneously both onboard the asset 1202 and off-board the asset 1202, which allows supervisors and maintenance crews 1224 to compare the performance of an existing asset 1202 with issues with another set of assets in the fleet to quickly identify the issues and resolve them.

Prior to the connected diagnostic system 1200 of the present disclosure, existing systems only provided access to data from onboard devices on the vehicle via an onboard display and/or HMI. This data was only available onboard the vehicle or off-board the vehicle. Some onboard devices of existing systems also have limited storage capabilities.

The connected diagnostic system 1200 provides access to current data and historical data obtained from the onboard devices 1218. Access to historical data is important, for example, by providing supervisors and maintenance personnel access to historical faults and alerts to determine a trend in the fleet or an asset's health to enable future maintenance decisions. With the connected diagnostic system 1200, the data is available simultaneously both onboard the asset 1202 and off-board the asset 1202. The connected diagnostic system 1200 can support historical data storage for up to 100 days, in this illustrated implementation, which can be extended as needed onboard the asset 1202. Off-board the asset 1202, the data can be stored for 2 years and can also be extended as needed.

Prior to the connected diagnostic system 1200 of the present disclosure, existing systems included onboard displays and/or HMIs that were fixed to the vehicle cab control panels. This docked mode of fixed onboard displays and/or HMIs was not useful to the crew when there were issues on the vehicle where simultaneous viewing of the onboard display and/or the HMI was required to troubleshoot.

The connected diagnostic system 1200 allows onboard displays and/or HMIs 1210 to be undocked, which allows users to move the onboard displays and/or HMIs 1210 to desired locations throughout the asset 1202 to enable troubleshooting. The portability of the onboard displays and/or HMIs 1210 also allows users to take images and videos using the onboard display and/or the HMI 1210, which comes equipped with a built in camera (not shown), to enable troubleshooting of the asset 1202. For example, in existing systems, when there is an issue with the door system, the maintenance crew must walk back and forth to resolve the issue between the cab and the door. The connected diagnostic system 1200 allows the maintenance crew or technician 1224 to view the data on the onboard display and/or the HMI 1210 while troubleshooting the issue in the same location, such as where the doors are located, thereby reducing the time and effort required to troubleshoot. Other examples include, but are not limited to, viewing engine data, light rail vehicle (LRV) leveling to adjust the suspension system in order to align on the platform, pantograph raise, visual inspection aligned with status on display, automated checklist on display-visual inspection and confirmation via screen, and integrated tablet camera for augmented reality (AR), which allows for an augmented reality experience for troubleshooting for methods such as pinpointing parts that have failed, advising on a part that has been repaired, and providing walk through troubleshooting steps.

Prior to the connected diagnostic system 1200 of the present disclosure, existing systems provided access to the current software version information either onboard the vehicle or off-board the vehicle for a single vehicle or the consist view.

The connected diagnostic system 1200 provides access to current and historical software version information and release dates of all the onboard devices 1218. This data is available simultaneously both onboard the asset 1202 and off-board the asset 1202. The connected diagnostic system 1200 enables keeping a comprehensive record of the software that was updated on all the assets 1202, which is beneficial during troubleshooting, and enables railroads, in the illustrated exemplary implementation, to comply with operating and maintenance practices, record keeping, configuration management, and change control management.

Prior to the connected diagnostic system 1200 of the present disclosure, existing systems provided visual and audible notifications, including natural language processing, only onboard the vehicle or off-board the vehicle to vehicle-related events including, but not limited to, alerts (e.g., passenger emergencies), delays, severe weather warnings, faults generated by onboard devices (e.g., door open enroute), informative messages, and route information.

Figure 32A:
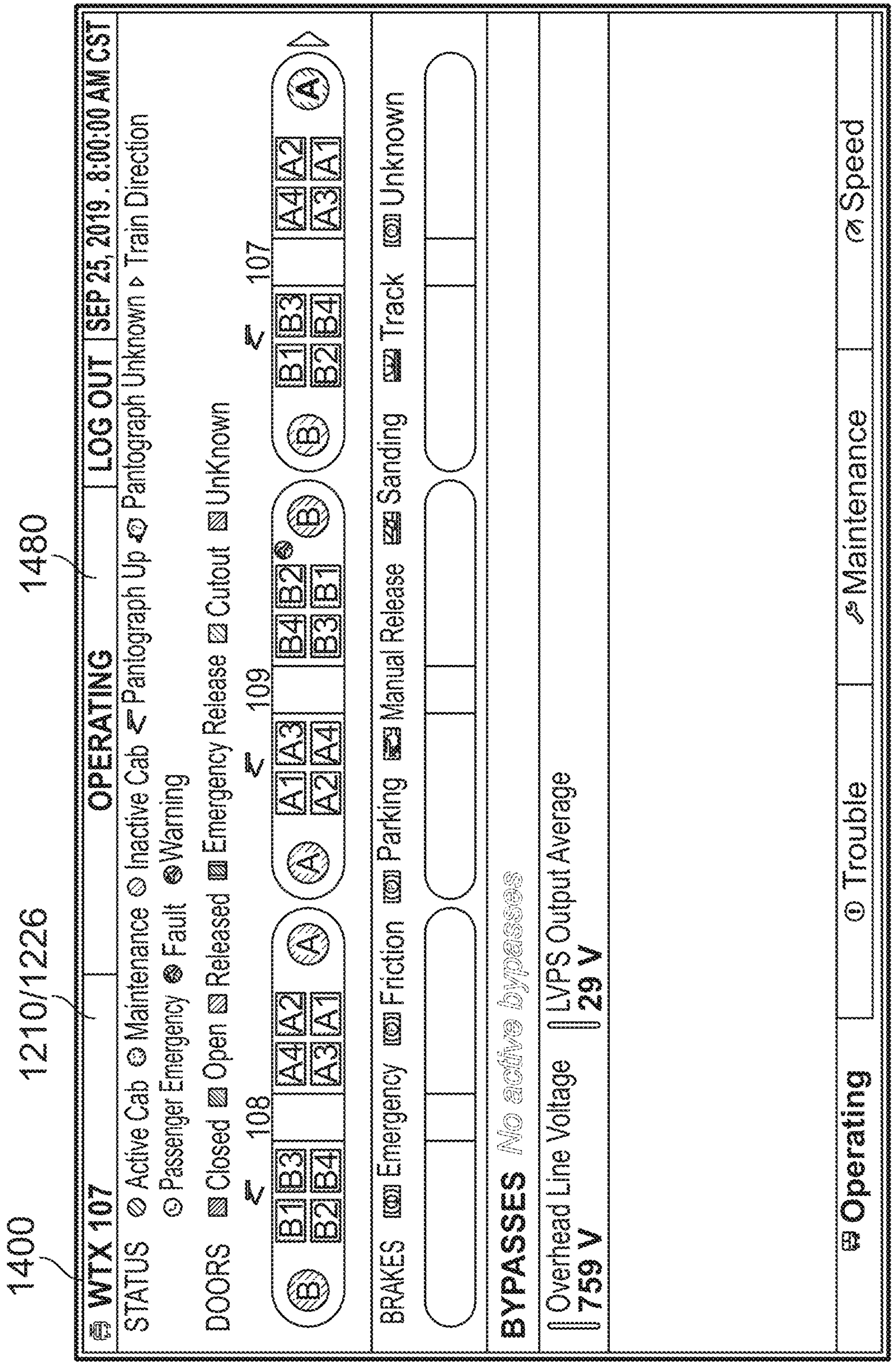
FIG. 32A is a diagram of an instance of an operating screen display of the asset of FIG. 28A including the first embodiment of the connected diagnostic system, which can be displayed on the onboard display and/or Human Machine Interface (HMI) and/or a remote view of the onboard display and/or the HMI on a remote web platform, in accordance with implementations of this disclosure.
Figure 32B:
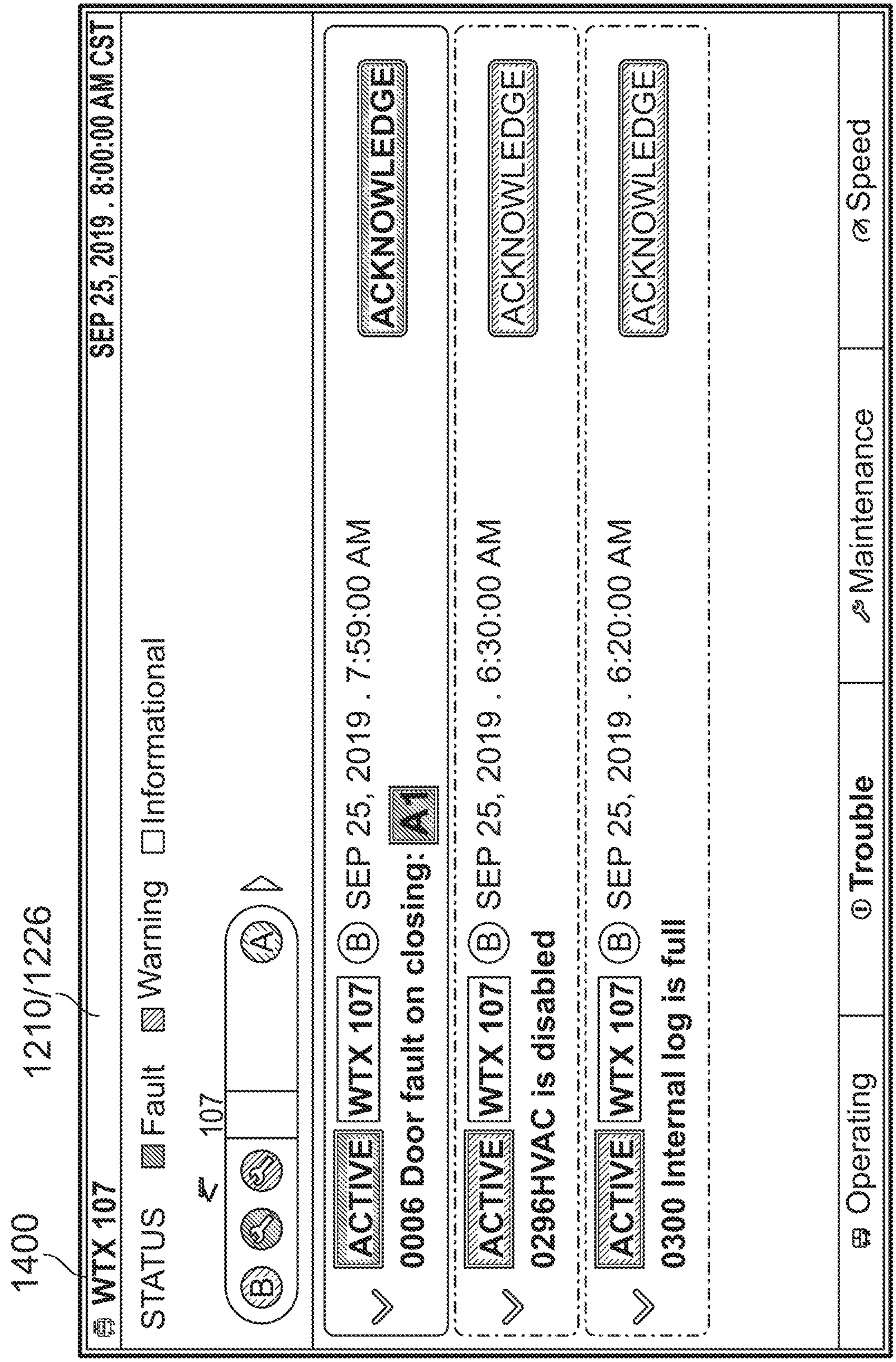
FIG. 32B is a diagram of an instance of a trouble screen display of the asset of FIG. 28A including the first embodiment of the connected diagnostic system, which can be displayed on the onboard display and/or Human Machine Interface (HMI) and/or a remote view of the onboard display and/or the HMI on a remote web platform, in accordance with implementations of this disclosure.
Figure 32C:
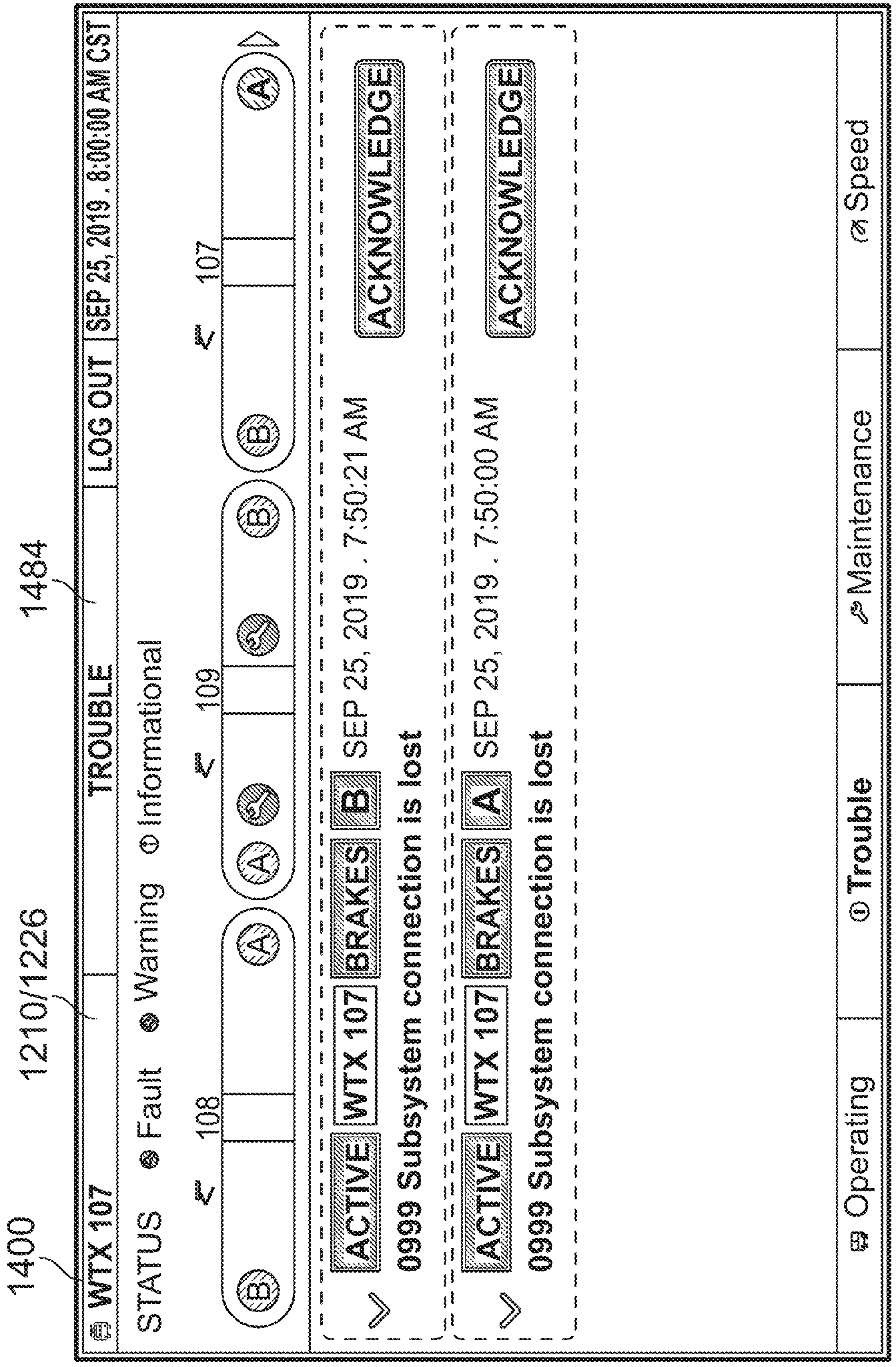
FIG. 32C is a diagram of an instance of a trouble screen display of the asset of FIG. 28A including the first embodiment of the connected diagnostic system, which can be displayed on the onboard display and/or Human Machine Interface (HMI) and/or a remote view of the onboard display and/or the HMI on a remote web platform, in accordance with implementations of this disclosure.
Figure 32D:
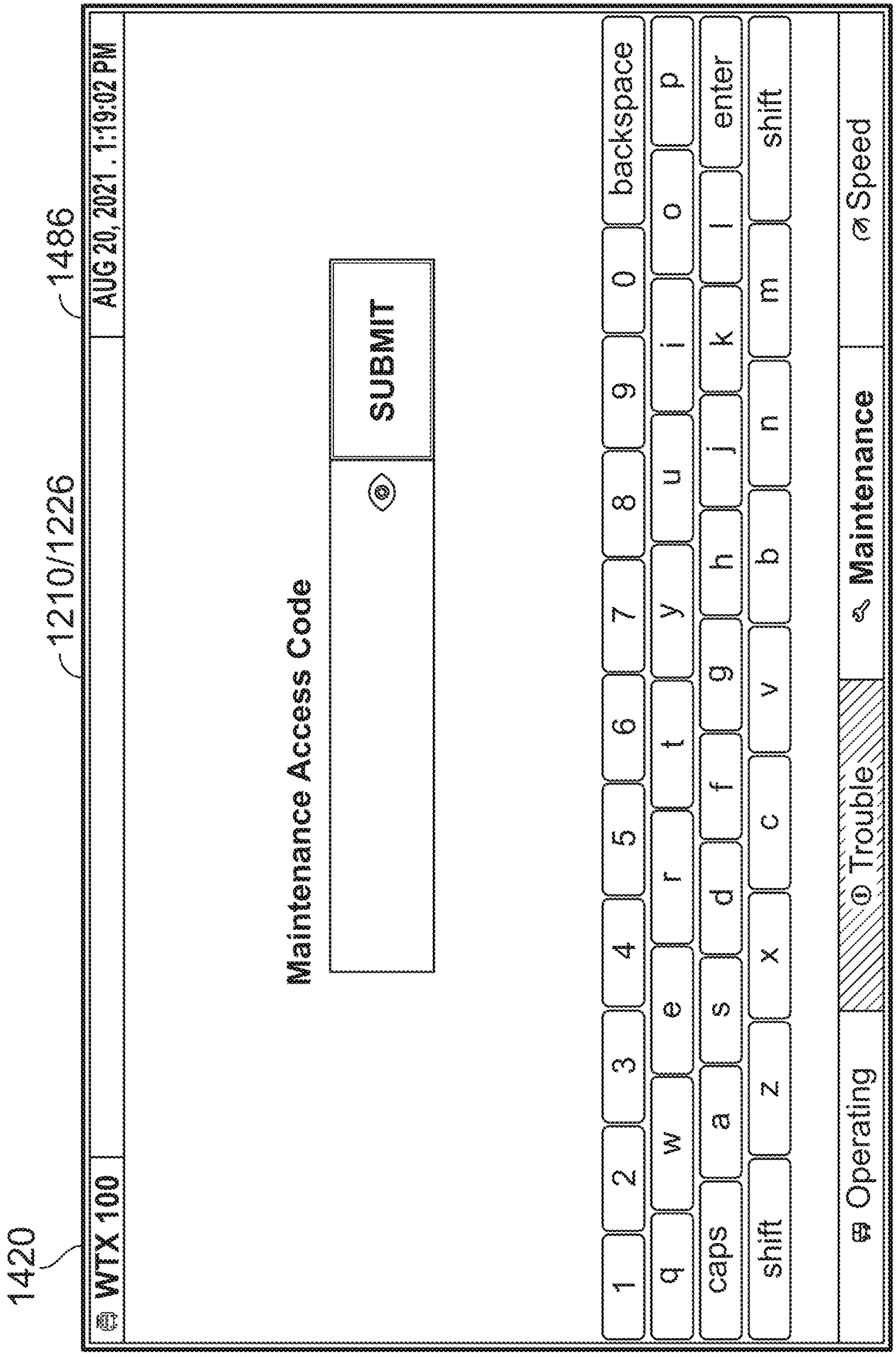
FIG. 32D is a diagram of an instance of a maintenance screen display of the asset of FIG. 28B including the first embodiment of the connected diagnostic system, showing an access screen, which can be displayed on the onboard display and/or Human Machine Interface (HMI) and/or a remote view of the onboard display and/or the HMI on a remote web platform, in accordance with implementations of this disclosure.
Figure 32E:
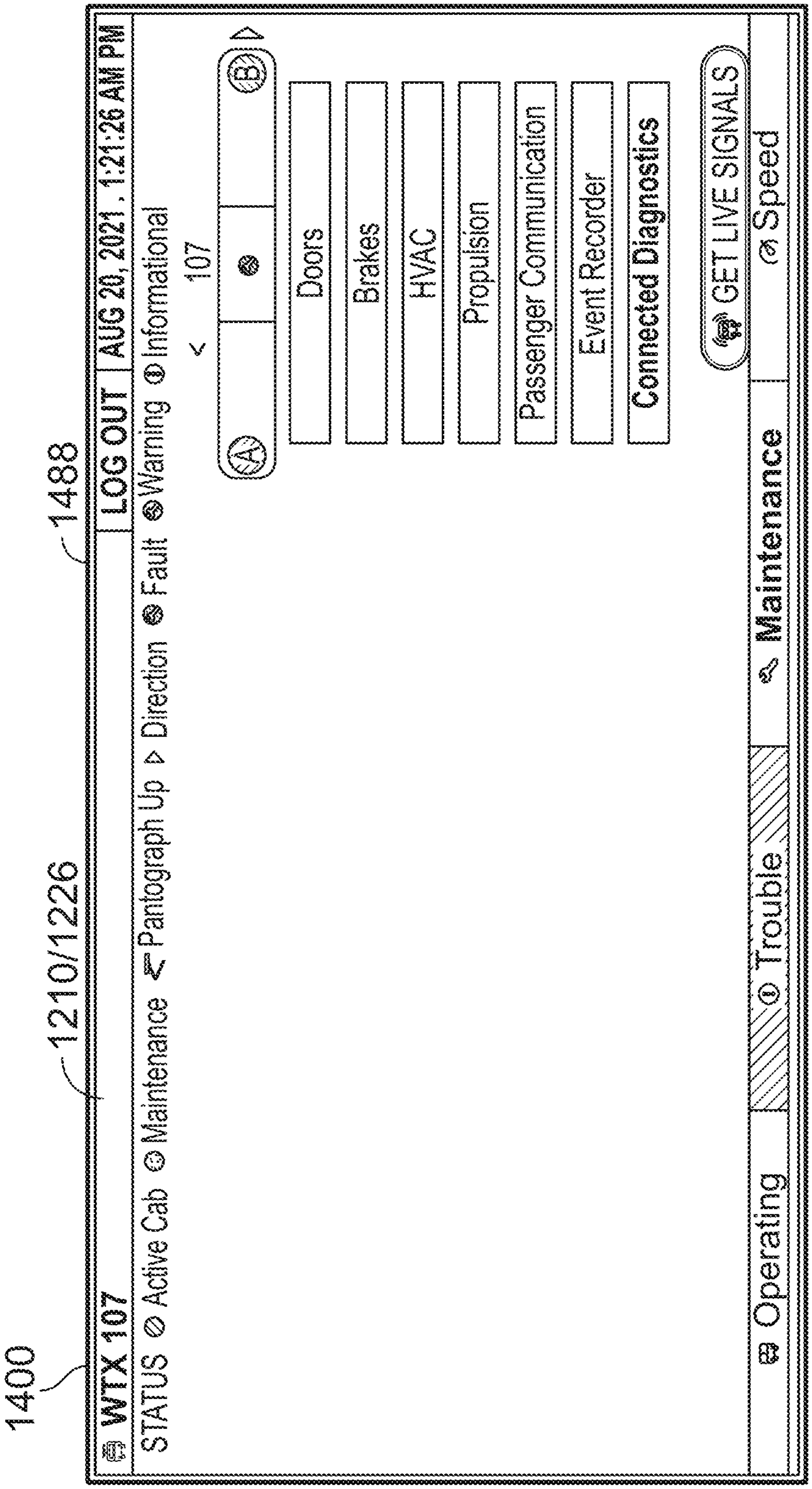
FIG. 32E is a diagram of an instance of a maintenance screen display of the asset of FIG. 28A including the first embodiment of the connected diagnostic system, showing a system status screen, which can be displayed on the onboard display and/or Human Machine Interface (HMI) and/or a remote view of the onboard display and/or the HMI on a remote web platform, in accordance with implementations of this disclosure.
Figure 32F:
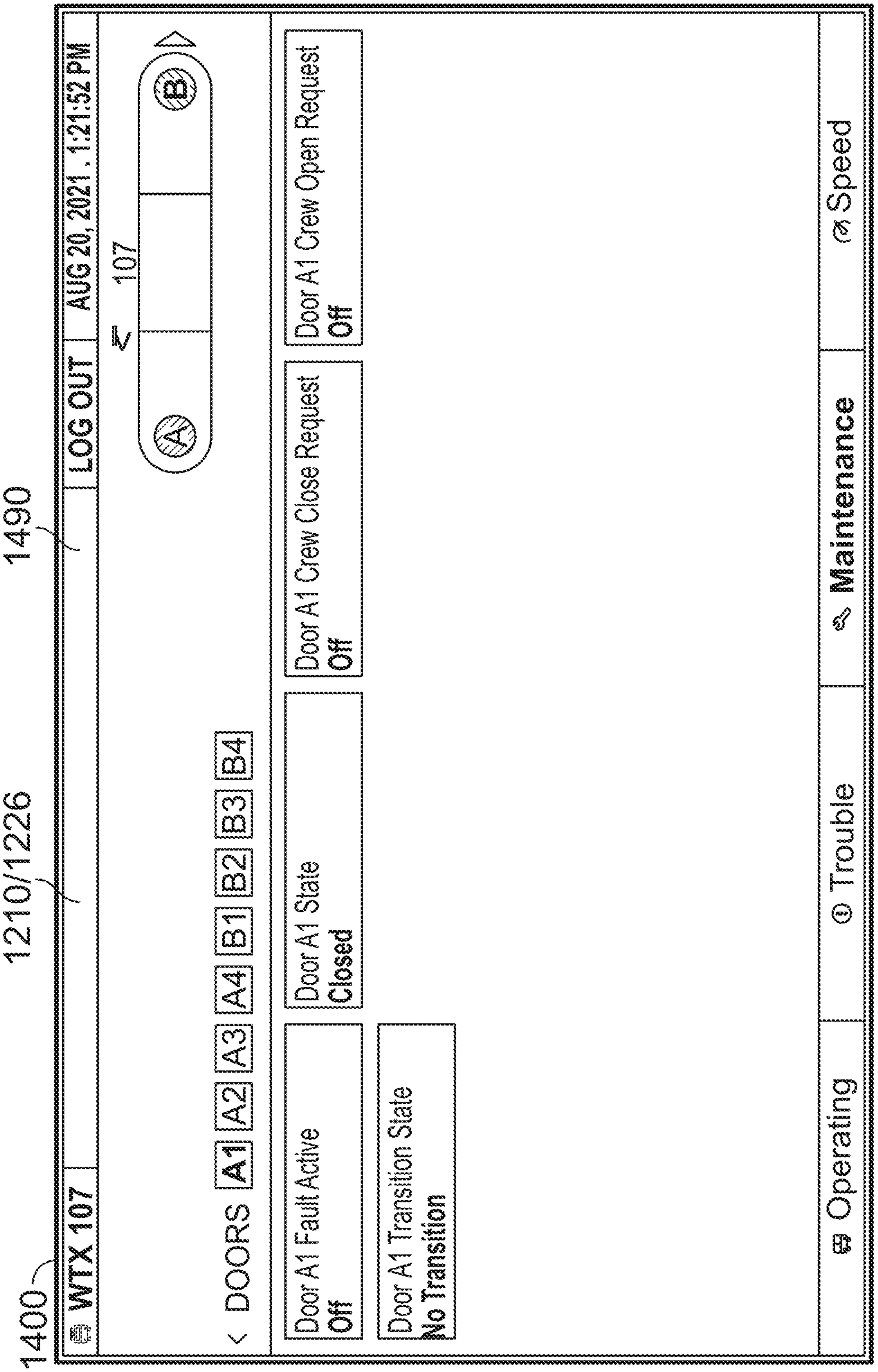
FIG. 32F is a diagram of an instance of a maintenance screen display of the asset of FIG. 28A including the first embodiment of the connected diagnostic system, showing a subsystem status screen, which can be displayed on the onboard display and/or Human Machine Interface (HMI) and/or a remote view of the onboard display and/or the HMI on a remote web platform, in accordance with implementations of this disclosure.
Figure 32G:
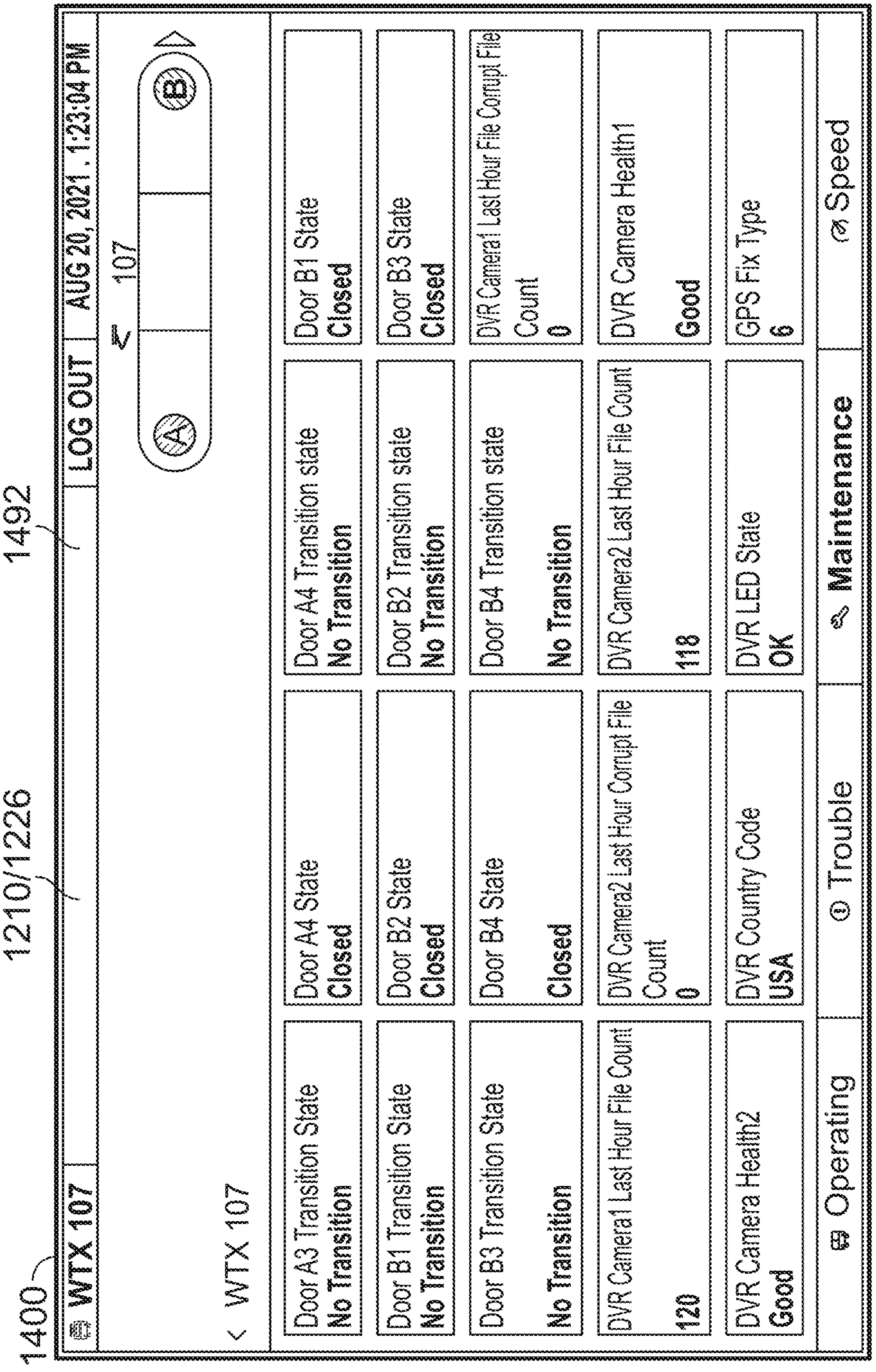
FIG. 32G is a diagram of an instance of a maintenance screen display of the asset of FIG. 28A including the first embodiment of the connected diagnostic system, showing on demand data from live signals, which can be displayed on the onboard display and/or Human Machine Interface (HMI) and/or a remote view of the onboard display and/or the HMI on a remote web platform, in accordance with implementations of this disclosure.
Figure 32H:
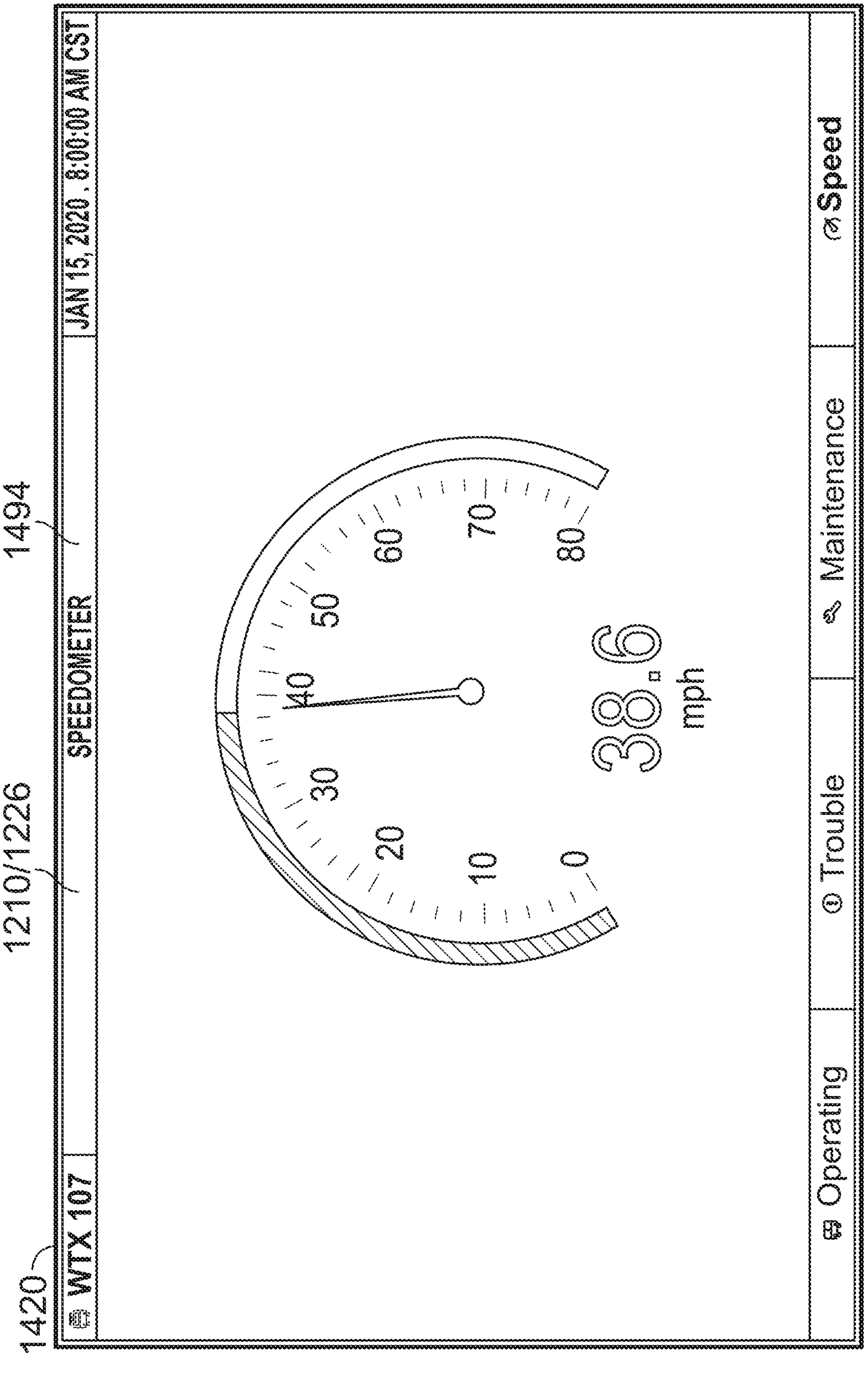
FIG. 32H is a diagram of an instance of a speedometer screen display of the asset of FIG. 28B including the first embodiment of the connected diagnostic system, which can be displayed on the onboard display and/or Human Machine Interface (HMI) and/or a remote view of the onboard display and/or the HMI on a remote web platform, in accordance with implementations of this disclosure.
Figure 32I:
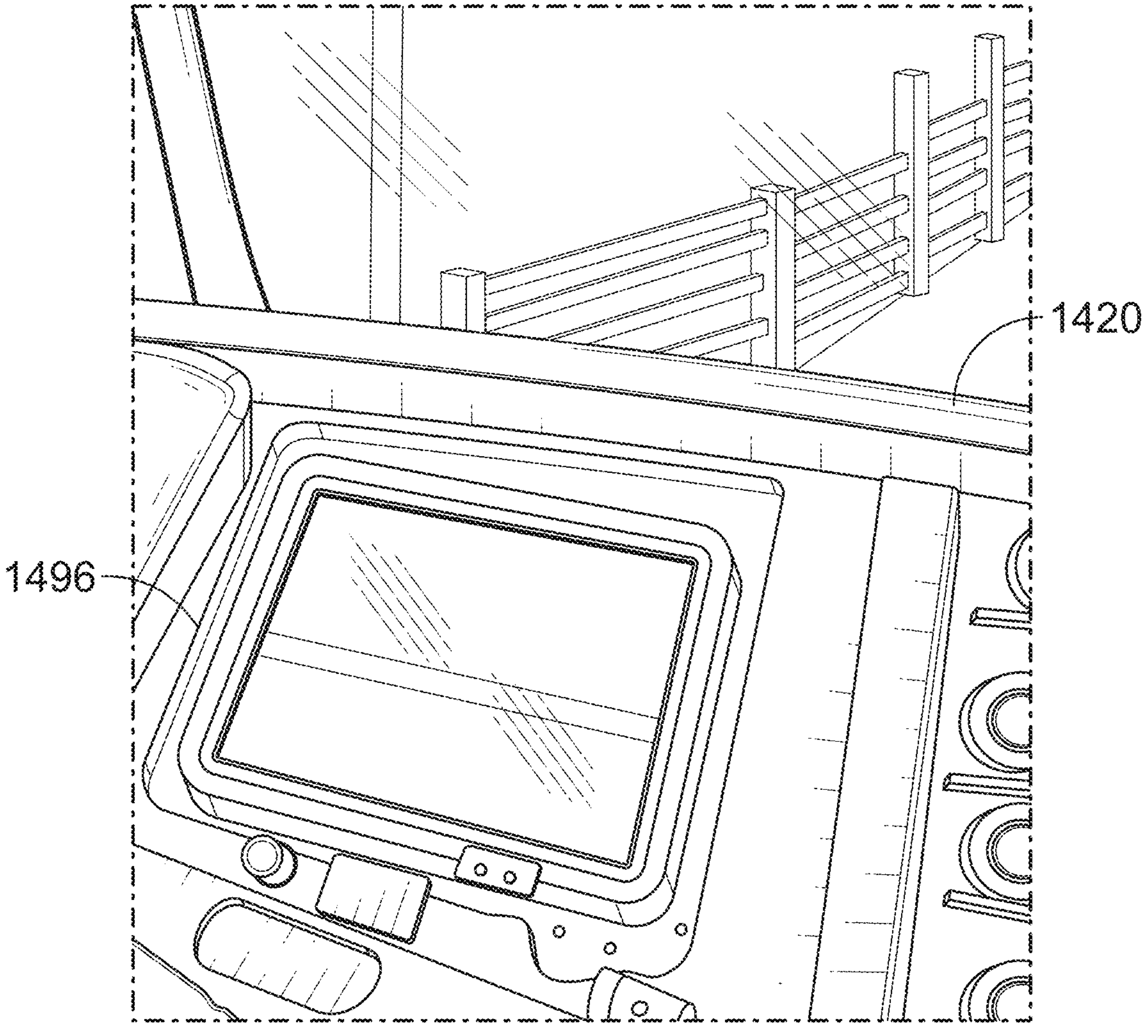
FIG. 32I is a diagram of an instance of a settings screen display of a fourth illustrated exemplary implementation of an asset including the first embodiment of the connected diagnostic system, which can be displayed on the onboard display and/or Human Machine Interface (HMI) and/or a remote view of the onboard display and/or the HMI on a remote web platform, in accordance with implementations of this disclosure.
Figure 32J:
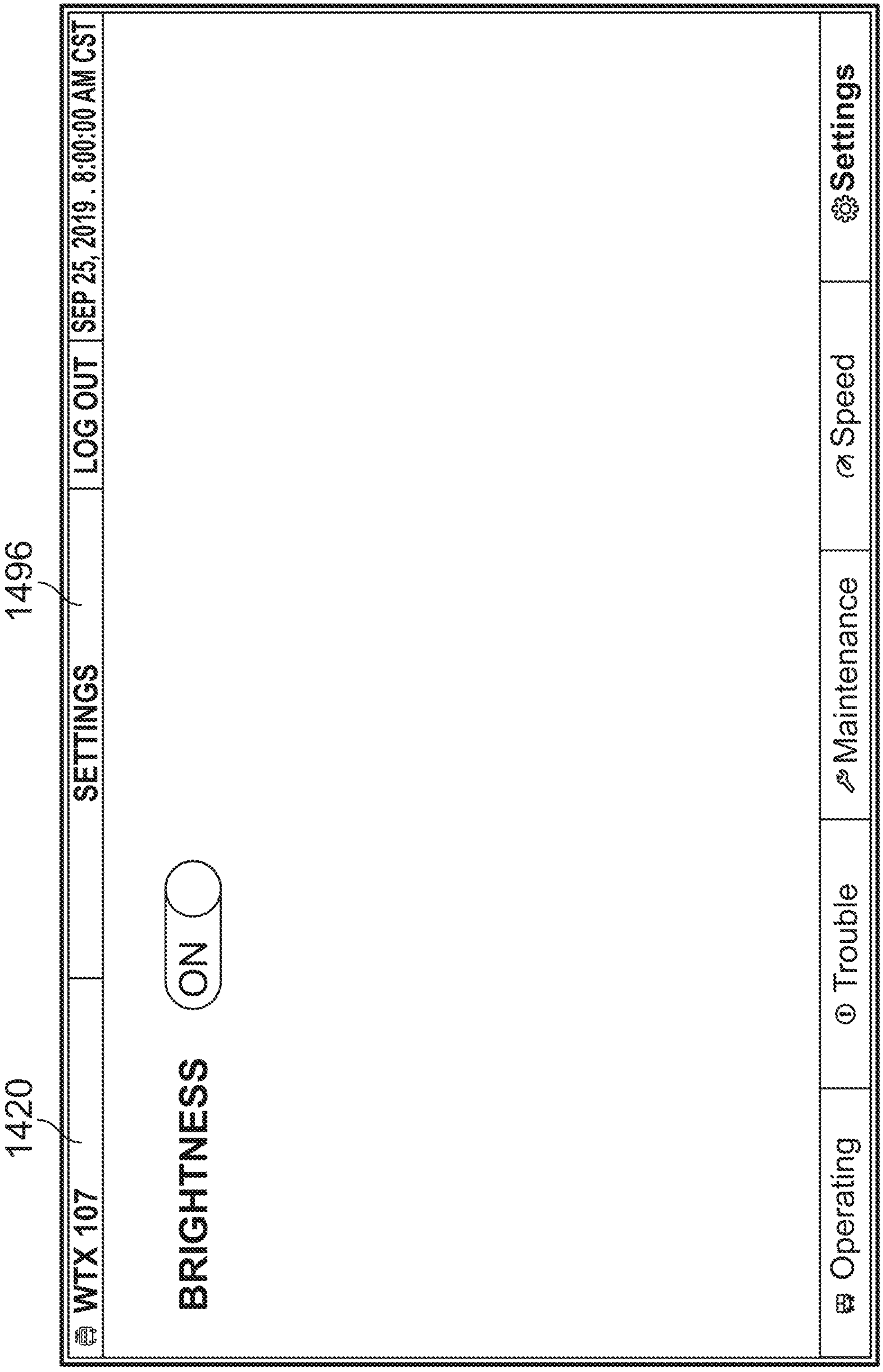
FIG. 32J is a diagram of an instance of a settings screen display of the fourth illustrated exemplary implementation of an asset including the first embodiment of the connected diagnostic system, showing a brightness toggle radio button, which can be displayed on the onboard display and/or Human Machine Interface (HMI) and/or a remote view of the onboard display and/or the HMI on a remote web platform, in accordance with implementations of this disclosure.
Figure 32K:
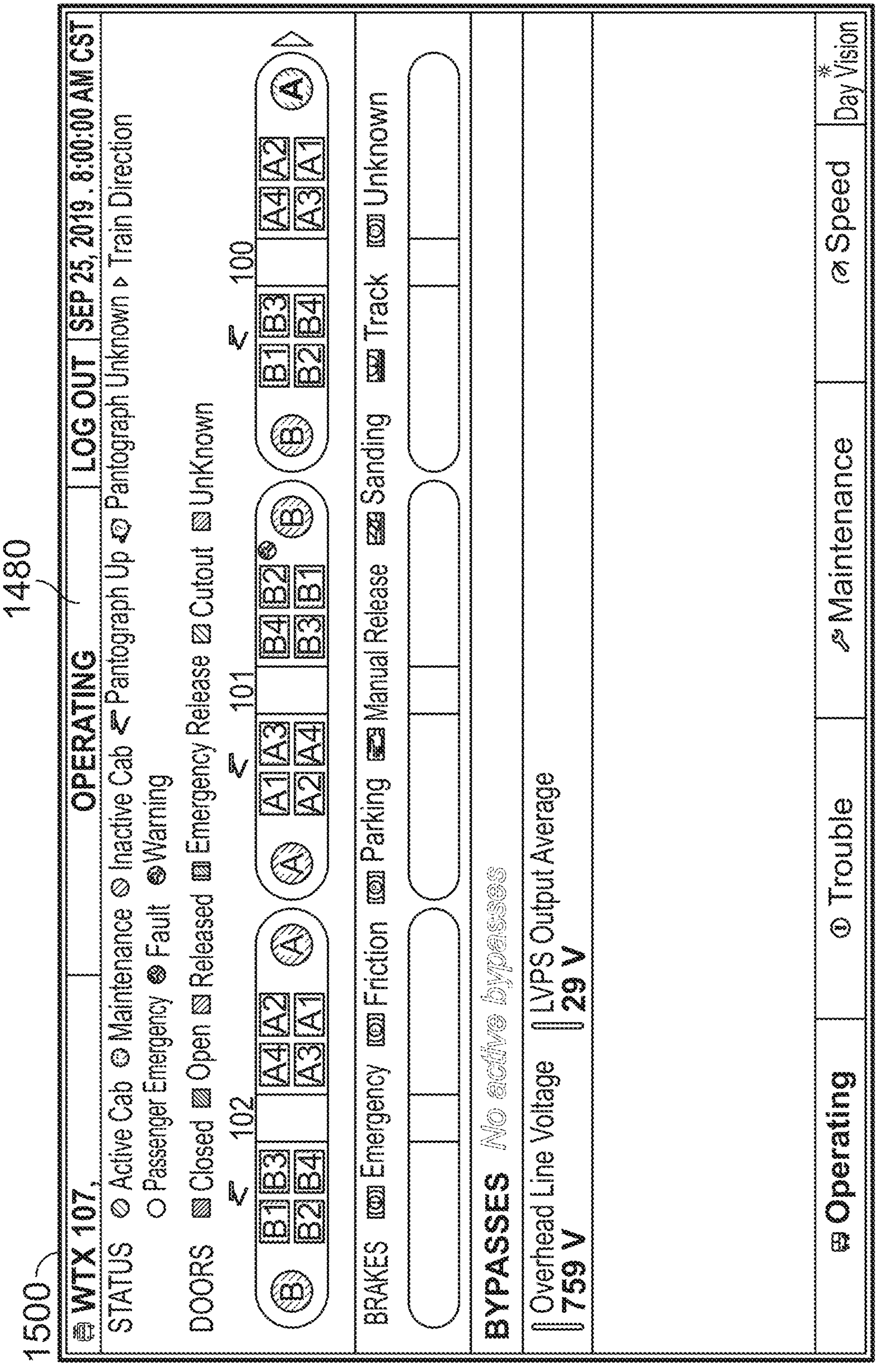
FIG. 32K is a diagram of an instance of the operating screen display of the fourth illustrated exemplary implementation of an asset including the first embodiment of the connected diagnostic system, which can be displayed on the onboard display and/or Human Machine Interface (HMI) and/or a remote view of the onboard display and/or the HMI on a remote web platform, in accordance with implementations of this disclosure.
Figure 32L:
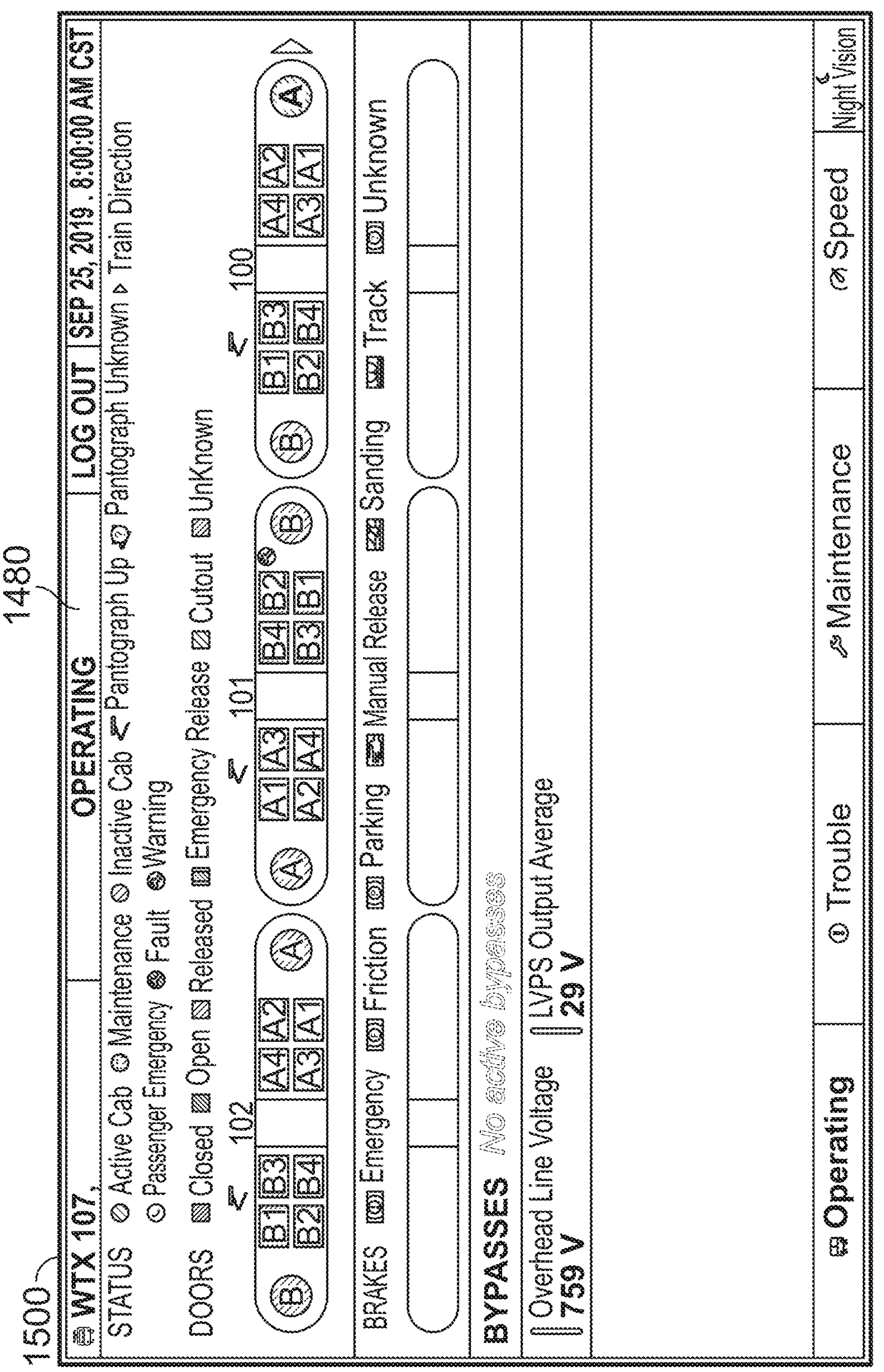
FIG. 32L is a diagram of an instance of the operating screen display of the fourth illustrated exemplary implementation of an asset including the first embodiment of the connected diagnostic system, which can be displayed on the onboard display and/or Human Machine Interface (HMI) and/or a remote view of the onboard display and/or the HMI on a remote web platform, in accordance with implementations of this disclosure.

The connected diagnostic system 1200 provides simultaneous visual and audible notifications, including natural language processing, to asset-related events onboard the asset 1202 and off-board the asset 1202. This data is available simultaneously both onboard the asset 1202 and off-board the asset 1202, allowing the remotely located user to view a replica of the onboard displays and/or HMIs 1210 while also allowing the remotely located user to access information that is not currently displayed on the onboard displays and/or HMIs 1210 but is available to the onboard displays and/or HMIs 1210. For example, the onboard displays and/or HMIs 1210 and the remote view 1226 of the onboard displays and/or HMIs can display the same screen, such as an operating screen 1480 of train car 1400, shown in FIG. 32A, a first instance of a trouble screen 1482 of train car 1400, shown in FIG. 32B, a second instance of a trouble screen 1484 of train car 1400, shown in FIG. 32C, a maintenance access screen 1486 of train car 1420, shown in FIG. 32D, a maintenance system status screen 1488 of train car 1400, shown in FIG. 32E, a maintenance subsystem status screen 1490 of train car 1400, shown in FIG. 32F, an on demand live signals screen 1492 of train car 1400, shown in FIG. 32G, a speedometer screen 1494 of train car 1400, shown in FIG. 32H, a settings screen 1496 of a train car 1420, shown in FIG. 32I, the settings screen 1496 of train car 1420, showing the brightness toggle radio button 1498, shown in FIG. 32J, and the operating screen 1480 of train car 1500, shown in FIGS. 32K and 32L.

Figure 32M:
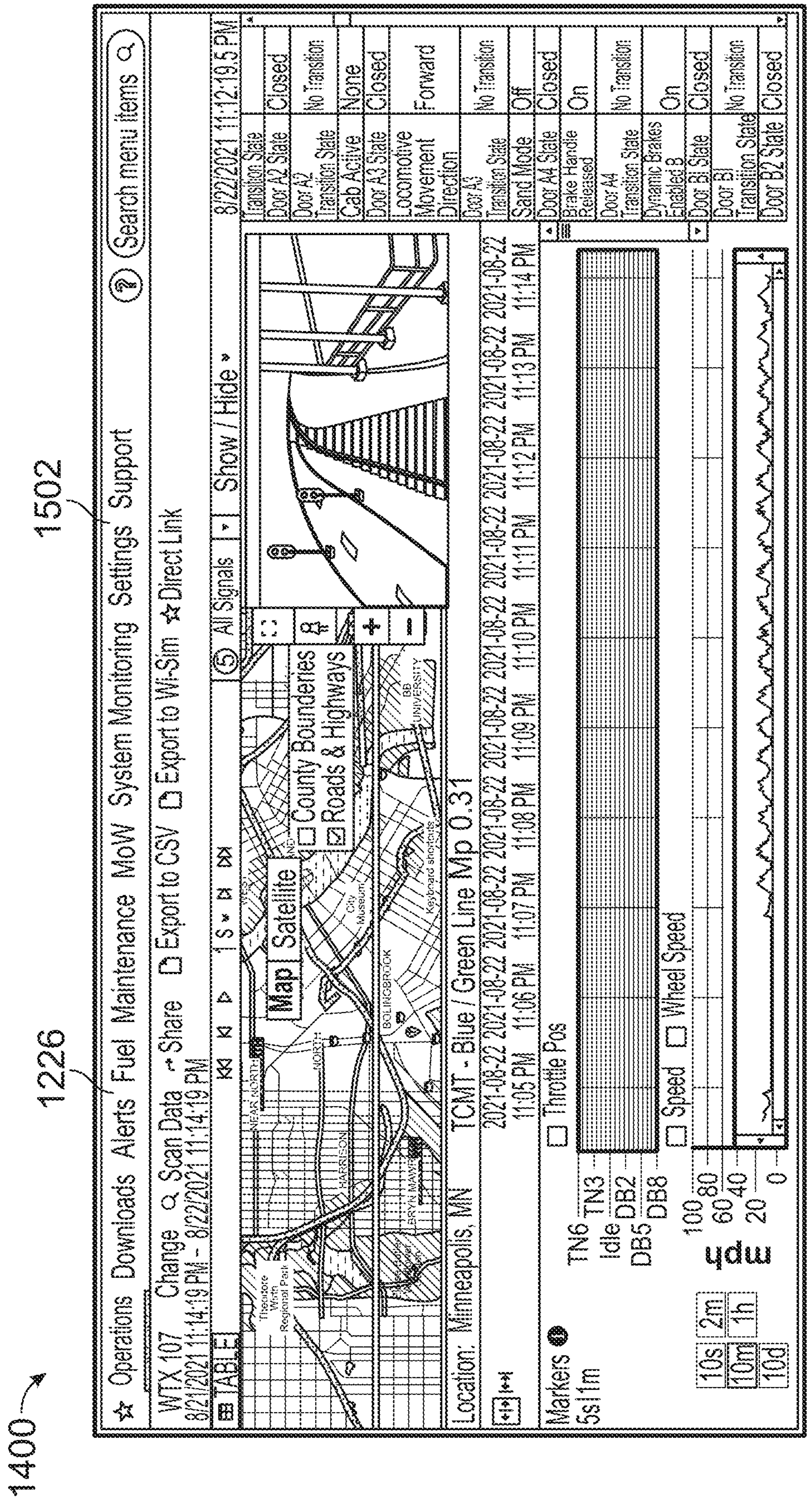
FIG. 32M is a diagram of an instance of an operations screen display of the asset of FIG. 28A including the first embodiment of the connected diagnostic system, which can be displayed on the onboard display and/or Human Machine Interface (HMI) and/or a remote view of the onboard display and/or the HMI on a remote web platform, in accordance with implementations of this disclosure.
Figure 32N:
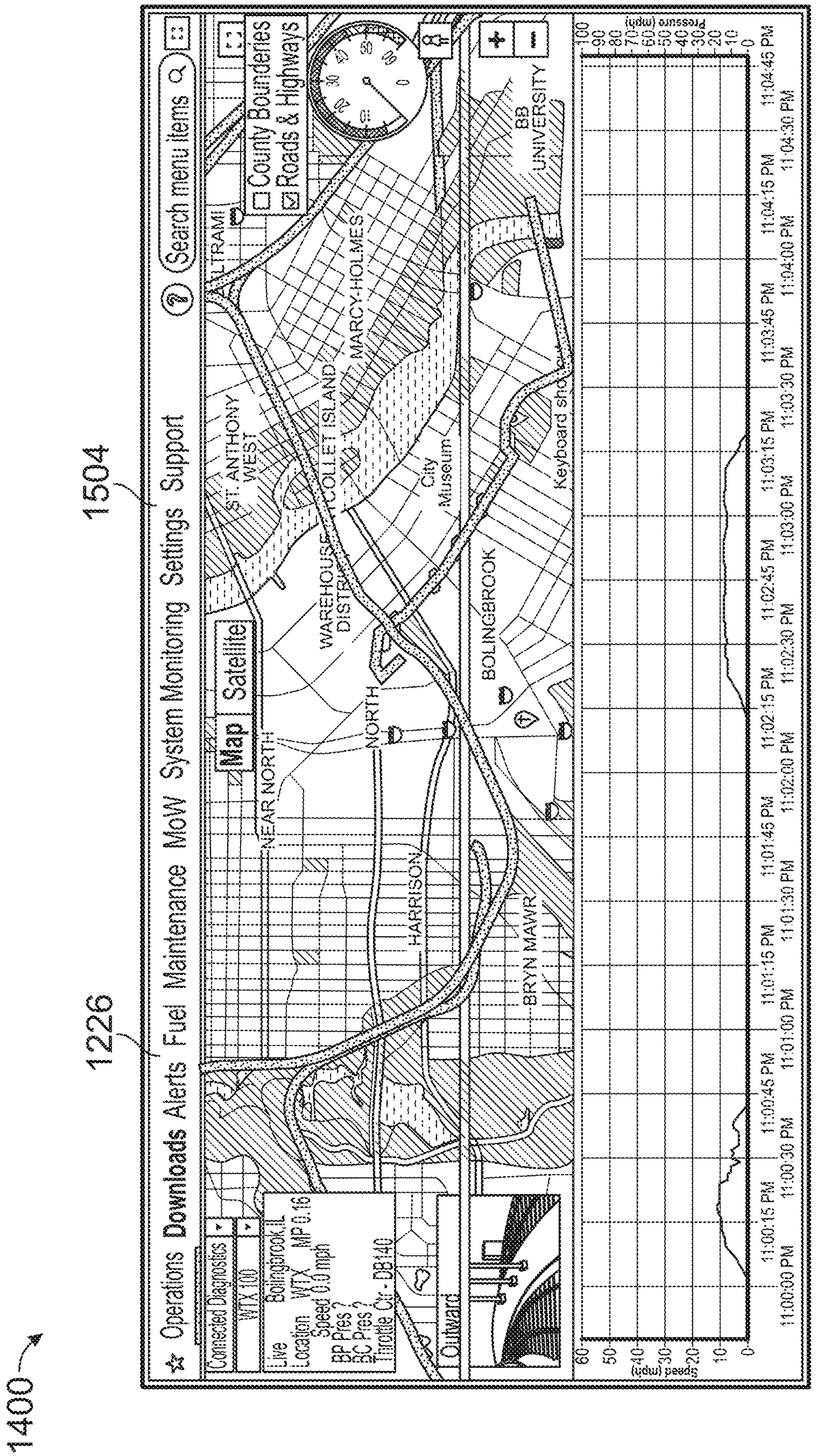
FIG. 32N is a diagram of an instance of a downloads screen display of the asset of FIG. 28A including the first embodiment of the connected diagnostic system, showing live data, which can be displayed on the onboard display and/or Human Machine Interface (HMI) and/or a remote view of the onboard display and/or the HMI on a remote web platform, in accordance with implementations of this disclosure.
Figure 33:
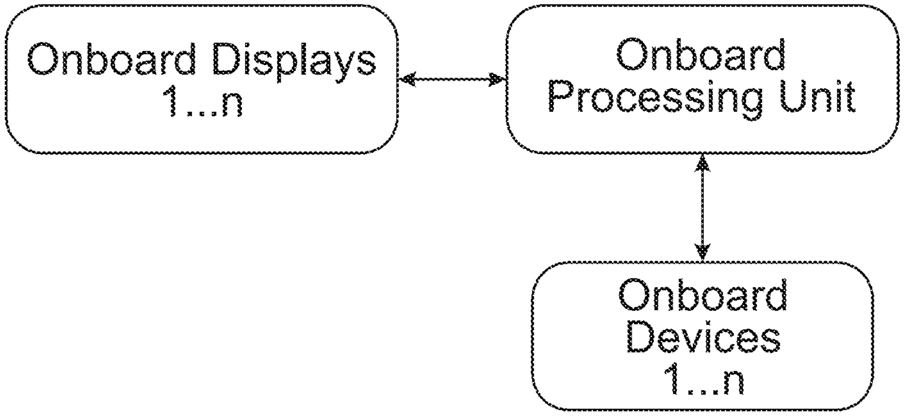
FIG. 33 (Prior Art)
FIG. 33 is a diagram of existing technologies in vehicles of the prior art.

By providing instant access to both live data and historical data, onboard the asset 1202 and off-board the asset 1202, users onboard the asset 1202 and remotely located users can also benefit from real-time alerts, playback serviceability, reports, and analytics. For example, the onboard displays and/or HMIs 1210 and the remote view 1226 of the onboard displays and/or HMIs can display an operations screen 1502 of train car 1400, shown in FIG. 32M, a downloads screen 1504 of train car 1420, shown in FIG. 32N, a maintenance screen 1508 of a train car 1420, showing the asset configuration history 1510 including version information, shown in FIG. 32O, and a settings screen 1514 of a train car 1506, showing commissioning in progress 1516 of train car 1506, shown in FIG. 32P. The insights obtained from real-time monitoring are used to prevent failures and decrease unplanned downtime. Instant access to both live data and historical data enables scheduling of asset 1202 maintenance due to the availability of real-time diagnostics. The connected diagnostic system 1200 allows remote visibility of the events of all assets 1202 in a consist, in this illustrated exemplary implementation, as well as the ability to monitor any other asset 1202 in the fleet. View of fault log information, fault occurrence and reset time, fault severity levels, etc., can be sorted based on date, time, or system. Asset 1202 data is combined with other operating and contextual information, such as railroad centric location and weather data, to better understand circumstances that may have contributed to faults and issues. Faults or events on the asset 1202 can also be acknowledged by crew that are not present on the asset 1202 and any remotely located end users 1214.

Prior to the connected diagnostic system 1200 of the present disclosure, existing systems allowed self-tests or diagnostics of the onboard systems to be initiated onboard the vehicle only on a single vehicle or in consist mode. Some existing systems supported this functionality only in a limited capacity.

The connected diagnostic system 1200 allows self-tests on the onboard devices 1218 to be run on the asset 1202 and remotely as well for one asset 1202, selected assets 1202, and/or all assets 1202 in the fleet simultaneously, which reduces the effort taken by the maintenance crew 1224 to run self-tests and provides a report for all assets 1202.

Prior to the connected diagnostic system 1200 of the present disclosure, existing systems required vehicle crews to enter the assigned route for the train, which could potentially result in human error causing potential delays to vehicle services or reporting incorrect passenger and station information.

The connected diagnostic system 1200 allows automatic assignment of assets 1202 to a route, train, crew, etc., from back office systems, reducing and/or minimizing the need for manual entry of, in this illustrated exemplary implementation, the train route to only specialized scenarios. The off-board personnel, such as the supervisor 1224 and control center 1212, also have access to real-time information of the train's route information.

Prior to the connected diagnostic system 1200 of the present disclosure, existing systems maintained repair history, operating manuals, and maintenance manuals off-board the vehicle. This increases the time required for maintenance crew to troubleshoot or to refer to existing open defects on the vehicle or repair history.

The connected diagnostic system 1200 allows the operator 1222 and/or asset 1202 to connect and integrate with other off-board maintenance management systems from the onboard display and/or the HMI 1210 on the asset 1202 to, for example, order a part from the onboard display and/or the HMI 1210, look up electronic manuals that are maintained off-board, review repair history, view all open issues and/or defects on the asset 1202, etc.

Prior to the connected diagnostic system 1200 of the present disclosure, existing systems' onboard displays and/or HMIs and user interfaces did not typically, continuously, and/or periodically evolve with the latest technology trends once they were shipped from the factory and therefore were not updated with any new features, such as to include pinch and zoom, a touchscreen, or a modern graphical representation of data, as they became available.

The connected diagnostic system 1200 allows remote updates to the technology of the onboard display and/or the HMI 1210, the onboard systems, and/or the onboard subsystems via over-the-air software updates. The connected diagnostic system 1200 also allows onsite updates to the technology of the onboard display and/or the HMI 1210, the onboard systems, and/or the onboard subsystems by allowing a user, such as the operator or maintenance crew, to download the software update and provision it onsite or by connecting a removable storage device comprising the update. The ability to make these updates continuously throughout the life cycle of the asset 1202 improves maintenance efficiency by providing the ability to utilize modern tools and technology.

Prior to the connected diagnostic system 1200 of the present disclosure, existing systems' onboard data was only available on the vehicle or only available to be offloaded at less frequent intervals, such as once a day or once a week, or required a download of the onboard data by physically connecting to the onboard devices onboard the vehicle. Most often, users were unable to capture failure that occurred over the road for troubleshooting.

The connected diagnostic system 1200 provides remote access to see operating data of the asset 1202, including more advanced data such as engine data, head-end power (HEP) equipment data, and electrical and power system data, second by second or on a periodic snapshot basis, such as every five minutes. The data from the asset 1202 is available on-demand or based on conditions and/or rules set up by the user. Remote data access to setup on-demand is also available to detect when specific asset conditions are met and can be utilized by the user via alerts, reports, etc. This enables the user to understand when data surrounding specific incidents occur over the road and to remotely schedule asset 1202 logs to record incidents and/or failures that occur over the road.

Figure 34:
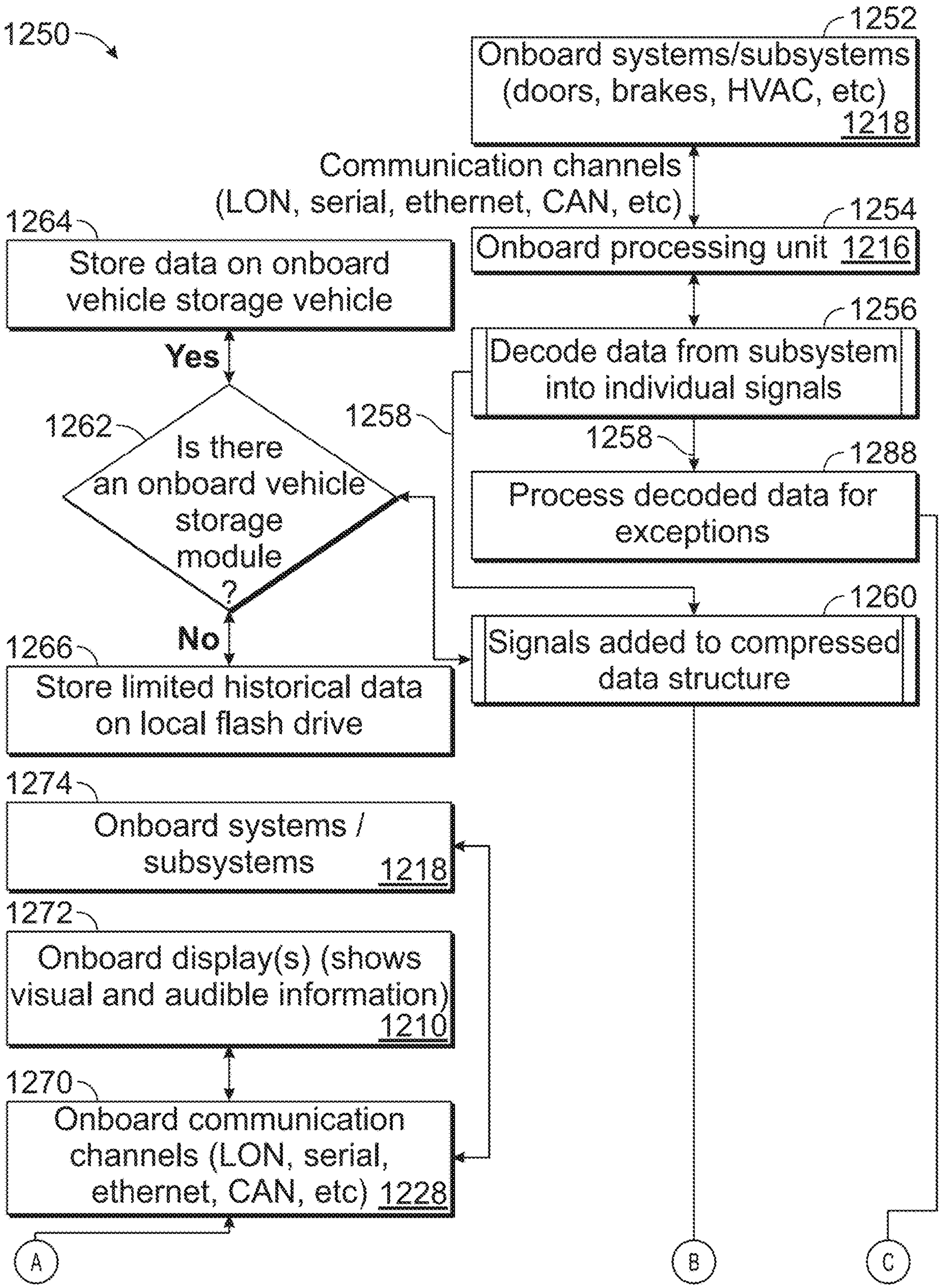
FIG. 34 is a flow diagram of a process for transferring data in real-time between onboard systems and off-board systems in accordance with implementations of this disclosure.
Figure 34:
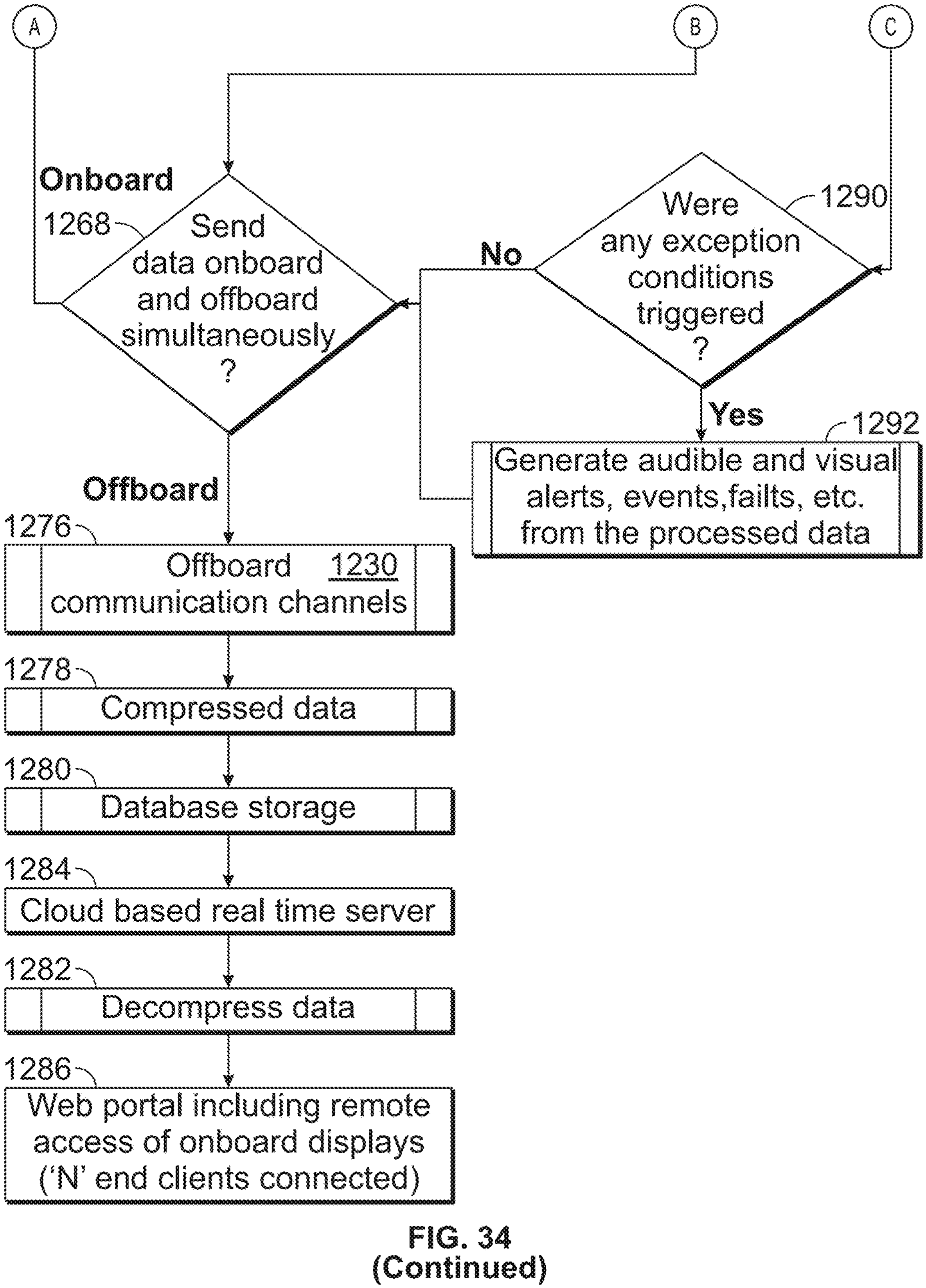

FIG. 34 is a flow diagram showing a process 1250 for transferring data in real-time from onboard systems and/or onboard subsystems to the onboard display and/or the HMI 1210 and remote access of the onboard display and/or the HMI 1210 in accordance with an implementation of this disclosure. DARS 100, 200, 1000 is a feature of the onboard processing unit 1216 software and the onboard processing unit 1216 is a hardware component of the connected diagnostic system 1200. In this exemplary implementation, the asset 1202 includes several onboard devices and/or onboard systems, such as doors, brakes, HVAC, propulsion, engine controllers, and fuel systems, which are further subdivided into individual onboard subsystems, such as, for example, Door A1, Door A2, Brakes A, Brakes B, etc. The onboard systems and subsystems are essential for the functioning of the asset 1202. The onboard systems and subsystems monitor and sense data and provide information to enable efficient control and operation of the asset 1202. The onboard system and subsystems 1252 communicate over the onboard communication channels 1228 and send data to the onboard processing unit 1216 for further analysis 1254. The onboard processing unit 1216 is responsible for processing the data from the various systems connected to it, providing advanced data fusion capabilities, self-monitoring, and integration with third party devices, such as cameras, to allow incident investigation. Using the data received from the onboard systems and subsystems, the onboard processing unit 1216 can receive and analyze the conditions of the asset 1202 and its surrounding infrastructure, such as tracks, speed limits, collisions, and synchronized real-time monitoring. The data from the onboard systems and subsystems are decoded into individual signals and time synchronized 1256 to provide meaningful data for user consumption and for additional processing by other onboard applications. The decoded data is available on a data bus for simultaneous use by multiple applications conducting parallel processing on the data in real-time 1258. The individual signals are stored in a compressed data structure so they can be sent to onboard systems and off-board systems 1260. The compression of the data is done to maximize storage capacity of the data onboard the asset 1202 and to enable faster offload to off-board systems.

The process 1250 then determines, using the onboard processing unit 1216, whether the asset 1202 is equipped with an onboard crash hardened memory module 1262. If the asset 1202 includes the crash hardened memory module 1220, the compressed data is stored in the crash hardened memory module 1220 1264. The crash hardened memory module 1220 stores the data for a predetermined amount of time, such as at least 48 hours, in case a catastrophic event occurs. The predetermined amount of time is configurable and can be adjusted to the customer's needs. The crash hardened memory module 1220 provides access to the compressed data even if the power has been cut off and maintains standards set by the Federal Railroad Administration (FRA), in this illustrated exemplary implementation, and the Institute of Electrical and Electronics Engineers (IEEE). If the asset 1202 does not include a crash hardened memory module, limited historical data is stored locally on a flash drive, solid state drive, and/or any other local storage device 1266.

Simultaneously, the process 1250 determines, using the onboard processing unit 1216, whether the data is going to onboard systems, off-board systems, or both onboard systems and off-board systems 1268. The data from onboard is sent to devices on the asset 1202 and to off-board systems simultaneously. If the data is going to onboard systems, the uncompressed data is sent via the onboard communication channels 1228 1270 to the onboard displays and/or HMIs 1210 1272, which provide visual and audible information, including natural language processing, to the asset 1202 operators 1222 and maintenance crew 1224, and to the onboard systems and/or onboard subsystems 1274. Where the data is used to send responses back to the same onboard system and/or make the data from other onboard systems available to the onboard systems, including the requested data and/or information, to the onboard systems and subsystems. If the data is going to off-board systems, the data is compressed by the data encoder 122, 222, 1022 of DARS 100, 200, 1000, respectively, and the compressed data is sent via the off-board communication channels 1230 1276 from the onboard systems to the off-board systems 1278. The compressed data is also stored in a database 1280, such as the crash hardened memory module 118, 218, 1018 of DARS 100, 200, 1000, respectively, and optionally in the non-crash hardened removable storage device 219 of DARS 200. The compressed data is then sent to a cloud-based real-time server 1284. Once received, the compressed data is then decompressed 1282, using the data decoder 136, 236, 1036 of DARS 100, 200, 1000, and sent to the cloud-based real-time server 1284 for storage and retransmission for easier accessibility. Data from the cloud-based real-time server can be accessed by either onboard platforms and/or off-board platforms simultaneously. The processed data stored on the cloud-based real-time server can be viewed through the remote web platform 1208 on multiple remote platforms 1286, such as tablets, mobile phones, and laptops, providing remote access of the onboard display and/or the HMI 1210. The remote platform, which includes any remote device that is connected to the Internet, provides a web-based viewer that allows users to get data remotely in real-time, which makes integration of data easier and provides cloud-based access to real-time monitoring capabilities to view, for example, the asset's geographic location and the conditions of the onboard systems and subsystems.

Simultaneous to storing the data 1262 and transferring the data to onboard systems and/or off-board systems 1268, the decoded data is processed to check for exceptions and/or predefined events 1288, which includes the analysis for exceptions and/or predefined events generated either by the onboard systems directly, such as faults generated, or by rules defined to set the threshold values for a specific signal and/or set of signals, which is necessary to understand if the onboard systems are performing beyond normal thresholds and/or beyond defined thresholds. Exceptions and/or predefined events can also include, but are not limited to, temperature, speed, acceleration, brake states, coolant temperature, outside air, inside air, and health of the system. The user can define the rules and thresholds and can also set the frequency of alerts for the exceptions. The thresholds are set internally and the user can define the minimum thresholds, the maximum thresholds, and the threshold range. The process 1250 then assesses, using the onboard processing unit 1216, the signals that were processed and determines whether any exceptions and/or predefined events were triggered 1290, such as, for example, an exception/predefined event is triggered for an overspeed event when the speed of the asset 1202 is greater than the previously established speed limit of 45 miles/hour. If no exceptions were triggered, the process 1250 continues on to determine whether the data is going to onboard systems, off-board systems, or both onboard systems and off-board systems 1268. If exceptions and/or predefined events were triggered from the processed data, audible and visual alerts, [,] including natural language processing, events, faults, etc., are generated from the exceptions and/or predefined events that were triggered and notification of onboard and off-board crew is enabled for items requiring further action or investigation 1292, such as, for example, the crew is alerted to stay within the regulated speed limits. The process 1250 then continues on to determine, using the onboard processing unit 1216, whether the data is going to onboard systems, off-board systems, or both onboard systems and off-board systems 1268.

Figure 35:
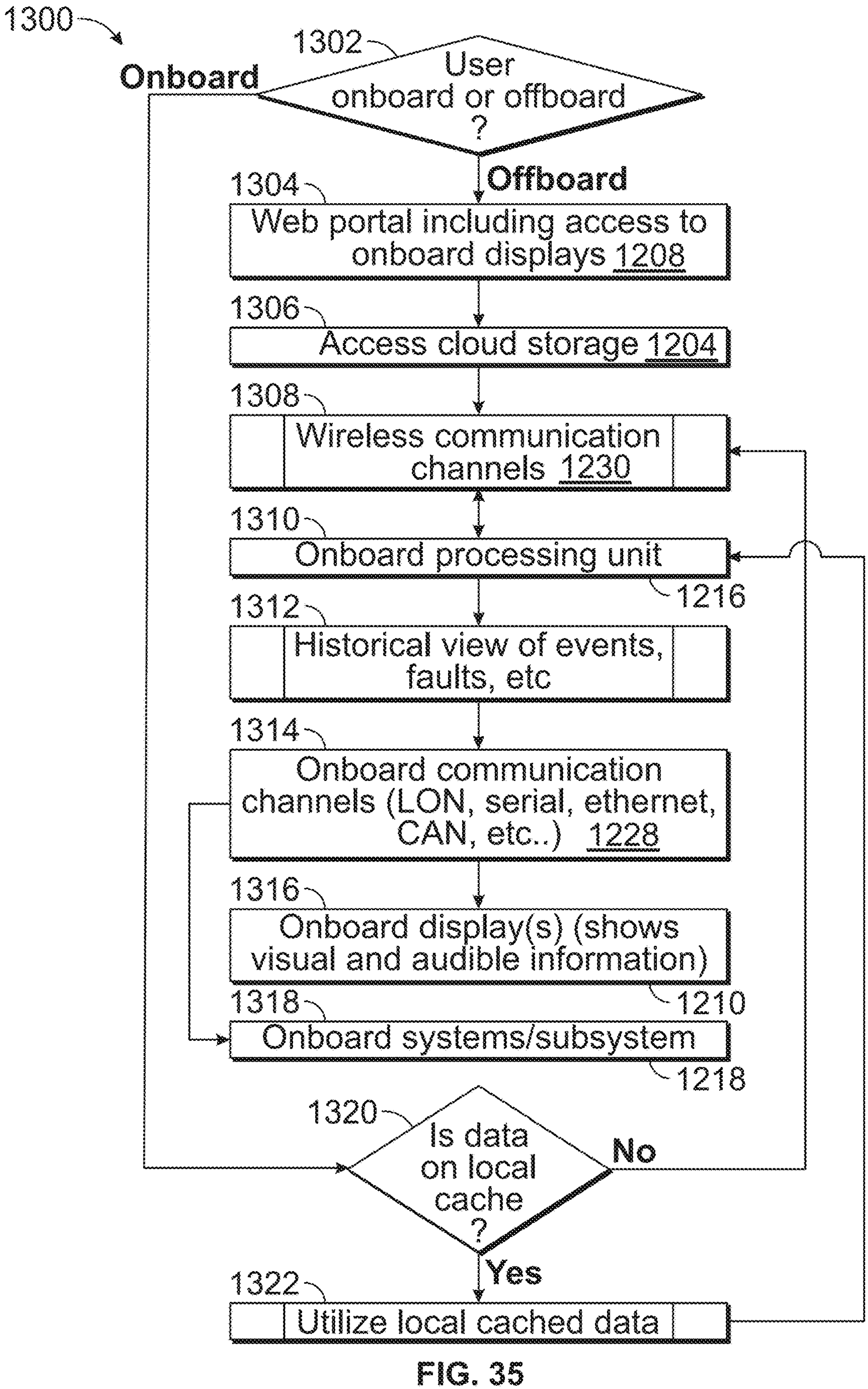
FIG. 35 is a flow diagram of a process for transferring historical data between onboard systems and off-board systems in accordance with implementations of this disclosure.

FIG. 35 is a flow diagram showing a process 1300 for transferring historical data in real-time from onboard systems to the onboard display and/or the HMI 1210 and remote access of the onboard display and/or the HMI 1210 simultaneously in accordance with an implementation of this disclosure. DARS 100, 200, 1000 is a feature of the onboard processing unit 1216 software and the onboard processing unit 1216 is a hardware component of the connected diagnostic system 1200. The process 1300 is triggered by one of two events: when users present on the asset 1202 make a request onboard the asset 1202 using the onboard display and/or the HMI 1210 to access historical data; and when a remotely located end user 1214 makes a request on a remote platform and/or web client to access historical data. Process 1300 begins when a request to view historical data is received from a user onboard the asset 1202 or a remotely located end user 1214 through the web platform 1208 1302. If the request was received from the remote web platform 1208, the remote web platform 1208 including access to a remote instance of the onboard display and/or the HMI 1210 1304, the data is accessed from the cloud storage 1306 and is sent to the remote web platform 1208 for user consumption. The data previously accessed from the onboard systems and onboard displays and/or HMIs 1210, including any data and events that occur from the onboard systems and onboard displays and/or HMIs 1210, is stored in the cloud. Storing the data in the cloud allows access to historical data for a longer period of time compared to the onboard processing unit 1216. The onboard processing unit 1216 usually has a limited storage capability of approximately 100 days of data, which onboard storage capacity can be extended as needed. By using the cloud-based storage system, onboard systems can access data, including historical data, from the cloud for a longer period of time, which is usually two years and can also be extended as needed.

The request for historical data is then sent via off-board asset wireless communication channels 1230 1308. The request is processed by the onboard processing unit 1216 to determine the appropriate onboard systems and/or onboard subsystems to receive the information 1310. The request for historical data to be accessed by the onboard display and/or the HMI 1210 can include, for example, a historical view of events, faults, etc., generated 1312. The data received from the cloud is then passed on to the remote web platform 1208 1304 via off-board asset wireless communication channels 1230 1308. A remote instance 1206 of the onboard display and/or the HMI 1210 displays the historical data requested by the user.

If the request was received from the onboard platform, the process 1300 determines, using the onboard processing unit 1216, whether the requested data is in the local cached data available on the onboard processing unit 1216 1320. If cached data is not available, the request is processed by the onboard processing unit 1216 to determine the appropriate onboard systems and/or onboard subsystems to retrieve the information 1310 and the request to retrieve the data goes off-board. The request for historical data to be accessed by the onboard display and/or the HMI 1210 can include, for example, a historical view of events, faults, etc., generated 1312. The data received from the appropriate onboard systems and/or subsystems is then passed on to the onboard display and/or the HMI 1210 via onboard asset wired communication channels 1228 1314. The onboard display and/or the HMI 1210 displays the data that the user requested 1316, including visual and audible information and natural language processing, and the data can further be used to send responses, which can include the requested data, and/or information including faults, self-tests, etc., to the onboard systems and onboard subsystems 1318. If the cached data is available, the cached data including the historical data requested by the user is utilized 1322 and sent to the onboard processing unit 1216 1310. The request for historical data to be accessed by the onboard display and/or the HMI 1210 can include, for example, a historical view of events, faults, etc., generated 1312. The data received from the local cache is then passed on to the onboard display and/or the HMI 1210 via onboard asset wired communication channels 1228 and/or off-board asset wireless communication channels 1230 1314. The onboard display and/or the HMI 1210 displays the data that the user requested 1316, including visual and audible information and natural language processing, and the data can further be used to send responses, which can include the requested data, and/or information including faults, self-tests, etc., to the onboard systems and onboard subsystems 1318.

Figure 36:
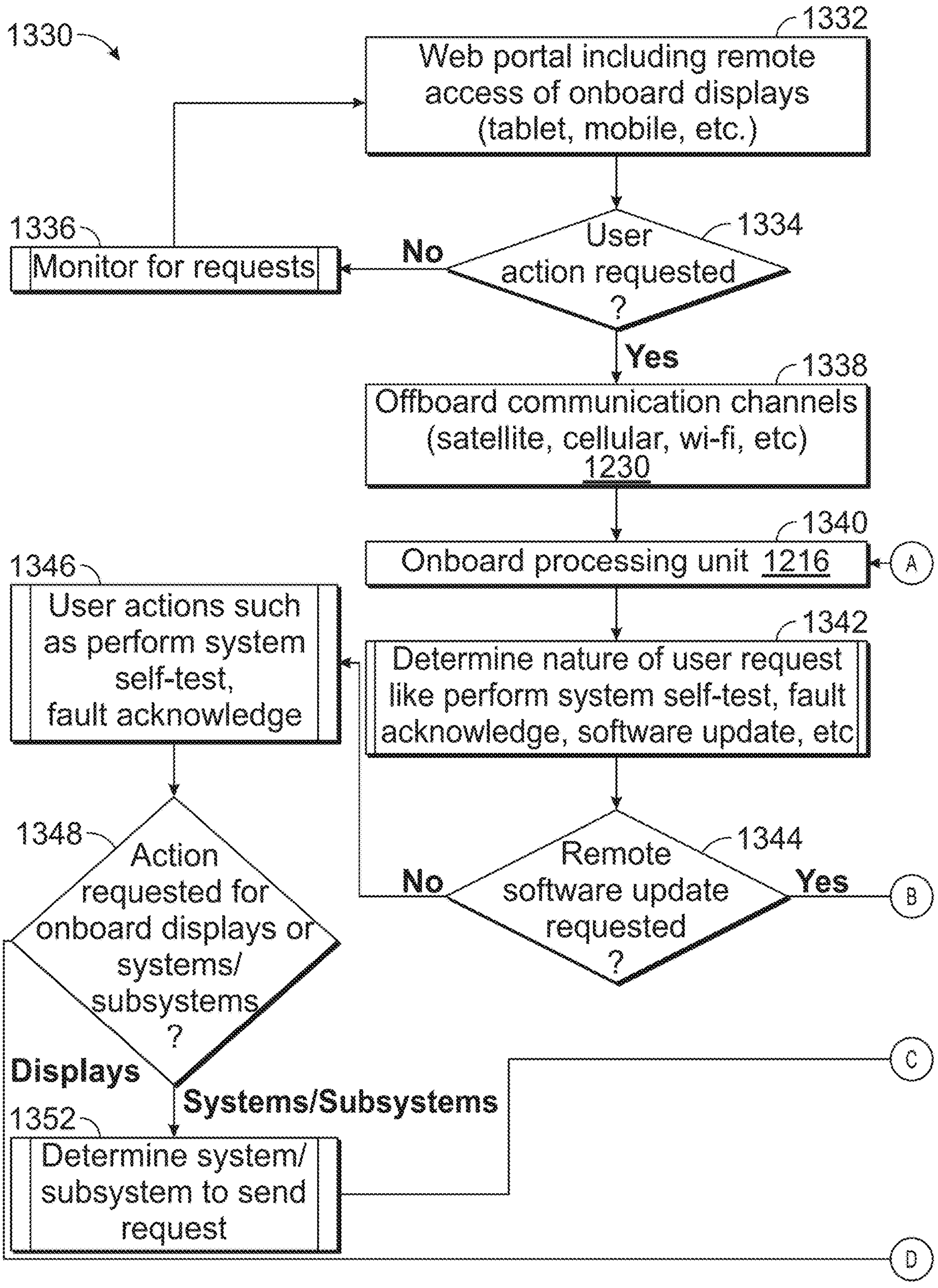
FIG. 36 is a flow diagram of a process for performing user requests from a remote platform to an onboard system in accordance with implementations of this disclosure.
Figure 36:
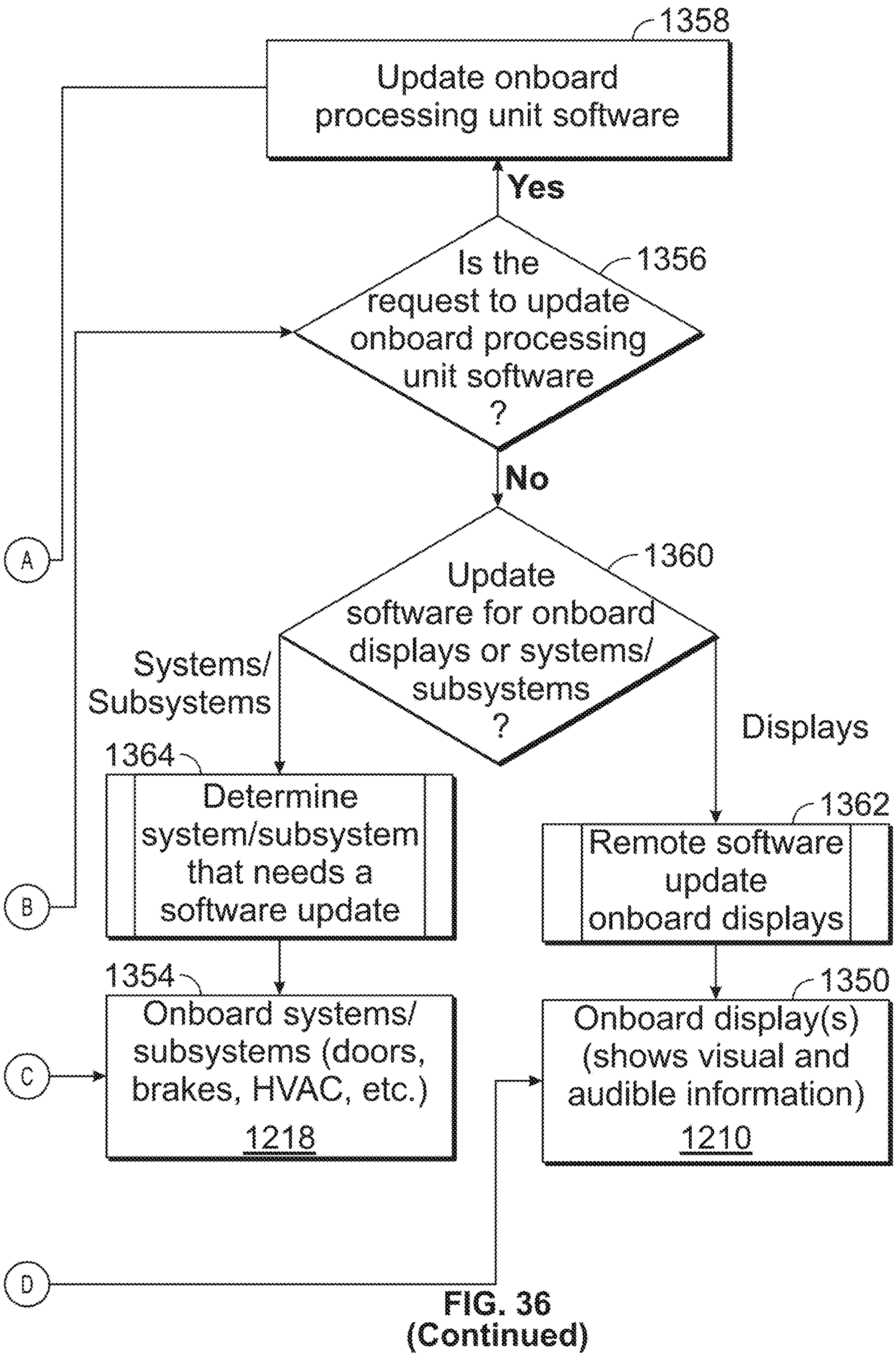

FIG. 36 is a flow diagram showing a process 1330 showing the flow of data from the remote platform to the onboard systems and onboard display and/or the HMI 1210 to perform certain user actions and/or update software in accordance with an implementation of this disclosure. The remote web platform 1208 allows users to take actions and/or send commands to onboard systems, which allows remotely located end users 1214 to maintain and monitor assets 1202. There are established rules and regulations set to allow or deny the requests sent from a remotely located end user 1214. The process 1330 monitors, using the remote web platform 1208, the remote web platform 1208 for requests from remotely located end users 1214 for actions and/or commands 1332, such as, for example, faults, self-tests, and diagnostics. The process 1330 determines, using the remote web platform 1208, whether a user action was requested 1334 through the remote web platform 1208. If the remote web platform 1208 did not receive a user's 1214 request for action and/or command, the process 1330 continues to monitor, using the remote web platform 1208, the remote web platform 1208 to catch any requests sent by remotely located end users 1214 from a remote platform 1336. If the remote web platform 1208 did receive a user's 1214 request for action and/or command, the request is sent from the remote web platform 1208 via off-board asset wireless communication channels 1230 to the onboard processing unit 1216 1338. The onboard processing unit 1216 accepts the incoming requests sent by any remote platforms 1340. The onboard processing unit 1216 determines the nature of the request made to the onboard systems 1342, such as self-tests (e.g., self-test of a door can be done remotely by triggering a command and the door system and/or subsystem can report the status of its self-test once it is complete), fault acknowledgement, and software updates (e.g., update software of an onboard system).

The onboard processing unit 1216 determines whether the request is to update software remotely 1344. If the request is not to update software remotely, the onboard processing unit 1216 determines the nature of the user action request made to the onboard systems 1346. The onboard processing unit 1216 then determines if the request is for the onboard display and/or the HMI 1210 or the onboard systems and/or onboard subsystems 1348. If the request is for the onboard display and/or the HMI 1210, the onboard processing unit 1216 performs the requested user action and the onboard display and/or the HMI 1210 displays the action that the user requested 1350, including visual and audible information and natural language processing. If the request is for the onboard systems and/or subsystems, the onboard processing unit 1216 identifies the onboard system and/or onboard subsystem to send the user's 1214 request to 1352.

If the request is to update software remotely, the onboard processing unit 1216 determines if the request is to update the software on the onboard processing unit 1216 1356. If the request is to update the software on the onboard processing unit 1216, the software on the onboard processing unit 1216 is updated 1358. The onboard processing unit 1216 software is updated on a regular basis to include any new features or bugs that were fixed as part of the software development and release process. The version information for the specific onboard system and/or subsystem for which the software was updated is then available on the remote web platform 1208 as well as on the onboard displays and/or HMIs 1210 1354. The software update can also be done directly from the onboard system and/or onboard display and/or the HMI 1210 using the wireless communication channels 1230 of the onboard processing unit 1216. The onboard processing unit 1216 then continues to monitor for incoming requests sent by any remote platforms 1340.

If the request is not to update the software on the onboard processing unit 1216, the onboard processing unit 1216 then determines whether the request is to update the software on the onboard display and/or the HMI 1210 or on the onboard systems and/or onboard subsystems 1360. If the request is to update the software on the onboard display and/or the HMI 1210, the onboard processing unit 1216 determines which specific onboard displays and/or HMIs 1210 need to be updated 1362. The software on the specific onboard displays and/or HMIs 1210 is updated and the onboard display and/or the HMI 1210 displays the version information for the software update that was completed 1350, including any visual and audible information and natural language processing. Additionally, in another exemplary implementation, the software update and version information for the software update can be displayed via pop-ups both onboard the asset 1202 on the onboard displays and/or HMIs 1210 and remote from the asset 1202 on a remote instance of the onboard displays and/or HMIs on the remote web platform 1208. If the request is to update the software on the onboard systems and/or subsystems, the onboard processing unit 1216 determines which specific onboard systems and/or onboard subsystems need to be updated 1364. The software on the specific onboard system and/or subsystem is updated and the version information for the specific onboard system and/or subsystem for which the software was updated is then available on the remote web platform 1208 as well as on the onboard displays and/or HMIs 1210 1354.

Figure 37:
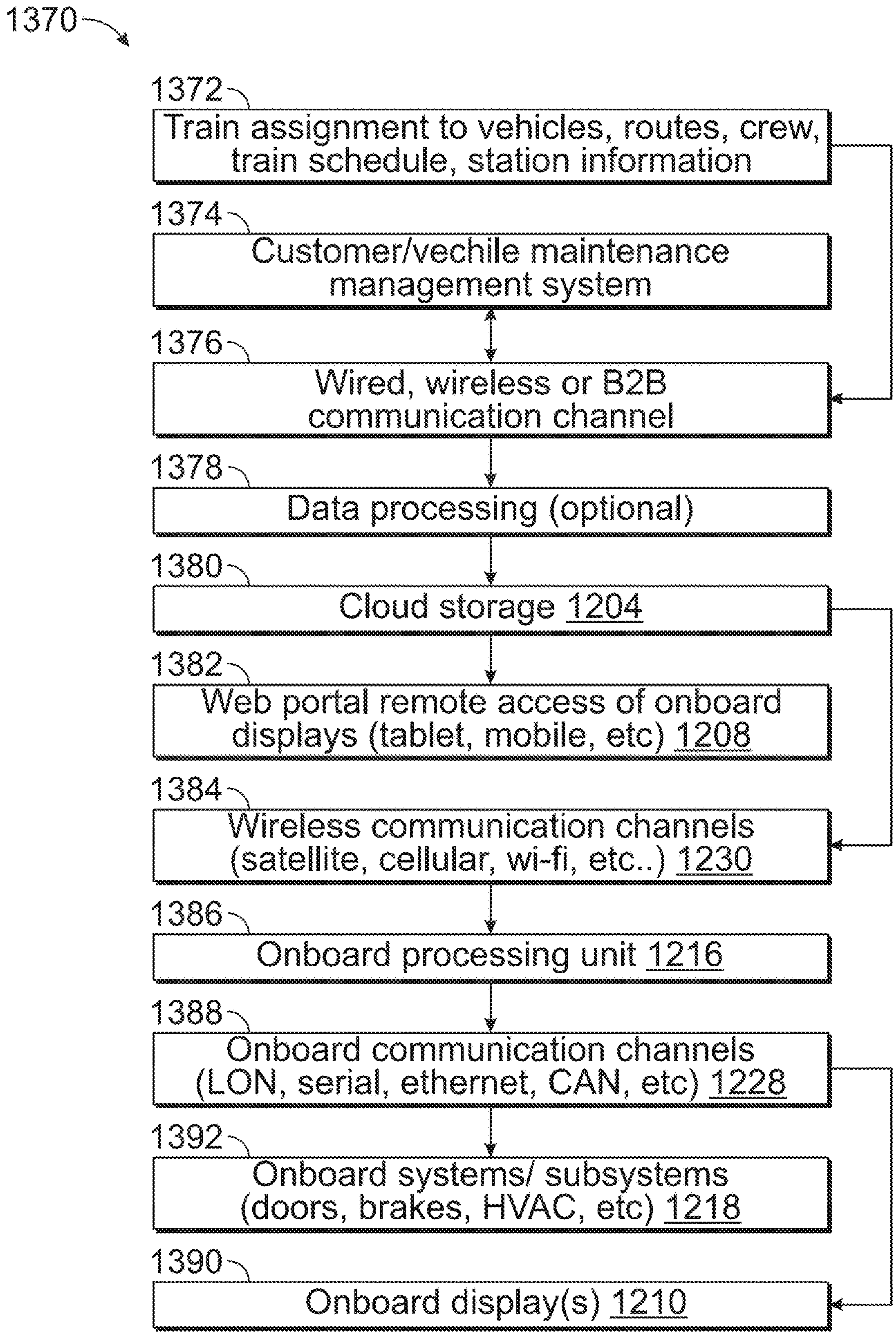
FIG. 37 is a flow diagram of a process for integrating data with third party devices in accordance with implementations of this disclosure.

FIG. 37 is a flow diagram showing a process 1370 of data integration between third-party devices to obtain asset 1202 information and/or data integration with customer/asset 1202 maintenance management system to provide a real-time view of the information within the connected diagnostic system 1200 in accordance with an implementation of this disclosure. The assignment of vehicles to trains, in this illustrated exemplary implementation, is a complex task usually undertaken by a third-party service or customer. The assignment also involves crew information, route information, train schedules, station information, etc. The assignment data, including, but not limited to, train assignment, route information, crew information, train schedule, and station information, is automatically integrated to the onboard displays and/or HMIs 1210 1372. Customer and/or asset management systems 1374 include a wide variety of information 1374, including, but not limited to, vehicle issues, defects, out of service information, electronic manuals, repair history, etc., which is valuable for the vehicle crew to troubleshoot. The data from the connected diagnostic system 1200 and/or third-party's devices, such as train information 1372 and/or customer/asset maintenance management systems 1374, is integrated via a wired communication channel, a wireless communication channel, and/or a business-to-business (B2B) communication channels 1376. The data received from the connected diagnostic system 1200 and/or third-party devices, including train information 1372 and/or customer/asset maintenance management systems 1374, can be processed and analyzed before being sent to the cloud 1378. If the data is processed, the data is analyzed, for example, for exceptions, error checking, checking the validity of the data, and/or further processed by DARS 100, 200, 1000. The data is sent to the cloud for storage purposes and can be assessed by either the onboard systems and/or off-board systems when required 1380. The remote web platform 1208 has access to the data on the cloud through remote access of the onboard displays and/or HMIs 1210 using remote devices such as tablets, mobile phones, and laptops 1382, which allow simultaneous viewing of connected diagnostic system 1200 data and/or third-party data onboard the asset 1202 and off-board the asset 1202. The data is sent via off-board asset wireless communication channels 1230 1384 to the onboard processing unit 1216 for further dissemination 1386. The onboard processing unit 1216 sends the data via onboard asset wired communication channels 1228 1388 to the onboard display and/or the HMI 1210 1390 and/or the onboard systems and/or subsystems 1392. The data from the third-party devices can be used to provide access to data, such as, for example, passenger information that is required by the onboard systems and/or subsystems for efficient operation and maintenance. Onboard displays and/or HMIs 1210 can provide access to electronic manuals as accessed by the third-party integration between the customer/asset maintenance management systems and the onboard processing unit 1216. The onboard displays and/or HMIs 1210 also have access to additional third-party data, such as repair history, issues, and defects, and provide a real-time view of the third-party data, such as the asset's 1202 assigned route, train, and crew.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system for processing, storing, and transmitting data from at least one mobile asset comprising:

an onboard processing unit onboard the at least one mobile asset, the onboard processing unit adapted to receive the data, using at least one of an onboard communication channel, a wired communication channel, a wireless communication channel, and a business-to-business communication channel, based on at least one data signal from at least one of:

at least one onboard system onboard the at least one mobile asset; and at least one onboard subsystem onboard the at least one mobile asset;

the onboard processing unit further adapted to decode the data into decoded data;

a data encoder adapted to compress at least one of the data and the decoded data into a compressed data structure;

a cloud-based real-time server remote from the at least one mobile asset, the cloud-based real-time server adapted to receive at least one of the data and the compressed data structure from the onboard processing unit using the wireless communication channel;

one of the onboard communication channel, the wired communication channel, and the wireless communication channel transmitting the decoded data to at least one of an onboard operator display onboard the at least one mobile asset, the at least one onboard system and the at least one onboard subsystem, and transmitting the compressed data structure to at least one remote platform remote from the at least one mobile asset simultaneously on a condition that a remotely located user requested the decoded data;

at least one of an onboard operator display onboard the mobile asset and a human machine interface onboard the mobile asset, the onboard operator display and the human machine interface adapted to display at least one of the data and the decoded data; and at least one remote platform remote from the at least mobile asset comprising a web-based viewer, the web-based viewer adapted to display at least one of the data, the decoded data, and the compressed data structure received from the cloud-based real-time server.

2. The system of claim 1, further comprising:

a data recorder onboard the at least one mobile asset comprising at least one local memory component, the data encoder, an onboard data manager, and a queueing repository, the data recorder adapted to receive the data based on the at least one data signal from at least one of at least one data source onboard the at least one mobile asset, at least one data source remote from the at least one mobile asset, the at least one onboard system onboard the at least one mobile asset, and the at least one onboard subsystem onboard the at least one mobile asset and send the data to the onboard processing unit;

the data encoder adapted to encode a predetermined amount of the data into encoded data; and an onboard data manager adapted to:

append the encoded data to the compressed data structure; and store at least one of the decoded data, and the compressed data structure, at a configurable first predetermined rate in at least one of the at least one local memory component and the queueing repository.

3. The system of claim 1, at least one of the onboard operator display and the human machine interface comprising one of a removable onboard operator display and a third party onboard operator display.

4. The system of claim 1, the onboard processing unit further adapted to at least one of:

receive, using at least one of the wired communication channel and the wireless communication channel, the data from at least one of a data recorder onboard the at least one mobile asset, the at least one onboard system onboard the at least one mobile asset, the at least one onboard subsystem onboard the at least one mobile asset, receive, using at least one of the wired communication channel, the wireless communication channel, and a business-to-business communication channel, the data from a third-party source; and send, using the wireless communication channel, the data to the at least one remote platform.

5. The system of claim 1, the at least one local memory component comprising at least one of a standalone crash hardened memory module onboard the mobile asset, an integrated crash hardened memory module onboard the mobile asset, a non-crash hardened storage device onboard the mobile asset, a local storage device onboard the mobile asset, and a local cache onboard the mobile asset.

6. The system of claim 1, the cloud-based real-time server further adapted to store at least one of the data, the decoded data, and the compressed data structure in a remote storage device remote from the at least one mobile asset.

7. The system of claim 1, further comprising:

a data decoder remote from the at least one mobile asset, the data decoder adapted to decompress the compressed data structure into decompressed data.

8. The system of claim 7, the cloud-based real-time server adapted to send the decompressed data to the at least one remote platform.

9. The system of claim 1, the onboard communication channel comprising at least one of standard Ethernet, proprietary Ethernet, controller area network, local operating network, serial communication, and multifunction vehicle bus.

10. The system of claim 1, the onboard processing unit further adapted to instantly stream diagnostic logs to the cloud-based real-time server using the wireless communication channel.

11. The system of claim 1, the wireless communication channel comprising at least one of wi-fi, a wireless local area network, a wireless metropolitan area network, a wireless wide area network, a private wireless system, a satellite network, and a cellular telephone network.

12. The system of claim 1, the cloud-based real-time server further adapted to receive at least one request from at least one remotely located authorized user, the request comprising at least one of a remote software update and a user-requested action.

13. The system of claim 12, at least one of the onboard processing unit, the at least one onboard system, and the at least one onboard subsystem further adapted to perform at least one of the remote software update and the user-requested action.

14. The system of claim 1, the web-based viewer further adapted to display the same content as displayed on the onboard operator display and the human machine interface.

15. The system of claim 1, the web-based viewer further adapted to allow a remotely located authorized user to view content different from that shown on at least one of the onboard operator display and the human machine interface.

* * * * *